United States Patent [19]

Lewis

[11] Patent Number: 5,416,652
[45] Date of Patent: May 16, 1995

[54] APPARATUS FOR, AND METHODS OF, RECORDING SIGNALS IN TRACKS ON A MEMORY MEMBER WITHOUT A REFERENCE INDEX

[75] Inventor: Martyn A. Lewis, Pacific Palisades, Calif.

[73] Assignee: Servo Track Writer Corporation, Westlake Village, Calif.

[21] Appl. No.: 106,400

[22] Filed: Aug. 12, 1993

Related U.S. Application Data

[62] Division of Ser. No. 596,722, Oct. 12, 1990, abandoned.

[51] Int. Cl.$^6$ .......................... G11B 5/09; G11B 5/596
[52] U.S. Cl. ......................................... 360/48; 360/51; 360/77.02
[58] Field of Search .................... 360/39, 48, 51, 55, 360/75, 77.02

[56] References Cited

U.S. PATENT DOCUMENTS

| | | | |
|---|---|---|---|
| 3,540,022 | 11/1970 | Berger | 360/51 |
| 3,893,172 | 7/1975 | Celek | 360/51 |
| 4,068,268 | 1/1978 | Idemoto et al. | 360/78 |
| 4,131,920 | 12/1978 | Berger | 360/51 |
| 4,371,902 | 2/1983 | Baxter et al. | 360/75 |
| 5,153,788 | 10/1992 | Nishikawa et al. | 360/51 |
| 5,164,863 | 11/1992 | Janz | 360/57 |
| 5,164,866 | 11/1992 | Sano et al. | 360/51 |

*Primary Examiner*—Donald Hajec
*Assistant Examiner*—Won Tae C. Kim
*Attorney, Agent, or Firm*—Ellsworth R. Roston; Charles H. Schwartz

[57] ABSTRACT

A head records a track (e.g. a servo track) in a memory member outside of a clean room without using reference indices. In each of a plurality of cyclical movements (e.g. revolutions), signals (e.g. servo signals) are recorded in the track in an individual number of frames. Thereafter the distance of the unrecorded portion of the track is determined. In the next cyclical movement, the head records signals in an individual number of frames contiguous to the frames previously recorded, in a track distance dependent upon such individual number relative to the number of frames still unrecorded and upon the distance determined for the unrecorded track portion. In a last cyclical movement, the head records a single frame in a particular spatial relationship with the first and last frames. In a specific embodiment, $2^{N-K}$ frames may be recorded in the K cyclical movement. Additional signals may thereafter be recorded by the head in tracks in a single cyclical movement. In another embodiment, each individual number of frames continue to be recorded in the first track in each cyclical movement until the frames occupy a distance, within particular limits, dependent upon the unrecorded length of the track and upon the individual number of frames relative to the number of frames still unrecorded. In a further embodiment, sectors and data sectors following the sectors are recorded with signals in progressive cyclical movements in a manner similar to the recording of the sectors in such revolutions in the first embodiment.

28 Claims, 43 Drawing Sheets

STEP #2 Write 50% of master servo track, & erase scratch dibit.

For every HDA to be servo written: (HDA Loop).

S    Xmit read signal pulses to System Control Unit (SCU)
    S    Wait for transition #1
    S    Start timer in SCU
    S    Stop timer on transition #1
    S    Calculate fractional error, D(0) in period.
    S    Set synthesiser to F*(1-D(0)).
    S    Wait 2^N - 2^(N-2) frame counts (i.e. 75% of a revolution).
    S    Adjust spindle ref phase 2^(N-2) frame counts in advance.
    S    Suppress first spindle reference pulse.
    S    Write 2^(N-1) servo frames of SS & SD pulses only (50% of rev)
    S    Assert READ mode, with AGC ON.
    S    Enable spindle PLS feedback from first servo pulse.

GO TO STEP #3

STEP #3 Redefine AGC.

S    Wait 2^N - 2^(N-2) frame counts.
    S    Measure AGC control volts with ADC.
    S    Assert AGC HOLD mode.
    S    Use measured AGC volts via DAC as AGC control volts to RPD.

GO TO STEP # 4

MODIFIED DIBIT OR QUADRATURE
DIBIT SERVO PATTERN

STW BLOCK DIAGRAM

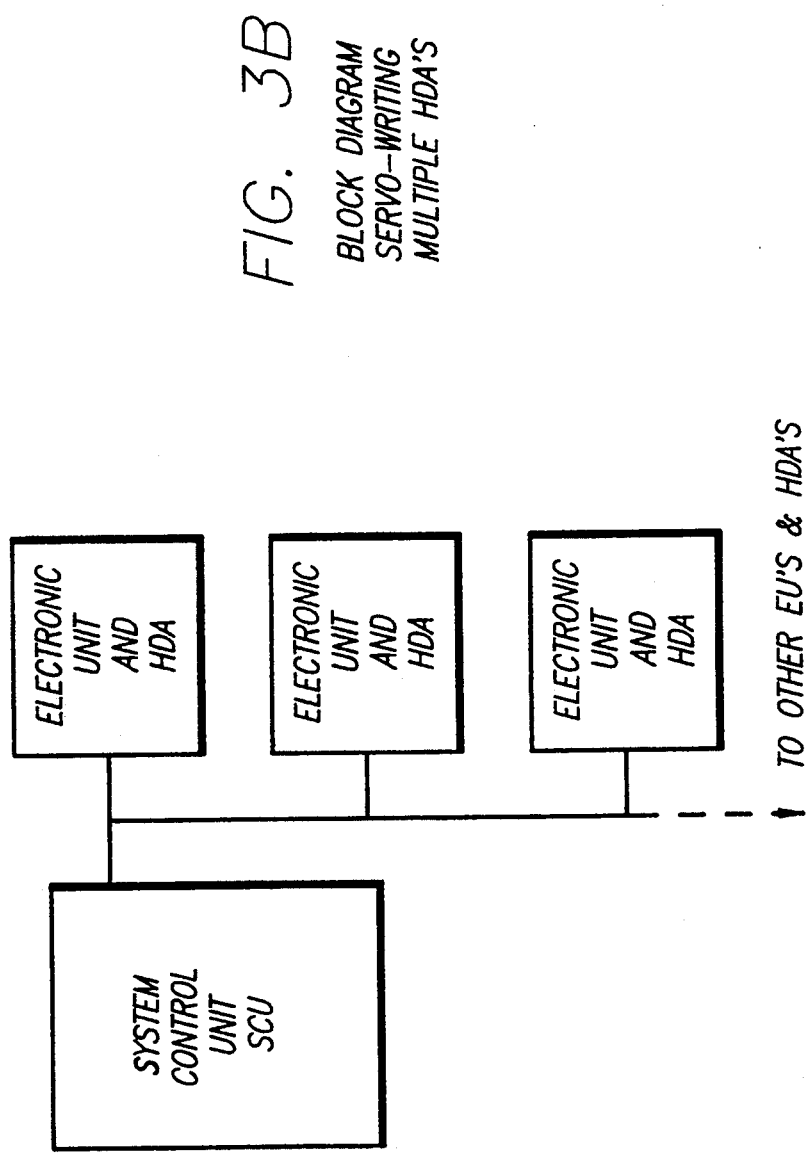

FIG. 4(a)

SERVO TRACK WRITER FLOW CHART

Assumptions:

1. Number of frames per revolution=2^N
2. Master clock frequency=F
3. Synthesiser locked to F; and tunable in small increments
4. Reference for spindle phase lock servo is derived from F
5. Spindle reference can undertake instantaneous phase jumps.
6. Medium is dc erased with known polarity
7. P represents parrallel operation, S sequential operation.
8. Time for 1 revolution=T

STEP #1: Acquire Spindle Phase Lock, & Initialize AGC

P    Spin disc to approx final speed._____(1)
P    Move head to outside track to be recorded
P    Bypass FIFO's in all electronic units (EU's)
P    Write over 1 rev of contiguous dibits
P    Assert READ mode
P    Assert AGC on
P    Wait for AGC to settle
P    Measure AGC control volts

FIG. 4(b)

- P   Measure AGC HOLD
- P   Use measured AGC volts via DAC as AGC control volts to RDP.
- P   Assert WRITE mode & DC erase at least 1 rev with pos lw.
- P   Write a scratch dibit (transitions #1 & #2) with servo head.
- P   Assert READ mode in R/W & Read Pulse Detector (RPD) chips.
- P   Use RPD to sense scratch dibit
- P   Enable spindle Phase Lock Servo (PLS) feedback from transition #1
- P   Lock Spindle Phase Lock Servo (PLS) to transition #1.
- P   Wait for spindle PLS to aquire lock condition.

*FIG. 4(c)*

STEP #2 Write 50% of master servo track, & erase scratch dibit.

For every HDA to be servo written: (HDA Loop).

S   Xmit read signal pulses to System Control Unit (SCU).
S   Wait for transition #1
S   Start timer in SCU
S   Stop timer on transition #1
S   Calculate fractional error, D(0) in period.
S   Set synthesiser to F*(1-D(0)).
S   Wait $2^N - 2^{(N-2)}$ frame counts (i.e. 75% of a revolution).
S   Adjust spindle ref phase $2^{(N-2)}$ frame counts in advance.
S   Suppress first spindle reference pulse.
S   Write $2^{(N-1)}$ servo frames of SS & SD pulses only (50% of rev)
S   Assert READ mode, with AGC ON.
S   Enable spindle PLS feedback from first servo pulse.

GO TO STEP #3

FIG. 4(d)

STEP #3 Redefine AGC.

§ Wait $2^N - 2^{(N-2)}$ frame counts.

§ Measure AGC control volts with ADC.

§ Assert AGC HOLD mode.

§ Use measured AGC volts via DAC as AGC control volts to RPD.

GO TO STEP #4

FIG 4.(e)

STEP #4: Measure & correct for Time Delay in SCU, EU, & Cables.

- Wait $2^{(N-1)}$ frame counts.
- Set FLAG
- Wait for first servo pulse.
- Set I=1
- Trigger from negative SS peak.
- Assert WRITE mode.
- Write N+ & Q- pulses Tn+ & Tq- from trigger.
- Assert READ mode
- I=$2^{(N-1)}$? —— I=I+1 —— NO
- YES
- If FLAG is reset, GO TO END of STEP #4.
- Wait for first servo pulse.
- Set Tacc=0.
- Set I=1

FIG. 4(f)

- S  Trigger from negative SS peak.
- S  Measure time, T(1), to negative N+ pulse.
- S  Set Tacc=Tacc+T(I).
- S  I=2^(N-1)?  ———I=I+1——— NO
       —YES—
- S  Calculate Tavg=Tacc/2^(N-1).
- S  Set Dt=Tavg-Tn+=T delay units.
- S  Advance Write Data Pattern & Write Gate from
     SCU by T delay units ref to frame boundry in SCU
- S  FLAG set? ———YES——— Reset FLAG
- S  NO
- S  Reset FLAG...END STEP #4
- GO TO STEP #5

FIG. 4.(g)

STEP#5: Write remainder of Master Servo Track.

- Set K=1
- Wait for first servo pulse.
- Read servo frames & count $2^N - 2^{(N-K)}$ frames.
- Start SCU timer.
- Wait for first servo transition & stop timer
- Measure fractional error D(K) in time.*
- Set synthesiser at $F*(1-D(K))$.
- Read servo frames & count $2^N - 2^{(N-K)}$ frames.
- K=N? —YES— Write $2^{(N-K)}$ frames.
- NO
- Write $2^{(N-K-1)}$ frames.
- K=N? —NO— Set K=K+1
- YES
- Verify Master Servo Track.

FIG. 4(h)

§ Track OK? ——— NO ——— DC Erase ——— GO TO STEP #1 ——— (1)
§ — YES —
§ END Master Servo Track Writing.

End loop if last HDA, else GO TO beginning of step #2.

GO TO STEP #6

*Note: This is not equal to the speed error, dK. In fact, $D(K)=2d_K-1-d_K-2$ as shown in the Appendix, where $d_k$ is the speed error in revolution k.

STEP #6 Acquire Phase Lock in Servo Data Separator.

§ Assert READ mode
§ Download
§ Wait for Servo Data PLL to lock up SS.
§ Set J=1.
§ CALL SUBROUTINE AGC Reset.

GO TO STEP #7

FIG. 4(i)

STEP #7 Measure & correct for time delays in EU.

- Enable FIFO in EU.
- Enable spindle PLS feedback from frame/rev counter.
- Change phase of spindle PLS reference accordingly.
- Set Frame Clock Delay=Pmax master clock pulses.
- Download Write Gate & Read Window parameters to EU.
- Phase Lock Servo Data PLL to Q- dibit.
- Write Track #J, Part 1.
- Assert READ mode
- K=1
- Set Taccq=0
- Trigger from Q+ dibit negative peak
- Start timer in SCU.
- Wait for Q- dibit negative peak.
- Stop timer, time=Tq
- Set Tacc=Tacc+Tq
- K=2^N — NO — K=K+1

FIG. 4(j)

- S   YES
- S   Calculate Tavgq=Taccq/2^N
- S   Calculate Dtq=tgnom-tavgq
- S   Store Dtq (=P delay units) in EU memory
-     End Loop

STEP #8 Write remainder of servo tracks

Simultaneously on all HDA's

- P   Set J=1
- P   Advance Delayed Frame Clock by P delay units.
- P   Download appropriate parameters for parts 1 & 2
- P   Phase adjust Servo Data PLL
- P   Write track J, Part 1
- P   Assert full track AGC control voltage.
- P   Phase adjust Servo Data PLL
- P   Write track J, Part 2.

For example, if:

| | | |
|---|---|---|
| H | = # of HDA's to be servo written. | = 16. |
| $2^N$ | = # of servo frames per revolution. | = 2048 (N=11) |
| Nt | = total # of servo tracks. | = 2000. |
| Ts | = time to move 1 data track pitch. | = .033 secs. |
| T | = period of 1 revolution. | = .0165 secs. |
| Tsu | = spindle spin up time to phase lock. | = 30 secs. |

Total Servo-Write Time:

$Tsw = Tsu + (N+8.75)*H*T + Ts + Tn*(2*T + Ts)$
    = 30 + 5.21 + .033 + 132 seconds.
    = 167.2 seconds
    = 10.5 secs per HDA

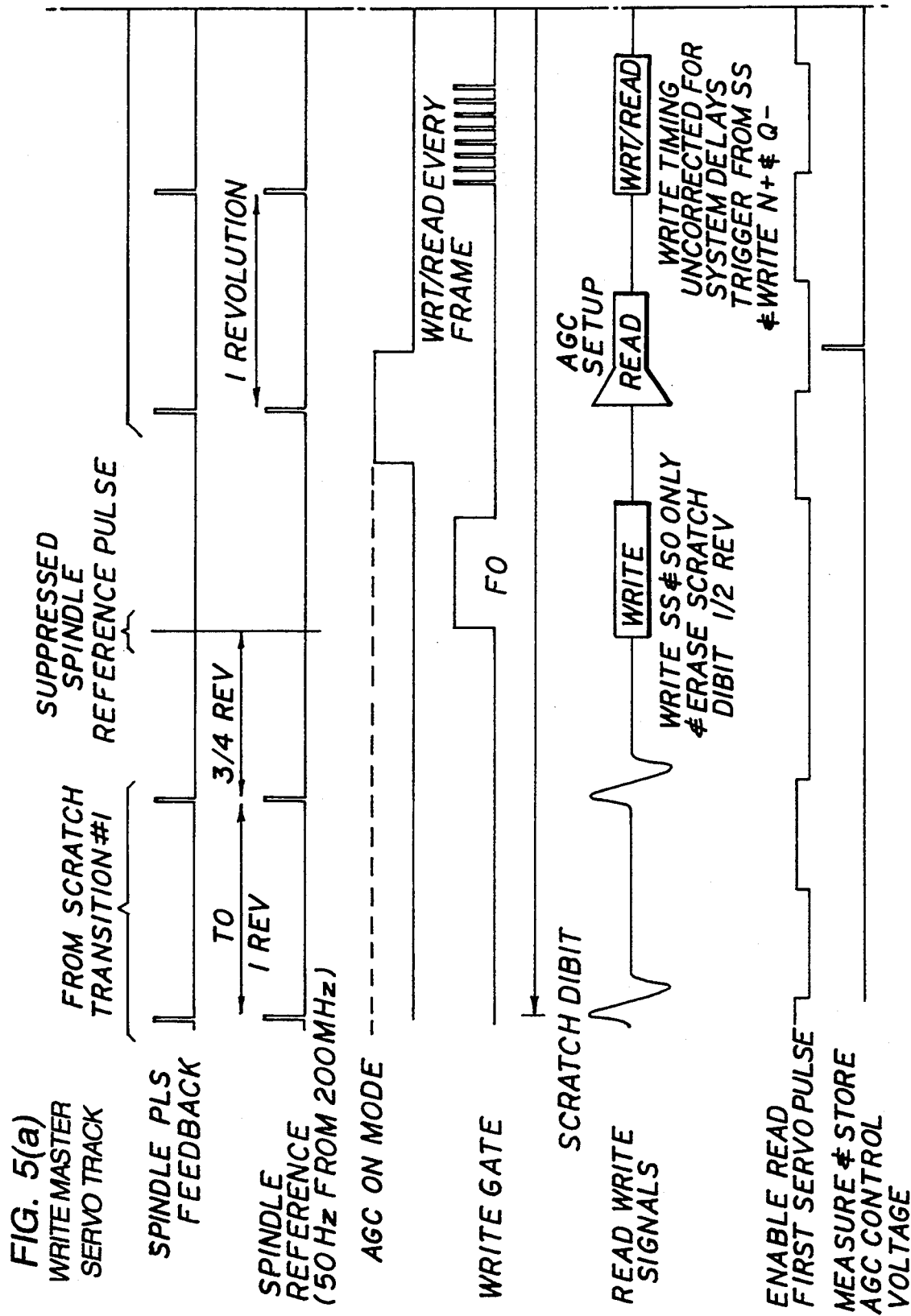
FIG. 5(a) WRITE MASTER SERVO TRACK

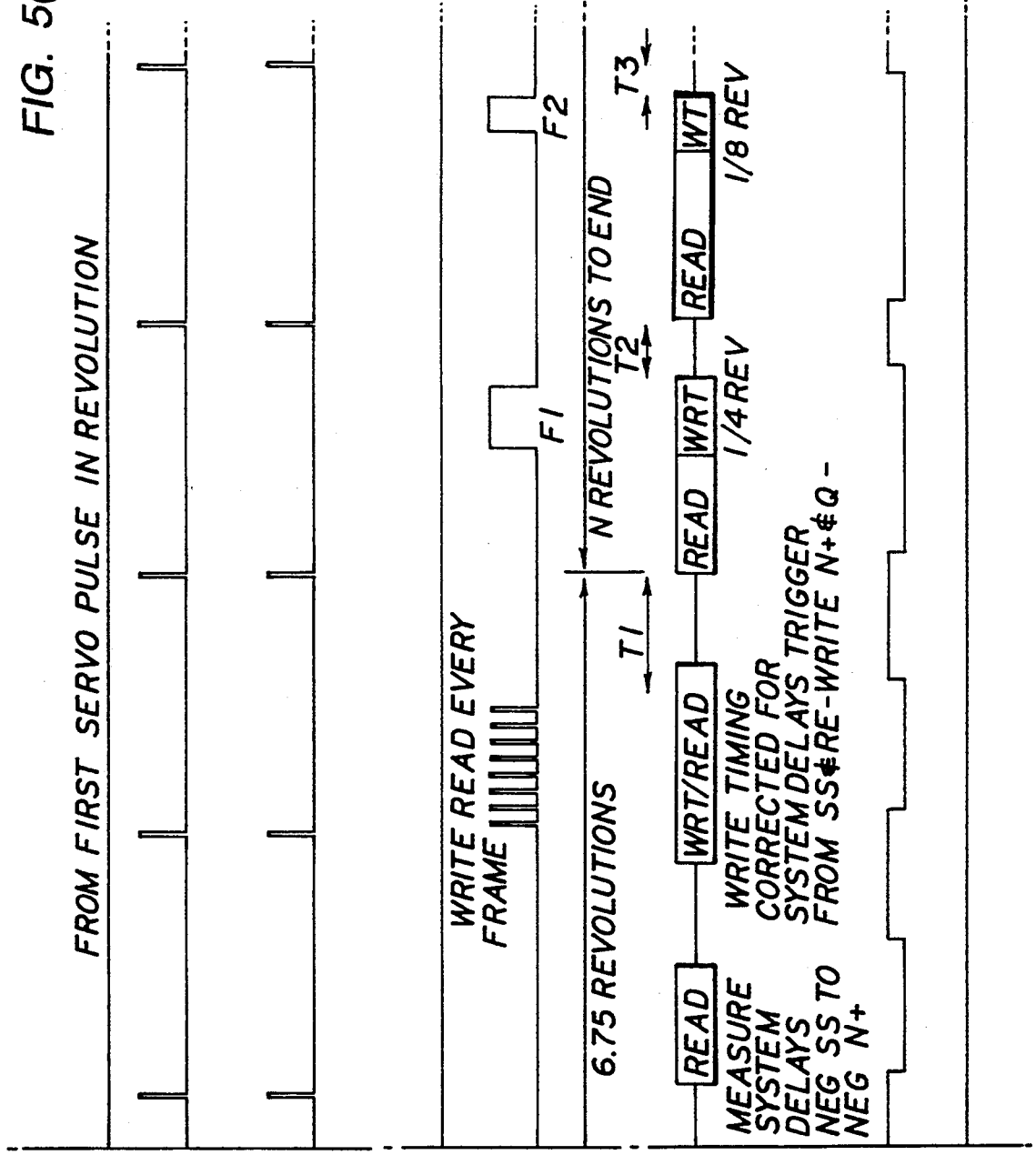

FIG. 5(c)

NOTES

1. Nominal period of 1 revolution = T.
2. By definition, where Dx is fractional error in Tx:

$T0 = T*(1+D0)$
   $T1 = T*(1+D1)$
   $T2 = T*(1+D2)$ etc.

3. F is nominal master clock write frequency
4. By definition:

$F0 = F*(1-D0)$
   $F1 = F*(1-D1)$
   $F2 = F*(1-D2)$

5. This mode Master servo track writing begins when spindle PLS has settled
7. Sequence of master servo track writing is as follows:

First 6.75 revolutions:
   (a) Measure period
   (b) Over-write scratch dibit with 1/2 track of SS & SD dibits
   (c) Set up AGC
   (d) Trigger from SS neg & write N+ & Q- dibits
   (e) Measure timing error in previous N+ dibit
   (f) Trigger from SS neg & re-write N+ & Q- with corrected timing Remaining revolutions:
   Rev 1: Write $2^{\wedge}(N-2)$ frames
   Rev 2: Write $2^{\wedge}(N-3)$ frames
   Rev K: Write $2^{\wedge}(N-K-1)$ frames
   Rev N-1: Write 1 frame
   Rev N: Write 1 frame Total revolutions = 6.75 + N

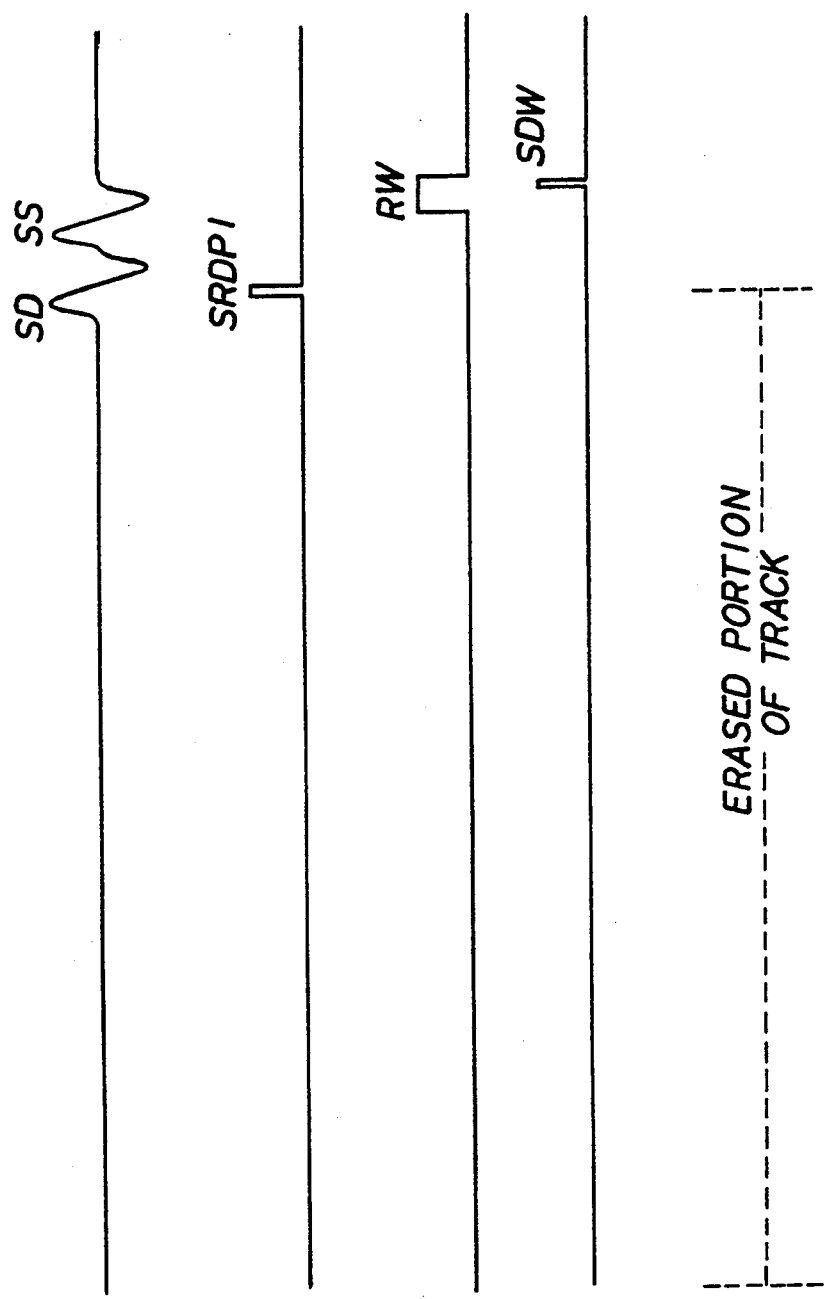
FIG. 6A  TIMING FOR PULSE IN REVOLUTION

FIG. 6(b)

1. All times (t1 thru t3) referenced to Delayed Frame Pulse. Delay lines are used to provide 5 ns. timing resolution.

2. This mode (trial write of track 1) ends after counting off 50% of total # of frames for one revolution.

3. This timing diagram assumes first servo pulse after erased area has been detected.

4. This mode is initiated on reciept of first servo pulse after erased area.

5. t2 to t3 must be greater than the WRITE to READ recovery time of the read circuitry.

6. The timing error is measured with the SCU timer and used to ensure correct frame delay. P. is programmed for re-writing this master servo track segment and writing all subsequent master servo track segments.

7. Write Data is LOW when Write Gate is de-asserted.

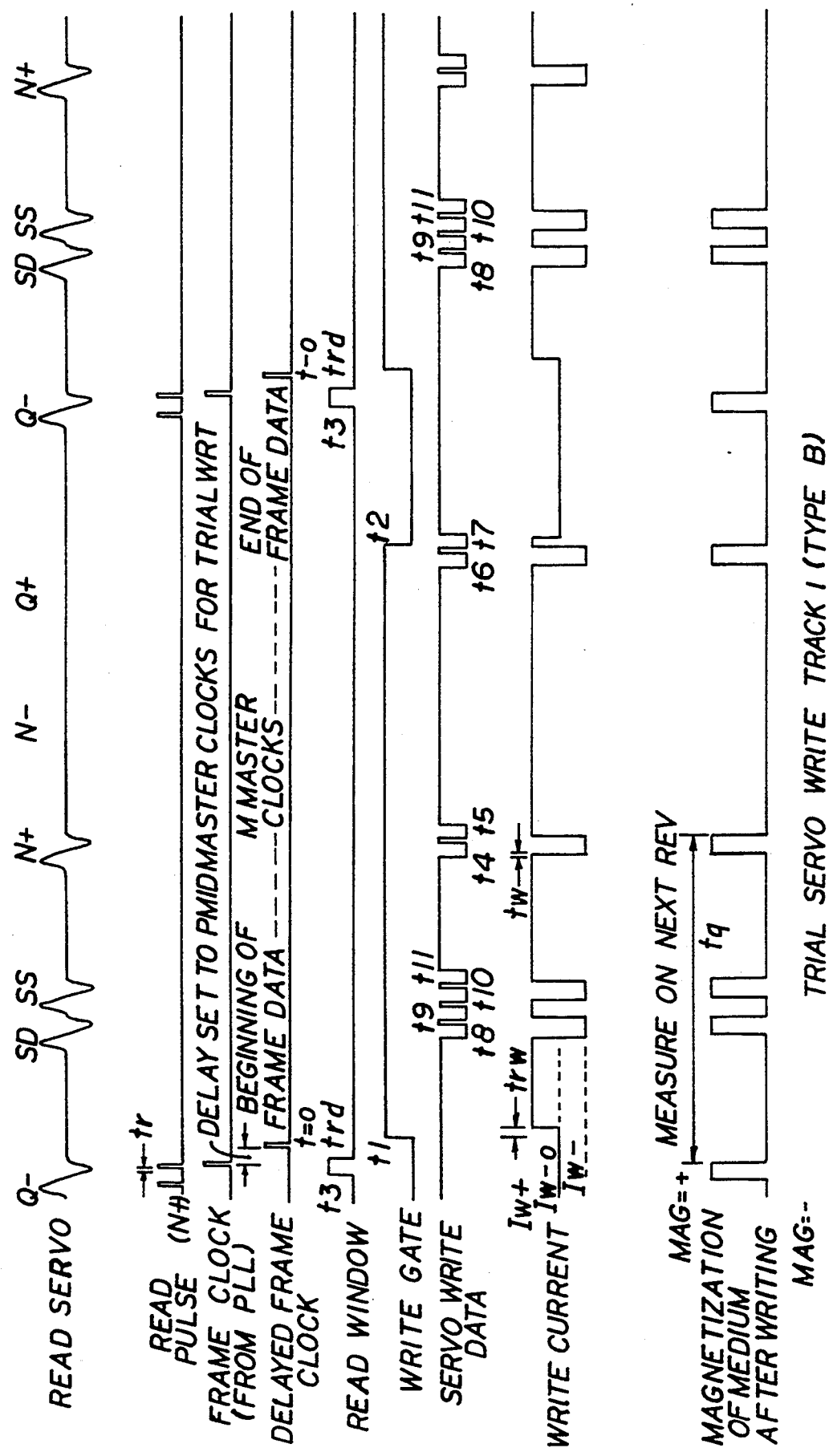

FIG. 7(b)

NOTES:

1. All times (t1 thru t12) referenced to Delay Frame Pulse. Delay Lines are used to provide 5 ns. resolution in timing.
2. This mode is initiated on receipt if ASRP- after seek track from 0.
3. This timing diagram assumes EU state machine counts frames on Q- dibit at beginning of track.
4. This mode is terminated on reciept of ASRP+
5. tr+tw (& cable delays) is measured in next revolution.
6. Negative Write Current is assumed to create positive output pulses.
7. Write current changes polarity on each Negative Write Data transition.
8. trw is the READ to WRITE recovery time of the head chip.
9. t2 to t3 must be greater than the READ to WRITE recovery time of read path.
10. Write current changes from + to 0 and 0 to + do not affect the magnetization of the medium.
11. Medium is assumed pre-erased to Negative Magnetization state.
12. Magnetization at the Q- location is because servo head is approx. double the data track pitch, therefore leaving an almost half data track width Q- transition pair, from prior track recording.
13. tq is measured in next rev. Avge tq subtracted from expected tq to assess time delays.

FIG. 8(a)

FIG. 8(b)
NOTES:

1. All times (t1 thru t12) referenced to Delayed Frame Pulse. Delay Lines are used to provide 5 ns. resolution in timing.

2. This mode is initiated on receipt ASRP- after seek from track 0.

3. This timing diagram assumes EU State Machine is synchronized to Q- dibit at beginning of track.

4. This mode continues to part 2 of track type B without interruption.

5. t2 to t3 must be greater than the WRITE to READ recovery time of the read path.

6. M clocks must be less than SD to SD time by at least three times the speed tolerance.

7. Servo Write Data is LOW when WRITE GATE is dis-asserted.

1. All times (t1 thru t3) referenced to Delayed Frame Pulse. Delay lines are used to provide 5 ns. timing resolution.

2. This mode ends after exhausting frame data.

3. This timing diagram assumes EU State Machine is synchronized to SS negative peak.

4. This mode is initiated contiguously with the end of part 1.

5. t2 to t3 must be greater than the WRITE to READ recovery time of the read circuitry.

6. Write current must be positive and present only at expected location. of N+ dibit.

7. Q- dibit is one half of others since only one half of head width reads it.

FIG. 10(b)

NOTES:
1. All times (t1 thru t12) referenced to Delayed Frame Pulse. Delay Lines are used to provide 5 ns. resolution in timing.
2. This mode is initiated on receipt of ASRP- after a seek.
3. This timing diagram assumes EU State Machine is synchronized to N+ negative peak.
4. This mode continues to part 2. Track Type C. without interruption.
5. tr+tw (& cable delays) is automatically measured after servo-write of master servo track & before servo-writing remainder.
6. Negative Write Current is assumed to create positive output pulses.
7. Write current changes polarity on each Negative Write Data transition.
8. trw is the READ to WRITE recovery time of the head chip.
9. t2 to t3 must be greater than the WRITE to READ recovery time of the read path.
10. Write current changes from + to 0 and 0 to + do not affect the magnetization of the medium.
11. medium is assumed pre-erased to negative magnetization state.
12. magnetization at N+ location is because servo head is approx. double the data track pitch, therefore leaving an almost half track width N+ transition pair from prior track recording.
13. When part 1 is complete, Part 2 of Servo-Writing Type C track will remove the vestigal N+ magnetization.
14. tr+tw is small, but unknown: after measuring tr+tw. td is automatically adjusted so that tr+tw+td is fixed.
15. M clocks must be less than SD to SD time by at least 3 times the speed tolerance.

FIG. 11(b)

1. All times (t1 thru t3) referenced to Delayed Frame Pulse. Delay Lines are used to provide 5 ns. timing resolution.

2. This mode ends after frame data is exhausted.

3. This timing diagram assumes EU State Machine is synchronized to the SS negative peak.

4. The mode is initiated contiguously with the end of part 1. Track Type C 5. t2 to t3 must be greater than the WRITE to READ recovery time of the read circuitry.

6. Write current must be positive and present only at expected location of N+ dibit.

7. N+ dibit is one half of others since only one half of head width reads it.

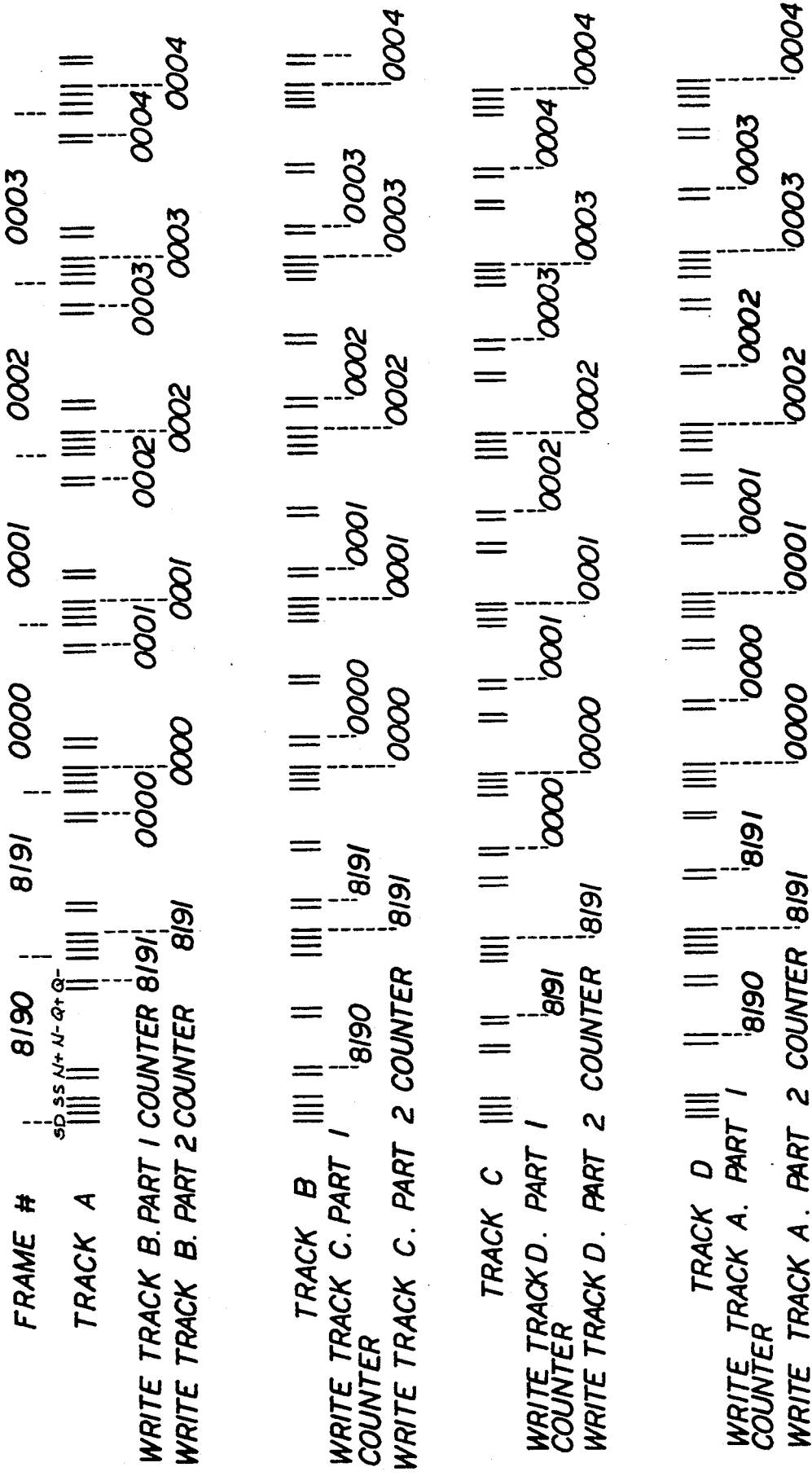
FIG. 12    FRAME COUNT TIMING

FIG. 13(a)

| Trigger Count | | Activity | FIG # |
|---|---|---|---|
| 1 | 00001/00002 | Write 1/2 Mstr Trk w/o N+, Q- | 5 |
| 2 | 00003/00004 | Look for 1st SDW+ after SRDP1- | 6A |
| 3 | 00005/01027 | Trial Write N+,Q- in 1/2 Mstr Trk | 6 |
| 4 | 01028/01029 | Look for 1st SDW+ after SRDP1- | 6A |
| 5 | 01030/03588 | Measure Timing Errors | 6 |
| 6 | 03589/03590 | Look for 1st SDW+ after SRDP1- | 6A |
| 7 | 03590/46126 | Re-Write N+,Q- with correct Timing | 6 |
| | | Set Up RPRST=512, WPRST=256 | |
| 8 | 04613/04614 | Look for 1st SDW+ after SRDP1- | 6A |
| 9 | 04615/05638 | Read 1/2 Master Track | 5 |
| | | Set Up RPRST=512, WPRST=256 | |
| 10 | 05639/05640 | Look for 1st SDW+ after SRDP1- | 6A |
| 11 | 05641/06663 | Read 1/2 Master Track | 5 |
| 12 | 06664/06665 | Write 1/4 Master Track | 5 |
| | | Set Up RPRST=768, WPRST=128 | |
| 13 | 06666/06667 | Look for 1st SDW+ after SRDP1- | 6A |
| 14 | 06668/08203 | Read 3/4 Master Track | 5 |
| 15 | 08204/08205 | Write 1/8 Master Track | 5 |
| | | Set Up RPRST=896, WPRST=64 | |
| 16 | 08206/08207 | Look for 1st SDW+ after SRDP1- | 6A |
| 17 | 08208/09999 | Read 7/8 Master Track | 5 |
| 18 | 10000/10001 | Write 1/16 Master Track | 5 |
| | | Set Up RPRST=960, WPRST=32 | |
| 19 | 10002/10003 | Look for 1st SDW+ after SRDP1- | 6A |
| 20 | 10004/11923 | Read 15/16 Master Track | 5 |
| 21 | 11924/11925 | Write 1/32 Master Track | 5 |
| | | Set Up RPRST=992, WPRST=16 | |
| 22 | 11926/11927 | Look for 1st SDW+ after SRDP1- | 6A |
| 23 | 11928/13911 | Read 31/32 Master Track | 5 |
| 24 | 13912/13913 | Write 1/64 Master Track | 5 |

FIG. 13(b)

| Contents of Segment #1 | #2 | Adrress | # of Segs | START | JMPA | STOP | Channel Assignment RW WG WD CK | | | |
|---|---|---|---|---|---|---|---|---|---|---|
| NM2N | 127x(4N) | 0000/0085 | 128 | PC | | WG- | 0 | 1 | 2 | 3 |
| N | | 0000/0019 | 1 | SRDP1- | | SDW+ | 20 | 21 | 22 | 23 |
| N | | 0000/0019 | 1 | SDW- | | SDW+ | 4 | 5 | 6 | 7 |
| N | | 0000/0019 | 1 | SRDP1- | | SDW+ | 20 | 21 | 22 | 23 |
| N | | 0000/0019 | 1 | SDW- | | WD+ | 8 | 9 | 10 | 11 |
| N | | 0000/0019 | 1 | SRDP1- | | SDW+ | 20 | 21 | 22 | 23 |
| N | | 0000/0019 | 1 | SDW- | | SDW+ | 4 | 5 | 6 | 7 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| DL | 64*(4N) | 0086/0129 | 65 | | RECNT | WECNT | 16 | 17 | 18 | 19 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| DL | 32*(4N) | 0086/0129 | 33 | | RECNT | WECNT | 16 | 17 | 18 | 19 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| DL | 16*(4N) | 0086/0129 | 17 | | RECNT | WECNT | 16 | 17 | 18 | 19 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| DL | 8*(4N) | 0086/0129 | 9 | | RECNT | WECNT | 16 | 17 | 18 | 19 |
| N | | 0000/0019 | 1 | SRDP1- | | SDW+ | 20 | 21 | 22 | 23 |
| N | | 0000/0019 | 1 | SDW- | | SDW+ | 12 | 13 | 14 | 15 |
| DL | 4*(4N) | 0086/0129 | 5 | | RECNT | WECNT | 16 | 17 | 18 | 19 |

FIG. 13(c)

NOTES:

1. "N"=Normal Frame; "M"= Mark Frame
2. Nomenclature 64*(4N) means a pattern of 4 Normal Frames repeated 64 times.
3. Nomenclature NM2N means pattern of Normal, Mark, and 2 normal frames.
4. The actual signal patterns for Normal and Mark frames depend on the activity.
5. RECNT is the end count of the Servo Read Down Counter.
6. WECNT is the end count of the Servo Write Down Counter.
7. SRDP1 is the first servo pulse in a revolution.
8. SDW+ is the positive edge of the SDW pulse.
9. SDW- is the negative edge of the SDW pulse.
10. DL is the delay from SS negative peak to SD positive peak, including system delays.
11. WG- is the negative edge of the Write Gate.
12. RPRST is the present value of the Servo Read Down Counter.
13. WPRST is the present value of the Servo Write Down Counter.
14. WD+ is the positive edge of SERVO WRITE DATA (WD)

FIG. 14(a)

| Trigger Count | Activity | FIG # | Contents of Segment #1 | #2 | #3 |
|---|---|---|---|---|---|
| 0001/0002 | Trial Write Part 1 of Track Type B | 7 | NM2N | 102*(10N) | |
| 0003/0004 | Measure Timing Errors | 7 | 4N | 102*(10N) | |
| 0005/0006 | Write Track Type B, Parts 1 and 2. | 8,9 | NM2N | 102*(10N) | NM2N |
| 0007/0008 | Write Track Type C, Parts 1 and 2 | 10,11 | NM2N | 102*(10N) | NM2N |
| 0009/0010 | Write Track Type D, Parts 1 and 2 | | NM2N | 102*(10N) | NM2N |
| 0010/0011 | Write Track Type A, Parts 1 and 2 | | NM2N | 102*(10N) | NM2N |

Continue until all tracks are written, unless new patterns are required, in which case Stop and Reload Pattern Generator.

| #4 | Adress | # of Segs | STT | STP | Channel Assignment RW WG WD CK | | | |
|---|---|---|---|---|---|---|---|---|
| | 000/0369 | 103 | ASRP- | ASRP+ | 0 | 1 | 2 | 3 |
| | 000/0369 | 103 | ASRP- | ARSP+ | 4 | 5 | 6 | 7 |
| 102*(10N) | 000/0739 | 206 | ASRP- | END | 0 | 1 | 2 | 3 |
| 102*(10N) | 000/0739 | 206 | ASRP- | END | 8 | 9 | 10 | 11 |
| 102*(10N) | 000/0739 | 206 | ASRP- | END | 12 | 13 | 14 | 15 |
| 102*(10N) | 000/0739 | 206 | ASRP- | END | 16 | 17 | 18 | 19 |

NOTES:

1. "N"=Normal frame; "M"=Mark Frame
2. Nomenclature 102*(10N) means a pattern of 10 Normal Frames repeated 102 times.
3. Nomenclature NM2N means a pattern of Normal Frame, Mark Frame and 2 Normal Frames.
4. The actual signal patterns for Normal and Mark Frames depend on the activity.
5. S- is the negative edge of the spindle reference pulse.
6. S+ is the positive edge of the spindle reference pulse.
7. END is the end of the Pattern Generator data.

FIG. 16

|          | EG | SD | SS   | C0.1 | C0.0 | C1.1 | C1.0 | C2.1 | C2.0 | N+   | N-   | Q+   | Q-   |
|----------|----|----|------|------|------|------|------|------|------|------|------|------|------|
| AB       | I  | W  | W    | I    | W    | I    | W    | I    | R(T) | I    | W    | R(T) | I    |
| B(REV1)  | I  | W  | W    | I    | R(T) | I    | W    | W    | I    | I    | R(T) | I    | Q-   |
| B(REV2)  | I  | R  | R(T) | I    | W    | I    | I    | I    | I    | I    | I    | I    | I    |
| BC       | I  | W  | W    | I    | W    | I    | I    | R(T) | I    | W    | I    | I    | R(T) |
| C(REV1)  | I  | W  | W    | I    | R(T) | W    | I    | W    | I    | R(T) | I    | W    | I    |
| C(REV2)  | I  | R  | R(T) | I    | W    | I    | I    | I    | I    | I    | I    | I    | I    |
| CD       | I  | W  | W    | I    | W    | W    | I    | R(T) | I    | I    | I    | R(T) | I    |
| D(REV1)  | I  | W  | W    | I    | R(T) | W    | I    | I    | W    | I    | R(T) | I    | W    |
| D(REV2)  | I  | R  | R(T) | I    | W    | I    | I    | I    | I    | I    | I    | I    | I    |
| DE       | I  | W  | W    | I    | I    | W    | I    | I    | R(T) | W    | I    | I    | R(T) |
| E(REV1)  | I  | W  | W    | W    | I    | R(T) | I    | I    | W    | R(T) | I    | W    | I    |
| E(REV2)  | I  | R  | R(T) | I    | I    | W    | I    | I    | I    | I    | I    | I    | I    |
| EF       | I  | W  | W    | W    | I    | W    | I    | I    | R(T) | I    | W    | R(T) | I    |
| F(REV1)  | I  | W  | W    | R(T) | I    | W    | I    | W    | I    | I    | R(T) | I    | W    |
| F(REV2)  | I  | R  | R(T) | W    | I    | I    | I    | I    | I    | I    | I    | I    | I    |
| FG       | I  | W  | W    | W    | I    | I    | I    | R(T) | I    | W    | I    | I    | R(T) |
| G(REV1)  | I  | W  | W    | R(T) | I    | I    | W    | W    | I    | R(T) | I    | W    | I    |
| G(REV2)  | I  | R  | R(T) | W    | I    | I    | I    | I    | I    | I    | I    | I    | I    |
| GH       | I  | W  | W    | W    | I    | I    | W    | R(T) | I    | I    | W    | R(T) | I    |
| H(REV1)  | I  | W  | W    | R(T) | I    | I    | W    | I    | W    | I    | R(T) | I    | W    |
| H(REV2)  | I  | R  | R(T) | W    | I    | I    | I    | I    | I    | I    | I    | I    | I    |
| HA       | I  | W  | W    | I    | I    | I    | W    | I    | R(T) | W    | I    | I    | R(T) |
| A(REV1)  | I  | W  | W    | I    | W    | I    | R(T) | I    | W    | R(T) | I    | W    | I    |
| A(REV2)  | I  | R  | R(T) | I    | I    | I    | W    | I    | I    | I    | I    | I    | I    |

R = Read; W = Write, R(T) = Read and Trigger for PLL, I = Idle

All trigger pulses for PLL are assumed to be from the last transition of the designated pair or burst.

APPARATUS FOR, AND METHODS OF, RECORDING SIGNALS IN TRACKS ON A MEMORY MEMBER WITHOUT A REFERENCE INDEX

This is a division of application Ser. No. 07/596,722 filed Oct. 12, 1990, abandoned.

This invention describes methods of writing tracks in disc drives. The method requires neither reference members such as a clock head, nor reference indices such as a clock track. Furthermore, the system writes tracks using only one head. The first track (the master track) may be written in a special way so that a closed (i.e. splice free) track can be achieved.

BACKGROUND TO THE INVENTION

Prior Art

Prior Art Track Writers (STW) use a clock head which is captive to the STW and which is temporarily brought adjacent to one of the disc surfaces during track writing. This requirement compromises the mechanical integrity of the head disc assembly (HDA) since provision must be made in the HDA design to allow access for the STW Clock Head.

A clock track is written with the clock head using a trial and error process. The clock track is preferably "splice free". Usually a tolerance of some $+/-30$ nanoseconds discontinuity is allowed at the splice point. Since spindle motor speed variations are usually $+/-0.05\%$ and the nominal revolution period is 16.67 milliseconds, the period of one revolution varies by about $+/-8$ microseconds. An index available from the motor or from a "scratch" transition pair written with the head is used to drive a phase lock loop (PLL) which multiplies this approximately 60 Hz clock to a much higher frequency. A successful clock is written only when the correct number of the said high frequency clocks has elapsed between successive indices and the time discrepancy of the last clock time is less than 30 nanoseconds. This process takes up to a minute because of the large discrepancy between the splice error permitted and the spindle speed tolerance. The invention avoids the use of a clock head and also avoids the need for a clock track. The clock track is replaced by a "Master Track" which is written in about 20 revolutions or 0.33 seconds.

A description of a prior art clock writing procedure is available in U.S. Pat. No. 3,540,022 issued to James K. Berger. Another prior art system, U.S. Pat. No. 4,131,920, also issued to James K. Berger, discloses an improved method of clock writing. However, this still relies on trial and error for splice free tracks and, although clock writing is accomplished with a sealed HDA, it has the serious disadvantage that an expensive clock head must be included with each disc drive.

SUMMARY OF THE INVENTION

In this invention, a head records a track (e.g. a servo track) in a memory member outside of a clean room without using reference indices such as clock signals. In each of a plurality of cyclical movements, signals (e.g. servo signals) are recorded in the track in an individual number of frames. Thereafter, the distance of the unrecorded portion of the track is determined. In the next cyclical movement, the head records signals in an individual number of frames contiguous to the frames previously recorded, in a track distance dependent upon such individual number relative to the number of frames still unrecorded and upon the distance determined for the unrecorded track portion. In a last cyclical movement, the head records a single frame with a particular spacing between the first and last frames. In a specific embodiment, $2^{N-K}$ frames may be recorded in the K cyclical movement. Additional tracks may thereafter be recorded by the head in a single revolution with individual patterns of signals.

In another embodiment, the individual number of frames continue to be recorded in the first track in each cyclical movement until the frames occupy a distance, within particular limits, dependent upon the unrecorded length of the track and upon the individual number of frames relative to the number of frames still unrecorded. In a further embodiment, sectors and data sectors following the sectors are recorded with patterns of signals in progressive cyclical movements in a manner similar to the recording of the sectors in such revolutions in the first embodiment.

Various methods are described, one of which can write this first track-in as little as 20 revolutions. Other methods take longer (up to 150 revolutions) but achieve greater accuracy. The head is then moved a distance approximately one half of the head width. This distance will either be equal to the desired data track pitch or one half of the desired data track pitch. Now, by multiplexing between reading the vestige of a preceding track and writing the present track, the present track may be made phase synchronous with the first track. While still located at the present track, a further revolution is used selectively to erase the vestige of the unwanted transitions of the prior track. This process continues until all tracks are written.

The unit to be written has been assembled to the stage in which the head assembly including head read/write electronics has already been attached together with the spindle motor and discs. This unit is called the Head Disc Assembly (HDA). Means are available to position the head so that writing can take place outside the clean room.

One such positioning means is disclosed and claimed in a patent application filed by Robert Hazel, Gajus Michelsoil and William Valliant on Oct. 12, 1990, for a system for positioning a head arcuately relative to a memory member such as a disc. Another such means is provided by units manufactured and used by International Business Machines (IBM), which extends the shaft for moving the head arcuately relative to the disc so that the shaft extends outside of the head disc assembly, and an optical encoder is temporarily attached to the shaft for the purpose of servo track writing.

The invention is designed to work with the sample to sample variations which occur in the manufacturing process. A special calibration technique removes the effect of variations in the head read/write electronics and other components.

The invention further provides for the option of sharing the most expensive electronic unit among several HDA's, so that throughput and costs are significantly improved.

DESCRIPTION OF FIGURES

FIG. 3B is a block diagram of a system included in this invention for recording signals simultaneously in tracks on a plurality of memory members such as discs outside of a clean room without the use of reference indices such as clock signals;

FIG. 4(a)–4(k) is a flow chart of the steps included in a method of this invention of using a single head to record a track on a memory member such as a disc;

FIG. 5(a)–5(c) constitutes time charts illustrating the relative times at which signals are recorded in a particular pattern in the track in successive revolutions of the track and in which signals recorded in the track are read from the track;

FIG. 6(a)–6(b) constitutes time charts illustrating how the signals are recorded on a trial basis in a particular pattern in one frame of the track, after the recording of the particular pattern in a particular portion (such as half) of the track, to determine the corrections which have to be made in the timing of the signals before the particular pattern of the signals is recorded in the remainder of the track;

FIG. 6A is a timing diagram illustrating the timing for the production of a timing pulse in a frame of the memory member such as the disc;

FIG. 7(a)–7(b) constitutes a time chart illustrating how signals are recorded on a trial basis in a frame in a second track adjacent to the first track, after the recording of the signals in the complete periphery of the first track, to determine the corrections which have to be made in the timing of the signals in the second track before signals are recorded in the second track with the desired timing;

FIG. 8(a)–8(b) constitutes a time chart illustrating how the signals are recorded in a frame in the second track in a single revolution of the track after the proper corrections have been made in the timing of such signals in accordance with the time chart shown in FIG. 7, the pattern of the signals in the second track being different from the pattern of the signals in the first track;

FIG. 9(a)–9(b) constitutes a time chart illustrating how the signals recorded in accordance with the timing chart shown in FIG. 8 are modified to eliminate signals which are recorded from the first track but which are not desired in the second track;

FIG. 10(a)–10(b) constitutes a time chart illustrating how signals are recorded in a frame in a third track in a single revolution of the track after the signals have been recorded in the second track, the pattern of the signals recorded in each frame in the third track being different from the patterns of the signals recorded in each frame in the first and second tracks;

FIG. 11(a)–11(b) constitutes a time chart illustrating how the signals recorded in accordance with the timing chart shown in FIG. 9 are modified to eliminate signals which are recorded from the second track but which are not desired in the third track;

FIG. 12 constitutes a timing chart which illustrates the individual patterns of the signals recorded in successive frames in each of the first, second and third tracks and in a fourth track and which illustrates the signals used to count the successive frames in each of the four (4) adjacent tracks;

FIG. 13(a)–13(c) is a chart illustrating the sequence of operation of the system shown in FIGS. 1–12 in recording signals in the different frames in a first track in a plurality of successive cyclical movements of a memory such as a disc;

FIG. 14(a)–14(c) is a chart illustrating the sequence of operation of the system shown in FIGS. 1–13 in recording signals in the different frames in second through fifth tracks adjacent to the first track in successive cyclical movements of the memory member after the recording of signals in the frames in the first track on the memory member;

FIG. 15(a)–15(b) is a schematic diagram illustrating the patterns of signals in a sector in each of a plurality of contiguous tracks which are used in the second embodiment of the invention; and FIG. 16 constitutes a chart illustrating how the signals are recorded in each of the sectors shown in the contiguous tracks in FIG. 15B.

PATTERNS

The methods of this invention will be illustrated for a popular type of pattern. This pattern is described as the modified dibit pattern by its originator, IBM. The pattern divides a revolution into an integral number of segments which we will call frames. When demodulated, the pattern produces 2 position signals which are periodic with a spatial period of 4 data track pitches. One position signal has a quadrature relationship to the other.

Figure 1:
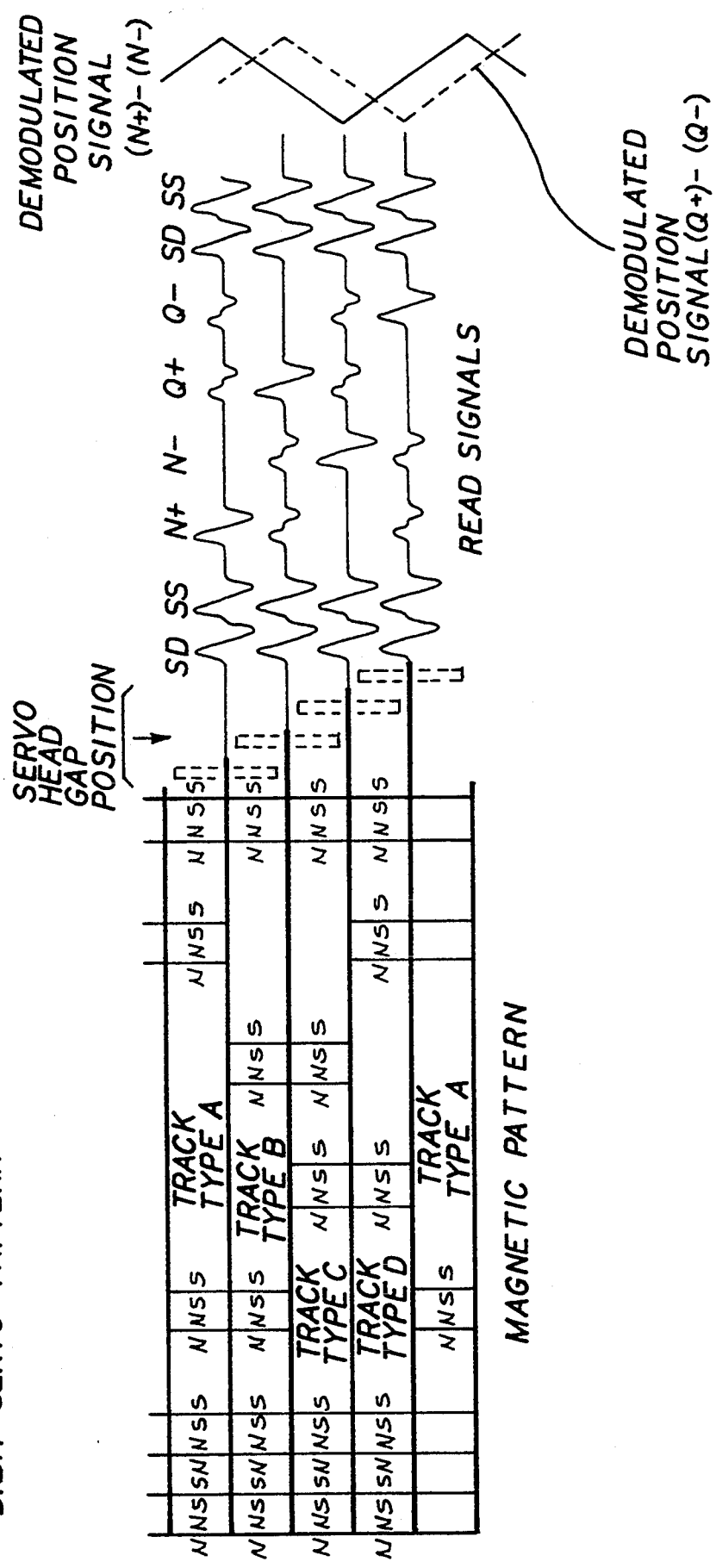
FIG. 1 schematically illustrates typical patterns of signals recorded by a head in adjacent tracks on a memory member such as a disc and further illustrates the patterns of signals which are recorded when the head is disposed midway between adjacent pairs of tracks or at different positions between the adjacent tracks.

Some typical frames and the corresponding read signals for various head locations are illustrated in FIG. 1. In any given track there are two types of frames: a normal frame and a mark frame. A frame consists of an even number of magnetic transitions with appropriate spacing between each transition.

For the purposes of illustration we will assume 1024 frames per revolution, a nominal revolution period of 16,384 microseconds, and a worst case speed tolerance of + or −0.05%. This implies a tolerance of + or −8 microseconds for the period of a revolution. The nominal frame time is 16 microseconds. It is desirable to control the frame time tolerance to within about 20 nanoseconds of the nominal value of 16 microseconds. A normal frame is typically comprised of 8 transitions as follows:

| .CP12 |
|---|
| Transition 1:) Data Transitions, SD |
| Transition 2:) |
| Transition 3:) Sync Transitions, SS |
| Transition 4:) |
| Transition 5:) Position Transitions, N+ or N− |
| Transition 6:) |
| Transition 7:) Position Transitions, Q+ or Q− |
| Transition 8:) |

A mark frame differs from a normal frame in that transitions 1 and 2 (the data transitions) are omitted.

Transitions 1 through 4 are in the same location on all tracks. Transitions 5 and 6 occupy (as a pair) one of 4 different locations. Transitions 7 and 8 (as a pair) occupy one of 4 different locations. As far as position transitions are concerned there are 4 types of frame, designated A,B,C,D. Each transition pair is called a dibit.

The surface is usually divided into 3 zones:
Outer Guard Zone
Data Zone
Inner Guard Zone In all zones, frames cycle through A,B,C,and D types on successive track locations. In all zones, a circumferential fiduciary is recorded by writing a unique short sequence of normal and mark frames once in each revolution. This sequence is usually less than 8 frames long. The detection of this sequence on playback results in an Index pulse.

In the data zone, all frames other than those in the Index sequence are normal frames. In the guard zones, a continuing guard zone sequence of normal and mark frames may be recorded for the remainder of the revolution after the index sequence. The guard zone sequence is different from the index sequence. The outer guard zone sequence is usually different from the inner guard zone sequence.

The head usually decodes index, outer zone, and inner zone patterns even as the head moves between tracks. Therefore, corresponding transitions on adjacent tracks should be well aligned.

It is desirable to hold the locations of the transitions within a frame to within + or −20 nanoseconds. Furthermore, it is desirable that corresponding transitions (i.e. servo data and sync transitions) on adjacent tracks be aligned within + or −20 nanoseconds so that readback of transitions while straddling between adjacent tracks does not compromise the sharpness of the signal in comparison to reading transitions in the same radial location in which they were recorded.

An example of transition timing (in nanoseconds) for normal frames of A,B,C,D tracks is tabulated below:

| Transition # | A | B | C | D |
| --- | --- | --- | --- | --- |
| 1 | 0 | 0 | 0 | 0 |
| 2 | 500 | 500 | 500 | 500 |
| 3 | 1000 | 1000 | 1000 | 1000 |
| 4 | 1500 | 1500 | 1500 | 1500 |
| 5 | 4000 | 4000 | 7000 | 7000 |
| 6 | 4500 | 4500 | 7500 | 7500 |
| 7 | 13000 | 10000 | 10000 | 13000 |
| 8 | 13500 | 10500 | 10500 | 13500 |

In the above table, the timing sequence for each of tracks A, B, C and D is indicated by the numbers in a vertical column below the letter designating that track.

The magnetization patterns for creating normal frames of types A, B, C, and D, are as depicted in the diagram below:

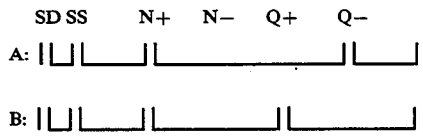

Each pair of transitions is called a dibit. The first two transitions are the data dibit, SD. The presence or absence of this pair corresponds to a normal or mark frame respectively. The third and fourth transitions are the sync dibit, SS. These transitions are present in every frame on all tracks. The first pair of position transitions is the called the N+ dibit, the second pair is called the N− dibit, the third pair is called the Q+ dibit, and the final pair is called the Q− dibit. When a complete revolution of transitions is written, it is desirable that there be minimal discontinuity between the first and last frames.

Typically, the recording (i.e. writing) of tracks is done by moving a head by a distance equal to the desired data track recording pitch for each successive track to be written. Typically, a track head width is approximately 1.7 times the dimension of the data recording track pitch.

FIG. 1 depicts the arrangement of magnetization transitions and the signal available from a head located in various positions, together with the demodulated servo signal.

WRITING ON MAGNETIC DISCS

When a disc whose magnetic layer (the medium) is magnetized in a positive direction is exposed to a positive direction magnetic field greater than the coercive force of the disk coating, the direction of the disk magnetization is changed to the negative direction after removal of the external field. A magnetic head typically consists of a ring of soft iron with a gap. Windings are threaded through the ring. Current in the windings induces a magnetic field across the gap. When the gap is small and is close to the magnetic disk it can create a highly localized field. If a head with no gap field is placed near a spinning medium of + magnetization, no change is induced in the medium. If a negative field is induced across the head gap by passing an appropriate polarity current through the head there is still no change in the state of the medium. Only a gap field of like direction to the medium magnetization, i.e. positive in this example, changes the state of magnetization in the medium. Collapsing this gap field to zero, either by reducing he head current to zero, or by removing the medium from the vicinity of the gap field leaves the affected region of the medium in the changed state.

A wide variety of integrated circuits (chips) are available which can be controlled to introduce either positive, negative, or zero current into the head windings. These chips can operate in at least 2 modes: Write, and Read. It is not possible to read and write simultaneously. The circuits are mounted very close to the heads. At any given time, the circuits can address only one of a number of heads. The magnitude of the write current, Iw, can be programmed by means external to the chip. The chip delivers a bipolar current of value Iw or −Iw in response to Write Data transitions fed to the chip. An example of such a chip for use with ferrite heads is manufactured by Silicon Systems Inc., Tustin, Calif. with Part Number 32R566R. For thin film heads, part number 32H523R, and also by Silicon Systems may be used. It is desirable to use this chip to write tracks since it is already mounted in the disc drive assembly at tile time writing is to commence. The invention can deal with either kind of chip.

These chips take a finite amount of time to switch from one mode to another or from one head to another. For almost all chips commonly used, this switch time is less than 1000 nanoseconds. This time can be reduced, if desired, by introducing an appropriate d.c. offset which adapts to the recovery characteristic of the particular chip sample, and/or by introducing a waveform which cancels the anomalous behavior during recovery. This cancellation technique could be made adaptive in amplitude and time. A single control line to the chip is used to select either Write mode or Read mode. The signal which selects Write mode is often called Write Gate. Correspondingly, Read Gate selects the Read mode, and is merely the inversion of Write Gate.

In view of the fact that the recorded transitions depend on the prior magnetic state of the medium, it is desirable that the medium be in an erased state prior to writing data. There are 3 possible erased states: (a) with the entire medium magnetized in a clockwise direction around the track (b) the medium magnetized in a counter clockwise around a track or, (c) with the medium entirely demagnetized. By the following sequence an erase condition with the medium magnetized either Clockwise (CW) or Counter Clockwise (CCW.) will be created:

Make the Write Data input to the chip Low.
After a short delay, assert Read Gate.
After a short delay assert Write Gate (this introduces a positive current to the head).
Wait slightly more than one revolution.
Assert Read Gate.
This sequence produces a CW or CCW magnetization condition depending only on the way in which the head wires are attached to the head chip. Therefore, without loss of generality, assume that this is a CCW condition, and CCW conditions are associated with having been created by a positive head current.

To write, the Write Mode is selected by asserting Write Gate. At a predetermined time, tf, after assertion of Write Gate, High to Low write data transitions may be fed to the chip. The time tf is made larger than the worst case expected value of Read to Write recovery time, trw. The chip contains a flip flop which changes state on each High to Low write data transition. At each change of state the flip flop in the chip changes the polarity of the current delivered to the head. Transitions can be read back by selection of the Read Mode. This is done by asserting Read Gate. The play back signal from an isolated recorded transition is approximately Lorentzian in shape (resembling somewhat a triangle with blended vertices) and has a pulse width, PW50, at the 50% of peak amplitude level which is related to head gap dimensions, flying height, write current magnitude, write current polarity, write current rise time, previous magnetization state of the magnetic medium, coercivity of the medium etc. The peak amplitude is also related to the same factors in a complicated way. A discussion of these factors is given in a tutorial paper entitled "Fundamentals Of The Magnetic Recording Process" by H. Neal Bertram, published Proceedings of the IEEE, Nov 1986, pp 1494 to 1512.

For normal writing and reading of data, the first and last recorded transitions are relatively unimportant. For the purposes of this invention, these transitions have significance. Also of significance is the ability to selectively erase just 2 transitions without creating new transitions during the erase process. Therefore, these factors will be examined in detail prior to describing the invention.

Figure 2:
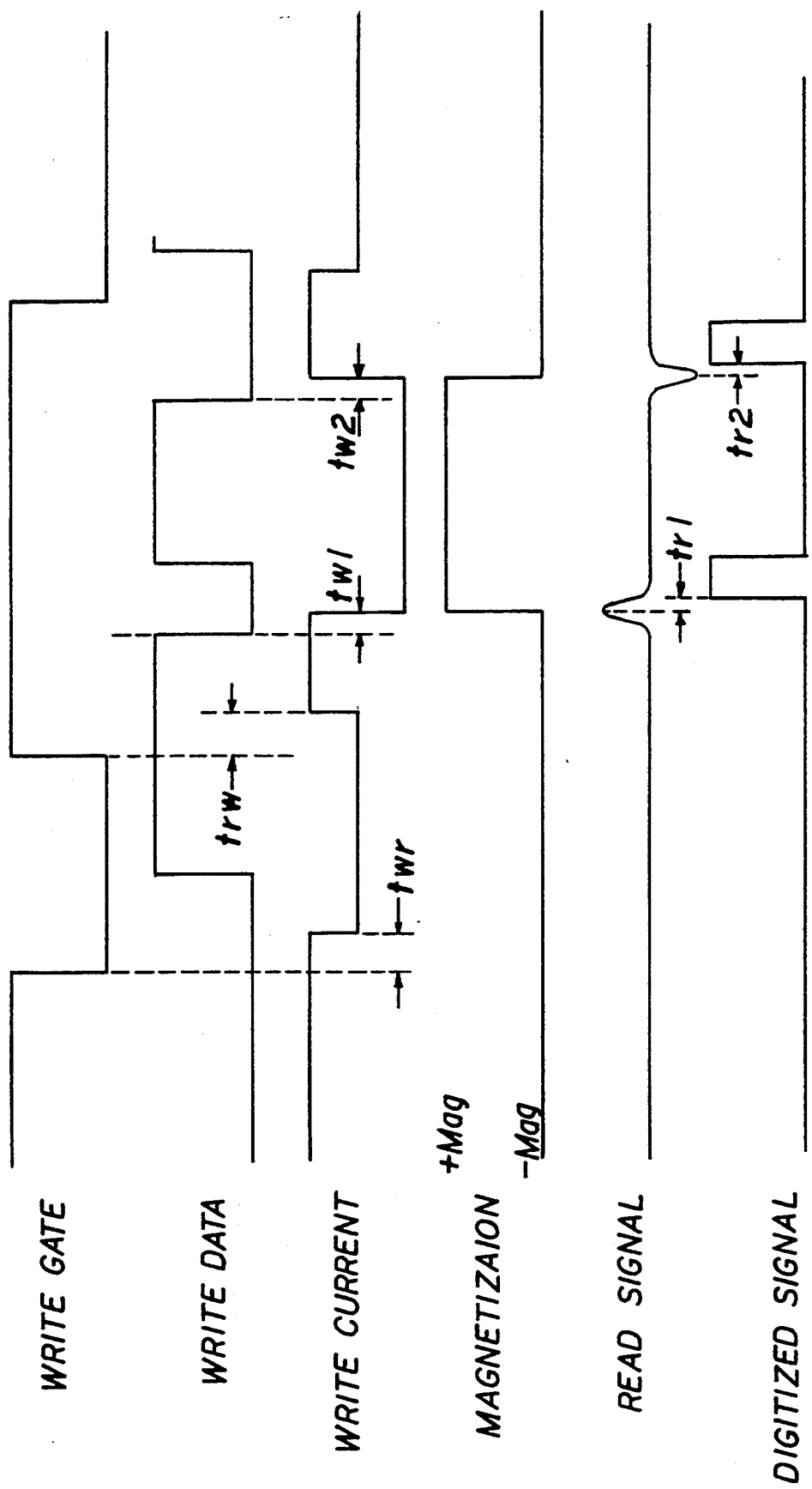
FIG. 2 schematically illustrates how magnetic patterns are recorded by the head in the track in response to write gate signals and to write data signals and how this magnetic pattern is subsequently read by the head to produce digital signals.

FIG. 2 depicts a typical write sequence. When Write Gate is asserted, after a delay, trw, the write current will change from 0 to some value Iw. The Write Data Flip Flop inside the 32H566R (or 32H523R) is initialized on power on, with the disc stationary, by keeping the Write Data input low while commanding a read mode (i.e. WRITE GATE low). This will then cause current to flow through the X-side of the head on the first high to low WRITE DATA transition. The actual polarity is determined by the design of the chip. In all future write operations, the WRITE DATA signal is kept low when the previous read mode was commanded. This is in accordance with the specification for 32H566R and results in the same write current polarity on each assertion of WRITE GATE. This polarity is arbitrarily designated as positive. The magnitude of the current is set by means external to the chip. The rise time of the current in the head is quite rapid. The first High to Low Write Data transition after Write Gate is asserted will, after a delay tw1, change the head current from Iw to $-$Iw since the chip delivers alternate symmetrical bipolar current levels to the head. On receipt of the next High to Low write data transition, after a short delay, tw2, the write current in the head changes from $-$Iw back to Iw. Delays tw1 and tw2 are almost identical, and assumed to be equal to tw. The closer these write data transitions are, the lower the amplitude of the signal on playback. When Read Gate is asserted, the write current returns, after a short delay, to zero. This change in current is quite rapid. These delay times will vary from sample to sample of chip, head and connecting cable. FIG. 2 also depicts the state of medium magnetization after experiencing this sequence of Write currents, and the read back signal which results. Note that the only changes in state of magnetization occur at the Write Data transitions. The current 14 which flows when Write Gate is asserted has no effect on the medium since the medium was erased with the same polarity of write current which exists when Write Gate is first asserted. In addition, removal of the write current has an insignificant effect on the medium.

As mentioned above, the embodiment of the invention also involves the selective erasure of two adjacent transitions. Provided careful control is exerted over the polarity of writing any pair of transitions, they will be automatically erased by ensuring that Write Gate is asserted with the correct polarity of Write current. Write Gate is asserted for a predetermined time, tf, prior to the expected location of the transitions to be erased and is then deasserted when it is known that the transition pair to be erased has passed under the head. The time tf is longer than the worst case value of trw.

DESCRIPTION OF THE INVENTION

APPARATUS

Figure 3A:
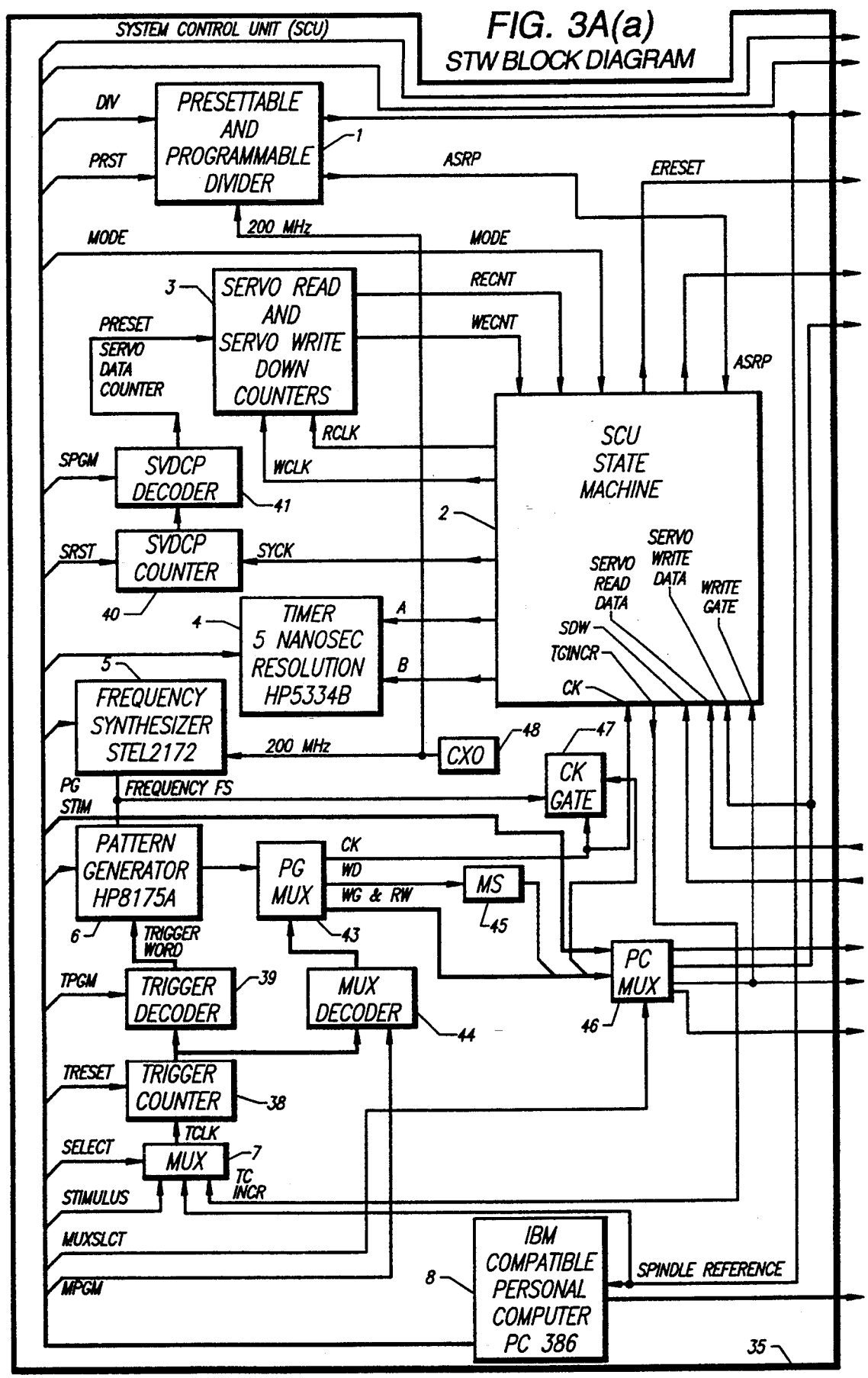
FIG. 3A (a)–3A(c) is a detailed block diagram of a system constituting one embodiment of this invention for using a single head to record a track on a memory member such as a disc outside of a clean room in a plurality of revolutions of the memory member without the use of reference indices such as clock signals.
Figure 3A:
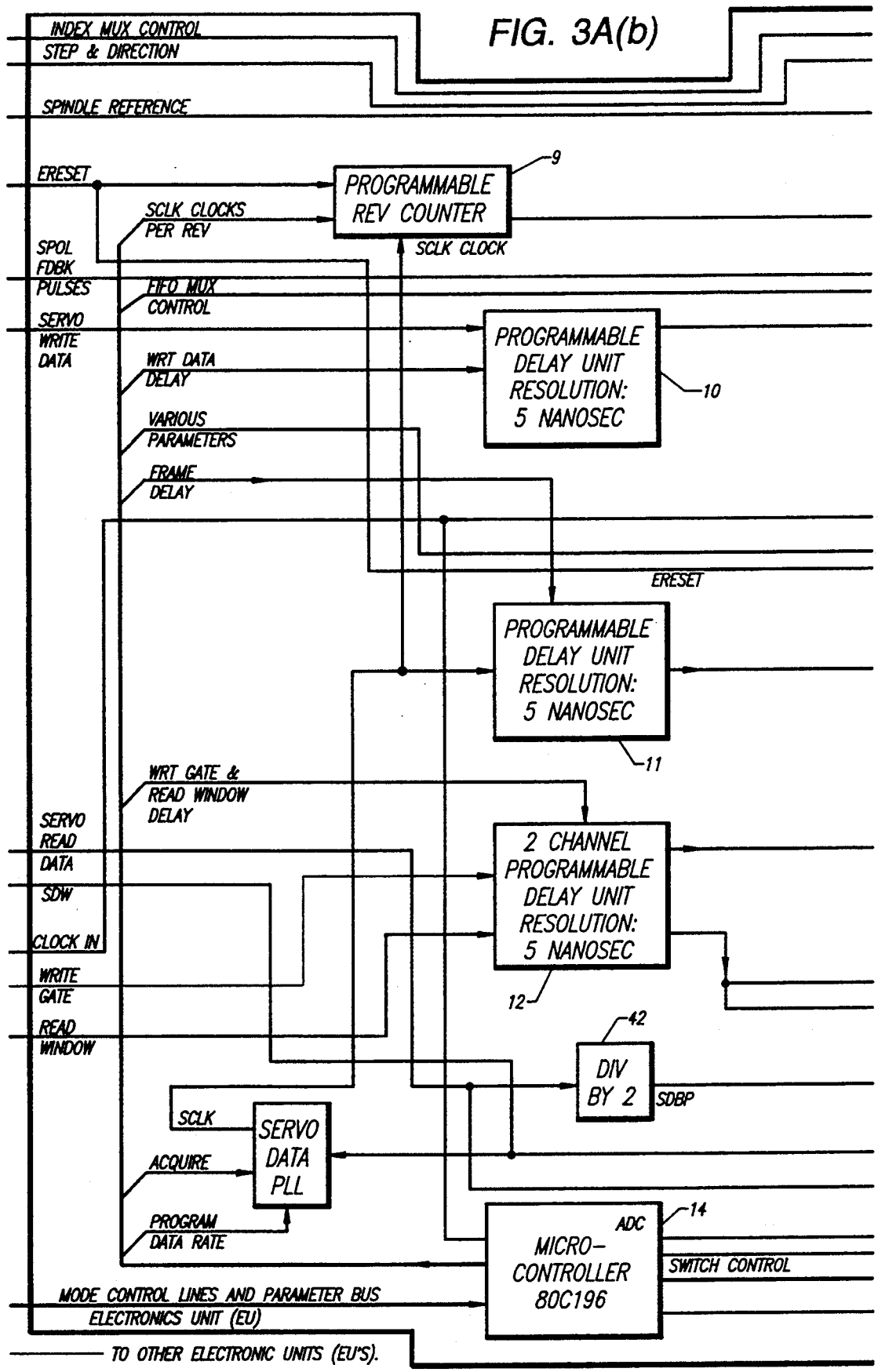
Figure 3A:
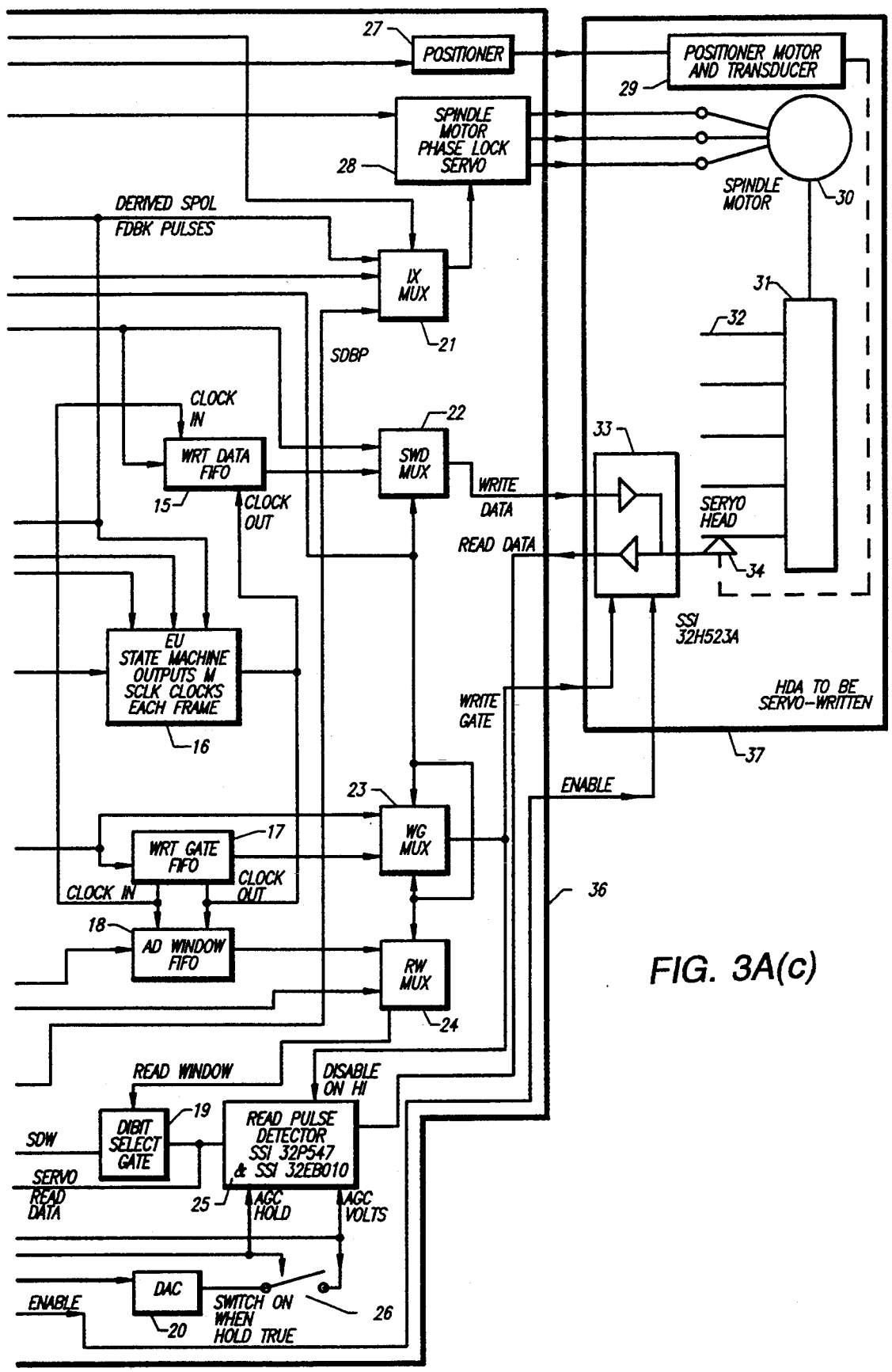

FIG.'s 3A and 3B are block diagrams of the apparatus proposed for the invention. FIG. 3B shows how a multiplicity of HDA's are connected to corresponding electronic units (EU's) and to one system control unit (SCU). FIG. 3A is a detailed block diagram depicting only one EU and one HDA.

Referring to FIG. 3A, the SCU, 35 is comprised of:

(a) An IBM Compatible Personal Computer (PC), 8, which is made up of a central processing unit (CPU) (preferably of the 80386 type manufactured by INTEL Corporation, Santa Clara, Calif.), 1 or more Megabytes of Random Access Memory, (RAM) a floppy disk drive of at least 1.2 MByte capacity, a display unit, and a printer. The lines from the computer include an IEEE 488 bus for instrument control, a general purpose 16 bit bus, Direct Memory Access (DMA) Bus, and miscellaneous control lines.

(b) A latchable Multiplexor (MUX), 7, which is controlled by the PC, 8, to develop an output "TRIGGER WORD" from one of three sources: the END COUNT of the Read Counter, 3, the output of the Presettable and Programmable Divider, 1, or STIMULUS from the PC itself.

(c) A 24 channel Programmable Pattern Generator, 6, which may be model 8175A manufactured by Hewlett Packard Corporation, Palo Alto, Calif. The individual channels are arranged into groups of four channels. The pattern generator multiplexor PG MUX, 43, is used to select which group of four channels are used in any given mode of operation. The outputs from the PG MUX, 43, are called READ WINDOW, WRITE GATE, WRITE DATA and CLOCK IN, respectively. Some or all of these output lines are used, depending on the mode of operation. The clock rate of the Pattern Generator is set by the synthesizer and is limited to 49.99 MHz.

(d) a Frequency Synthesizer, 5, which is preferably a Direct Digital Synthesizer. This synthesizer requires a fixed frequency input which can be 200 MHz. The output is a frequency selectable between 0.745 Hz and 50 MHz in steps of 0.745 Hz. For example, Part Number STEL-2172 by Stanford Telecommunications, Inc., 2421 Mission College Blvd., Santa Clara, Calif. 95054 is an economical choice. Refer to EDN Magazine, Nov. 9, 1989, pp 95 et seq for more details.

(e) A Timer, 4, which is preferably model HP5334B manufactured by Hewlett Packard Corporation. The Timer is controlled by the PC to measure either the single shot time between events on its inputs A and B, or the average of several events.

(f) Read and Write Counters, 3, which output end count pulses, RECNT and WECNT respectively, when they reach zero. These counters are arranged to count the RCLK and WCLK signals respectively from the SCU State Machine, 2. The RECNT and WECNT signals are output to the SCU State Machine.

(g) An SCU State Machine, 2, which takes as inputs the signals READ DATA and SDW (Windowed READ DATA) from the EU, 36, and signals RECNT and WECNT from Down Counter, 3 and WRITE GATE and CLOCK IN from Pattern Generator, 6, and an advance spindle reference pulse, ASPR, from tile Divider, 1, such that ASPR precedes the SPINDLE REFERENCE pulse by slightly more than the worst case jitter of the Spindle Phase Lock. The mode of the State Machine is controlled by the PC using the MODE signal input. The outputs of the State Machine are signals to the A and B inputs of the Timer, 4; a reset signal, ERESET, which resets the REV. COUNTER, 9 and the EU State Machine, 16, in the EU; spindle feedback pulses (labelled "SPDL FDBK PULSES") which are fed to the IX MUX, 21 in the EU; a TC INCR signal which is fed to the MUX, 7; an SVCK pulse used to increment the SVDCP counter, 40; and RCLK and WCLK signals which are used to decrement the Read and Write Counters respectively. Preferably, the SCU State Machine is designed using one or more Field Programmable Logic Arrays (FPGA's). As an example, a state machine with a 20 MHz clock rate can be achieved using the Xilinx 2020 manufactured by Xilinx, Inc., San Jose, Calif. Even higher clock rates—up to 70 MHz—are attainable with part #Act-2 from Actel Corp., Sunnyvale, Calif. For details, refer to an article in Electronic Engineering Times, Sept. 17, 1990, pp 45 and 48. It may even be possible to contemplate a Digital Signal Processor (DSP), such as part number TMS320C30 manufactured by Texas Instruments, Dallas, Tex. for use as a State Machine if the Pattern is not demanding.

(h) A Presettable and Programmable Divider, 1, which divides the 200 MHz fixed frequency of the crystal oscillator, CXO, 48, to a nominal frequency of 60 Hz. The Divider is programmable via the DIV lines so that it can operate HDA's which have nominal speeds other than 60 revolutions per second. The Divider is presettable via the PRST line so that the PC can change the phase of the divider output SPINDLE REFERENCE on command. The Divider also outputs a signal ASPR to the SCU State Machine as described in item (g) above. Both SPINDLE REFERENCE and ASPR are positive pulses about 20 nanoseconds long.

(i) A Trigger Counter, 38, which is clocked by the output, TCKL, of the MUX, 7, and is resettable by the PC on the line TRESET.

(j) A Trigger Decoder, 39, which decodes the Trigger Counter state into TRIGGER WORDS which initiate the output of various pattern se9ments from the Pattern Generator, 6. The Trigger Decoder is programmed with a sequence of TRIGGER WORDS by the PC via the line TPGM. The Decoder is preferably a Random Access Memory whose address is provided by the Trigger Counter States and whose contents are determined by the desired sequence of Trigger Words which initiate various patterns from the Pattern Generator.

(k) An SVDCP Counter, 40, which is clocked by the SVCK line from the SCU State Machine.

(l) An SVDCP Decoder, 41, preferably a RAM, which is addressed by the state of the SVDCP Counter to produce a sequence of "PRESET DATA COUNTER" values as the SVDCP Counter is incremented by SVCK.

(m) A latchable PG MUX, 43, which is used to select which group of four of the Pattern Generator, 5, channels or the PC, 8, signals PG STIM are directed to the system. The PG MUX select is controlled by the MUX DECODER, 44.

(n) A MUX Decoder, 44, which is a RAM based decoder in which the Trigger Counter States are decoded in order to select the PG MUX, 43. The decoder is loaded from the PC via the line MPGM.

(o) A bi-directional monostable, MS, 45, which outputs short duration negative pulses on each transition at its input. The input to the MS is from the PG MUX, 44. The output of the MS is the WRITE DATA line.

(p) A latchable multiplexor, PC MUX, 46, which allows the PC to have direct control over the WRITE DATA, WRITE GATE, READ WINDOW, and CLOCK IN lines. The state of the MUX is selected by the PC via the line MUXSLCT and can be set either to pass the 4 signals, PG STIM, directly from the PC or from PG MUX (3 lines) and the bi-directional monostable, MS, (1 line WRITE DATA).

(q) A Clock Gate, 47, which, when gated ON by the Pattern Generator, 6, outputs a CLOCK IN signal from the Frequency Synthesizer, 5.

(r) A fixed frequency crystal oscillator, CXO, 48, operating at 200 MHz. This provides the clock to the synthesizer, 6. The PC is used for a variety of purposes:

(s) As a means of storing the patterns which are originally composed using the compose and edit facility of the HP 8175A.

(t) As a means of downloading these patterns to the HP8175A as required.

(u) As a means of controlling the condition of the MUX, 7, to select any one of its inputs or to inhibit signals from passing through the MUX.

(v) As a means of setting the frequency of the Frequency Synthesizer in accordance with calculations it makes from time interval measurements made by the Timer.

(w) As a means of controlling the operating mode of the Timer to measure single shot A to B time intervals or an average of several such intervals, and as a means to access these measurements when needed.

(x) A means of presetting the Down Counter, 3.

(y) As a means of programming the divide ratio of Divider, 1, and of presetting the phase of the Divider, 1.

(z) As a means of sensing the END COUNT from the Down Counter, 3 and the output, SPINDLE REFERENCE, of the Divider, 1.

(aa) As a means of transferring information about track type, delay values, frame clocking, etc., to the Embedded Microcontroller, 14, of the EU, 36, via the lines labelled "MODE CONTROL LINES AND PARAMETER BUS".

(ab) As a means of controlling the latchable IX MUX, 21, in the EU using the INDEX MUX CONTROL lines, to select one of its three inputs or to inhibit all inputs.

(ac) As a means of controlling the position of the head, 34, in the HDA, 37 by outputting signals along the STEP and DIRECTION lines to the Positioner, 27, in the EU.

(ad) As a means of resetting the Trigger Counter, 38, via the TRESET input to the Trigger Counter.

(ae) As a means of loading the TRIGGER WORD sequence into the Trigger Decoder, 39, via the PGM input to the Trigger Decoder. This is preferably done using DMA.

(af) As a means of resetting the SVDCP Counter, 40, using the SRST line.

(ag) As a means of loading the "PRESET DATA COUNTER" sequence into the SVDCP Decoder, 41, via the SPGM line. This is preferably accomplished using DMA.

(ah) As a means of loading the sequence of words which select PG MUX, 43, via the MPGM line to the MUX Decoder, 44. This is preferably done using DMA.

(ai) as a means of controlling the PC MUX, 46, via the line MUXSLCT, and of providing 4 signal inputs, PG STIM, to the PC MUX, which may be used to write and read with appropriate PG STIM signals when the PC MUX is selected to pass the PG STIM signals to the EU, 36.

(aj) As a means of conditioning the SCU State Machine, 2, to perform a variety of tasks in different modes. The PC conditions the SCU State Machine via the MODE lines.

Again referring to FIG. 3A, the EU, 36, is comprised of:

(a) Rev Counter, 9, which is clocked from the Data PLL, 13, output SCLK. The Rev Counter may be reset by line ERESET from the SCU State Machine, 2, in the SCU. The Rev Counter is programmed by the line SCLK CLOCKS PER REV to overflow at its output "DERIVED SPDL FDBK PULSES", on a once per revolution basis. The programmed value is set from the microcontroller, 14.

(b) Programmable Delay Units, 10, 11, and 12, are set to delay their respective inputs by predetermined amounts which can be selected in multiples of 5 nanoseconds. Note that the Delay Unit, 12, is in fact a two channel Delay Unit. The programmed delays are set by the microcontroller, 14, using the lines "WRT DATA DELAY", "FRAME DELAY", and "READ WINDOW DLY", respectively. The Programmable Delay Units may be constructed with clocked shift registers or delay lines or a combination of both.

(c) A Data PLL, 13, which is a phase lock loop whose operating data rate can be set by the microcontroller via the lines "PROGRAM DATA RATE". The input to the PLL is the "SDW" Line. The PLL is programmed in loop acquisition mode by the "ACQUIRE" line from the microcontroller. The output of the PLL is the clock on line "SCLK". Once in lock the loop remains in lock so long as the incoming SDW line has transitions near the clock transitions of SCLK. The general principles of operation of such a PLL are described in detail in the description of the model 8459 integrated circuit data separator manufactured by National Semiconductor Corp. of Santa Clara, Calif. This description may be found in the "Mass Storage Handbook" published in 1989 by *National Semiconductor,* on pages 2-29 through 2-63, and 2-163 through 2-173. The operation of the data PLL proposed in this apparatus will differ only in some details from the operation of the 8459 chip.

(d) A microcontroller, 14, preferably part number 80C196 manufactured by Intel Corporation of Santa Clara, Calif. The 80C196 accepts a variety of parameters from the PC in the SCU and is then able to distribute these parameters to set and latch various delays, counter values and MUX's in the EU. The 80C196 contains an analog to digital converter (ADC) which is used to measure the AGC voltage of the Read Pulse Detector (RDP), 25. The 80C196 is also used to set a value into the Digital to Analog Converter (DAC), 20, and in conjunction with this controls the state of the SWITCH CONTROL line to use the DAC output voltage to fix the gain of the RDP. The microcontroller based on instruction from the PC, 8, is able to select or deselect the 32H523R chip, 33, via the ENABLE line.

(e) The three FIFO's, 15, 17 and 18 operate to buffer the WRITE DATA, WRITE GATE, and READ WINDOW signals respectively. This buffer is provided because the disc speed may not be in instantaneous synchronism with the Pattern Generator clock. The FIFO's clock in the data with the signal CLOCK IN, comprised of M pulses per frame, obtained directly from the fourth channel of the Pattern Generator. The data are clocked out of the FIFO's by a burst of M pulses from the state machine, 16, placed on the "CLOCK OUT" line. The value of M is programmable and may even change from frame to frame, and from revolution to revolution. (f) The EU State Machine, 16, is programmed by down loading data from the microcontroller, 14, on lines labelled "VARIOUS PARAMETERS". The data which is down loaded includes the relationship between M, the number of clock pulses to be output, and the frame number, and the relationship between the timings of the first of the M pulses and the frame number. The EU State Machine is resettable on lines ERESET from than output of the SCU State Machine, 2, when armed to accept a reset by the microcontroller using one of the lines labelled "VARIOUS PARAMETERS". The clock into the EU State Machine is the SCLK delayed by the Programmable Delay Unit, 11. The EU State Machine contains sufficient storage to accept the parameters loaded from the microcontroller. Also in the EU State Machine are frame and revolution counters which, after a Reset by the ERESET line or by the output of the Rev Counter, keep continuous track of frame # and rev #.

The current values of frame # and revolution # are used together with the parameters loaded from the 80C196 to establish the correct timing of the first of the FIFO "CLOCK OUT" pulses and the number of pulses, M, to be placed on the FIFO CLOCK OUT line.

The EU State Machine is fast enough to perform appropriate actions in the time between successive SCLK clock transitions. A similar one to that used for the SCU state machine is appropriate.

(g) A Dibit Select Gate, 19, which is acted upon by the "READ WINDOW" line either to pass or inhibit signals on the "READ DATA" line. The "READ WINDOW" line is the output of the latchable RW MUX, 24. The output of the Dibit Select Gate is SDW for data, windowed.

(h) A DAC, 20, which is used to fix the gain of the RDP, 25, at a predetermined level by fixing the AGC control volts when the switch, 26, is ON.

(i) A latchable IX MUX, 21, which can be used to select either of the two lines: the Rev. Counter output, "DERIVED SPDL FDBK PULSES", or the "SPDL FDBK PULSES" or inhibit them The output of the MUX is the feedback signal to the Spindle Motor Phase Lock (PLS), 28. The control lines for this MUX are labelled "INDEX MUX CONTROL".

(j) Latchable MUX's, 22, 23, and 24 which are selected to either bypass FIFO's 15, 17, and 18 respectively, or to use them.

(k) A Read Pulse Detector (RDP), 25, preferably comprised of part numbers 32P547 and 32F8010 manufactured by Silicon Systems, Inc. of Tustin, Calif., which amplifies and processes the analog signals on the "READ DATA"line from the preamplifier chip, 33, in the HDA, 37. The output of the RDP chip is a short positive pulse for each input positive or negative peak which exceeds a predetermined threshold. In this application the pulse length may be set at 20 nanoseconds. A complete description of the operation of the RDP is given in the *Silicon Systems* 1990 *Data Book* (published by Silicon Systems, Inc.) on pages 2-97 through 2-114. When used in conjunction with the programmable filter, 32F8010, the bandwidth of the RDP function can be tailored to the bandwidth of the incoming signal. Note that the RDP is disabled whenever WRITE GATE is high by the signal "DISABLE ON HI".

(l) A Switch, 26, which is preferably an FET switch, which can place the RDP, 25 in the "HOLD" mode in which it will have a gain determined by the voltage fed to the "AGC VOLTS" input of the RDP.

(m) A positioner system, 27, preferably of the type described in a patent application filed on October 12, 1990, in the names of Robert Hazel, Gajus Michaelson and William Valliant as joint inventors. The positioner system moves the Positioner Motor and Transducer assembly, 29, in the HDA, 34 under the control of the "STEP and DIRECTION" command lines to the input of Positioner, 27.

Typically each step command involves a move which is a predetermined fraction of a track pitch.

(n) A Spindle Motor Phase Lock, comprised of a chip which brings the brushless spindle motor, 30, to approximately the correct speed even in the absence of commutation signals from the spindle motor, and then is capable of driving the spindle motor under phase lock control using the "SPINDLE REFERENCE PULSE" line as a frequency and phase reference, and using the output of IX MUX, 21, as a feedback signal derived from the disc via the appropriate input to IX MUX, 21. Such a function is preferably performed by part number 32M595 manufactured by Silicon Systems, Inc. combined with the appropriate power drivers for the size of spindle motor, 30, in the HDA, 37. The speed of the spindle motor, in revolutions per second, will be equal to the frequency on the "SPINDLE REFERENCE PULSE" line in Hz. Typically, this will be close to 60 Hz for most HDA's although speeds for different types of HDA's range from 40 revolutions/second to 90 revolutions/second.

(o) a DIV BY 2 circuit, 42, which divides the READ DATA signal by 2 to create positive and negative edges at its output, SDBP, on each READ DATA pulse.

The HDA, 37, to be written is comprised of:

(a) A Positioner Motor and Transducer Assembly, 29, in which the transducer measures the position of the head assembly, preferably by means which are the subject of the said co-pending application assigned to Westlake Technology Corporation.

(b) A Spindle Motor, 30, which is usually but not necessarily a brushless motor. The spindle motor may have Hall Effect Transducers or equivalent (not shown) for the purposes of aiding in commutation. However, even if present, these transducers are not used and not necessary for the purpose of this invention.

(c) A Spindle, 31, to which one or more magnetically coated discs, 32 are attached.

(d) A Head, 34, which is typical of a one or more heads which can be used by this invention. The head is mounted adjacent to one of the disc surfaces and is designed to "fly" above the surface at a very close distance.

(e) A Read/Write chip, 33, preferably part number 32H523R in case head, 34, is a thin film head or 32H566 in case head, 34, is a ferrite head. This chip is controlled by the "WRITE GATE" line from WG MUX, 23, to be either in the Write mode or Read Mode (when WRITE GATE is FALSE).

In the Write Mode, the chip will deliver either positive or negative current to the head, 34, under the control of the WRITE DATA line. In the Read Mode, low level signals from the head, 34, are amplified and delivered to the RDP, 25.

METHOD OF WRITING

In the servowriting process of this invention, the polarity of the write current on assertion of WRITE GATE is always made the same polarity as the current which was used to erase the medium. In addition, only even numbers of High to Low WRITE DATA transitions are made during the time WRITE GATE is asserted. By obeying these rules the only transitions recorded are those induced by High to Low WRITE DATA transitions. Furthermore, assertion of WRITE GATE without WRITE DATA transitions can selectively erase prior recorded transitions.

This method is suitable for disc drives which do not have a circumferential fiduciary available prior to the writing process. The method will be described for a so-called dedicated system in which the head has a track width approximately double the desired data track pitch. A similar method, differing only in details, will be described for a so-called sector system in which the fields in each track are interspersed, or embedded, among the data fields of each track. The method can also be applied if a circumferential fiduciary is initially available, by eliminating some steps.

Figure 4K:
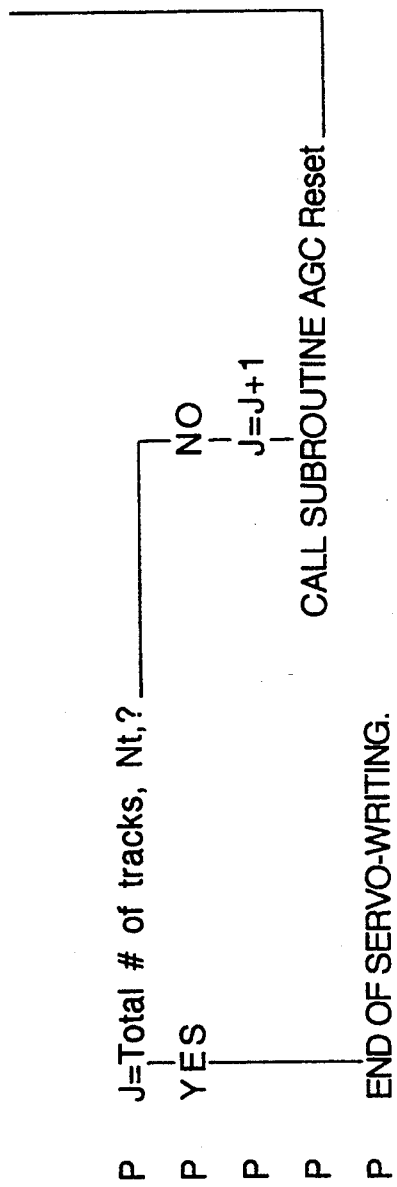

The method applied to a dedicated system call be followed by reference to the Flow Chart of FIG. 4 and the timing diagrams of FIG's 5 to 10, and the block diagrams of FIGS. 3A and 3B.

For the purpose of describing the steps involved in track writing, the Pattern Generator, 6, is assumed to be able to provide signals of the desired timing upon receipt of its appropriate TRIGGER WORD. A detailed description of the operation and programming of the Pattern Generator is given after the description of Step 8.

Step #1 Acquire Spindle Lock & Initialize AGC.

First, the Read/Write chips, 33, are initialized by using the PC to cycle through the protocol described previously and explained in detail in the specification of the 32H566R or 32H523R. This protocol ensures control of Write Current polarity on all subsequent assertions of WRITE GATE. Second, all HDA spindles are simultaneously brought to their approximate final speed. This can be accomplished, for example, using an integrated circuit manufactured by Silicon Systems Inc, Tustin, Calif. The part number is SSI 32M595. Note that this integrated circuit will bring a brushless motor to approximately the correct speed without using sensors on the spindle motor.

While the spindles are accelerating to their final speed, the Pattern Generator, 6, is loaded with all the patterns appropriate to writing the first track (the "Master Track"). See Table 1.

The PC, 8, in the SCU latches MUX's 22, 23, 24 in all EU's to bypass the FIFO's. The PC also instructs the Microcontrollers, 14, in each EU to ENABLE their respective 32H523R chips, 33, simultaneously.

Now all head positioning systems, 27 and 29, are used to bring the head assemblies to the location of the first track to be written. This location is usually at the outer crash stop. Now, the PC selects the PC MUX, 46, to receive the PG STIM inputs from the PC. The PC asserts, on the PG STIM lines: (a) WRITE GATE to be high for at least one revolution, and (b) no WRITE DATA transitions. Now, on receipt of these PG STIM signals from the PC, which may occur at an arbitrary time, all EU's will simultaneously d.c. erase this first track. The PC now commands all EU's simultaneously to move the heads a distance slightly less than their width, and the new track locations are d.c. erased in the same manner described above. By repeating the sequence of moving and d.c. erasing a sufficient number of times, the entire surface can be d.c. erased with the prescribed polarity. To improve throughput it is desirable that all HDA's, 37, be delivered to the Track Writer in an appropriate dc erased state. If the surface in each HDA is known to be erased, the above erasing steps may be omitted.

Now, all heads in each HDA are simultaneously commanded to move back to the first track. Following this, the PC is programmed to output, on the PG STIM lines, for a period slightly in excess of one revolution, a high WRITE GATE and a constant frequency WRITE DATA signal while selecting the PG MUX, 43, to receive the PG STIM input from the PC. Now, on receipt of the PG STIM signals from the PC, which may be initiated at an arbitrary time, all the EU's will simultaneously write a constant frequency clock on each of the outer tracks at which the heads of each HDA are located. This clock signal is used only to set the gain of various amplifiers. It is not used for clock information. The frequency of the clock is unimportant so long as it is high enough to avoid significant AGC control voltage discharge on the Read Data Pulse Detector, 25, and low enough that the playback signal has minimal interference between adjacent transitions. The frequency will also be limited by the speed at which the PC can toggle an output port.

The PC selects the PC MUX, 46, to receive the PG STIM input from the PC. PG STIM signals put all the EU's in the read mode. The 80C196 microcontrollers are informed of the fact that their respective EU's are in the read mode, and they each set the respective RDP's, 25, with AGC Mode ON by de-asserting their AGC HOLD inputs. After a delay long enough to allow all AGC circuits in the EU's to settle, the AGC HOLD mode is asserted and the AGC control voltage is read, by the ADC in the 80C196 microcontroller, 14, in FIG. 3A, in each EU. Each of the EU AGC voltages is stored in each EU in the 80C196 RAM, and then outputted via a DAC, 20, (FIG. 3A), in each EU back to the AGC control voltage input of the Read Pulse Detector (RPD), 25, (FIG. 3A). The RDP chips in each EU are now held at their respective gain levels. The AGC control voltage corresponds to that which is necessary to maintain the RDP gain suitable for reading a full track.

Now the PC is used, as described previously, to cause simultaneous d.c. erasure of correct polarity of the first track of each HDA, so that all vestiges of the constant frequency recording are eliminated.

Now, using the PC to control the PC MUX, 46, and to output PC STIM signals, similar techniques to those described above are used to simultaneously write a single scratch pair of dibits on the first track of each HDA. The locations of, and the time between, transitions are not critical. The time can be made equal to or greater than the time between the first two transitions of a normal frame. For the example pattern, this spacing could be several microseconds, as determined by the speed at which the PC, 8, can toggle an output port. Since the disc speed can be in error by as much as 20% during the recording of the dibit, when the transitions are read back from the scratch head at normal disc speed, tile time between transitions on playback will have a tolerance of 20%. This is of no consequence because only the positive pulse of the dibit will be used. After the scratch transitions are written, the PC, 8, is programmed in the now familiar manner to produce a LOW WRITE GATE. All EU's are now in the read mode. The peak of the positive pulse can be used as a circumferential fiduciary. Using the DIV BY 2 circuit, 42, the READ DATA pulses are conditioned to produce one pulse per dibit, corresponding to the either positive or negative peaks. These pulses are fed to the IX MUX, 21. The PC, 8, controls and latches the IX MUX, 21, to allow these 26 pulses to be used as feedback for the Spindle Motor Phase Lock (PLS). Using this fiduciary as a feedback signal, all HDA spindles are phase locked to the signal SPINDLE REFERENCE, a frequency, Fsp, derived from the 1 MHz fixed frequency clock from the Synthesizer, 5, in the SCU. After phase lock has been established the average disc speed of all HDA's are exactly controlled by the spindle reference frequency, set at 60 Hz for a typical spindle speed of 3600 RPM. The disc will rotate with an average period of exactly $T=1/Fsp$, or 1/60 second in the case of $Fsp=60$ Hz. This ends STEP #1 of the flow chart. Now the process of writing the first track (the "Master Track") may begin.

Step #2: Write 50% of Master Track & Erase Scratch Dibit.

All of Steps 2 through 7 are carried out as a group for a first EU and HDA and then repeated as a group for all remaining EU's and HDA's. Throughout all these steps 2 through 7, the MUX's, 22, 23, and 24 are set to bypass the FIFO's in each EU. Beginning with Step 2, the PC is conditioned to keep track of disc revolutions by means of the SPINDLE REFERENCE pulse input. In these Steps 2 to 7, the microcontrollers, 14, in each EU will ENABLE or DISABLE the 32H523R chip, 33, via the ENABLE line in accordance with instructions from the PC which controls which EU/HDA combination is being operated on at any given time.

In the following manner, a nominal frequency, F, for the clock input to the Pattern Generator, 6, has been predetermined as a result of selecting the sequence. If the time between transitions in a dibit is Ttdb, and the time between frames is Tfr, then the largest common factor, Tlcf, of Tdb and Tfr is calculated. If Tlcf is greater than 50 nanoseconds then no change will be made to Tdbo If Tlcf is less than 50 nanoseconds then Tdb must be modified slightly to ensure that Tlcf is greater than 50 nanoseconds. The maximum transition rate is $Flcf=1/Tlcf$ transitions per second, and the reason that 50 nanoseconds is chosen as a lower limit for Tlcf is to limit the maximum Data transition rate, Flcf, to 20 MHz so that processing electronics for writing and reading Patterns are reasonably available and economical. In future this limit could be changed as higher frequency electronics become available. In the example chosen, $Tdb=500$ nanoseconds, and Tfr 16000 nanoseconds, leading to $Tlcf=500$ nanoseconds and $Flcf=2$ MHz, a reasonable result. It will be shown later that a "READ WINDOW" is opened prior to the expected location of the SS negative peak but after the expected location of the SS positive peak. It is a natural choice to open the READ WINDOW half way between these expected locations. This means that the minimum time duration between events is 50% of the time between the SS positive peak and the SS negative peak; in this case the minimum time duration will be 50% of 500 nanoseconds, or 250 nanoseconds. This implies that the synthesizer clock frequency, F, should be set at least twice as high as the value calculated on the basis of transition locations alone. There is however, an additional requirement placed on F. This is due to the response time of the Pattern Generator to external TRIGGER WORDS corresponding to START, JMPA and JMPB commands. The response time is 9 F clock periods plus 170 nanoseconds plus another 20 nanoseconds for the TRIGGER WORD to stabilize. To minimize this time, the period, Tc, of F is minimized by setting F as high as possible. Therefore F is made the highest integer multiple of Flcf which is nevertheless at least 1% less than the highest frequency, 50 MHz, at which the combination of the Synthesizer, 5, and the Pattern Generator, 6, can operate. Therefore, since $Flcf=2$ MHz, F is chosen at 48 MHz. The 1% margin allows for variations in disc speed considerably in excess of those expected in practice, to be readily accommodated. With F set at 48 MHz, $Tc=1/48e6$ and the total delay in response to START or JMPA or JMPB commands is then $170e-9+20e-9+9/48e6= 377.5$ nanoseconds. With the STEL 2172 synthesizer, the available frequency will never be in error by more than 50% of the STEL 2172 resolution when operating with an input clock of 200 MHz. This corresponds to a frequency error of 0.3726 Hz, which is an insignificant percentage of the desired frequency, F, which is close to 50 MHz. As an example of an inappropriate initial choice of Tdb consider $Tdb=440$ nanoseconds with $Tfr=16000$ nanoseconds, then $Tlcf=40$ nanoseconds, violating the desirable constraint of $Tlcf=50$ nanoseconds minimum. This impasse could be resolved by changing Tdb to 480 nanoseconds, resulting in a safe $Tlcf=160$ nanoseconds. The change from 440 nanoseconds to 480 nanoseconds for Tdb is not usually critical for servo-writing. As an alternative Tdb could be changed to 400 nanoseconds resulting in a safe value of $Tlcf=400$ nanoseconds.

The first track written is called the Master Track. FIG. 5 shows the timing diagram for the first 8 revolutions of writing the master track. For this example, assume, without loss of generality, that the master track is of type A, with an outer guard zone sequence of normal and mark frames and also containing an Index sequence of normal and mark frames. Also assume, without loss of generality, that the first frame is a normal frame in which the SD dibit is present. First the time for one revolution, T0, is measured using the timer, 1, in the SCU. To do this, the SCU State Machine, 2, is set by the PC, 8, using the MODE line, to condition the READ DATA signal so that the first positive dibit peak is sent to input A of the Timer, 4, and the next positive dibit peak is sent to input B of the Timer, 4. At the same time the PC, 8, arms the timer to accept A and B inputs for a period of more than one revolution, but less than two revolutions. The timer measures the time between tile pulse on the A input and the pulse on the B input and this time is the time for one revolution of the Spindle Motor, 30. If desired, the average of several successive periods can be measured by arranging for the PC, 8, to arm the Timer to accept A and B pulses for several revolutions instead of for just 1 revolution. Now the fractional error, $Db=(T0-T)/T$, in the period is calculated by the PC, 8, and the frequency synthesizer, 4, is set to a frequency of $F0=F/(1+D0)$, where F is the nominal frequency predetermined by the sequence as described above. Note that positive period errors require negative changes to the frequency synthesizer. The time taken for the PC to acquire the Timer Data, plus the time for the PC to calculate the new frequency plus the time for the Frequency Synthesizer to settle at the new frequency must be less than half a revolution. This is not a demanding specification, and is easily met by the Stanford Telecommunications Inc. Part. #STEL-2172, together with the HP5334B Timer, 4. Now the scratch dibit has served its purpose and is erased. At the same time, a new source of spindle feedback is arranged for the spindle PLS. To achieve this, wait for 75% of a revolution (768 frames in this example), as measured by the PC, 8, and use the PC to adjust the SPINDLE REFERENCE frequency phase (from the SCU) to advance 25% of a revolution (256 frames in this example) by presetting the Divider, 1. Also using the PC, by keeping the PRST line to the Divider, 1, HIGH, suppress the first of the new SPINDLE REFERENCE pulses and disable IX MUX, 21, since there will be no reliable spindle feedback pulse available at this time.

The phase advance will anticipate the location of the next spindle feedback pulse and ensure that there is an insignificant transient in the spindle PLS. While waiting for the time occupied by 768 frames to elapse, the PC resets the Trigger Counter to 00000 loads, the TRIGGER WORD sequence into the Trigger Decoder, enables the MUX, 7, to accept the STIMULUS signal. The TRIGGER WORD decoded from Trigger Counter state 0000 is arranged to output RW LOW, WG LOW WD HIGH and CK LOW for all six groups of four channels (see Table 1 and the Pattern Generator description and manual). The 80C196 sets the Programmable Delay Units, 10, 11, and 12 for minimum delay.

Figure 6A:
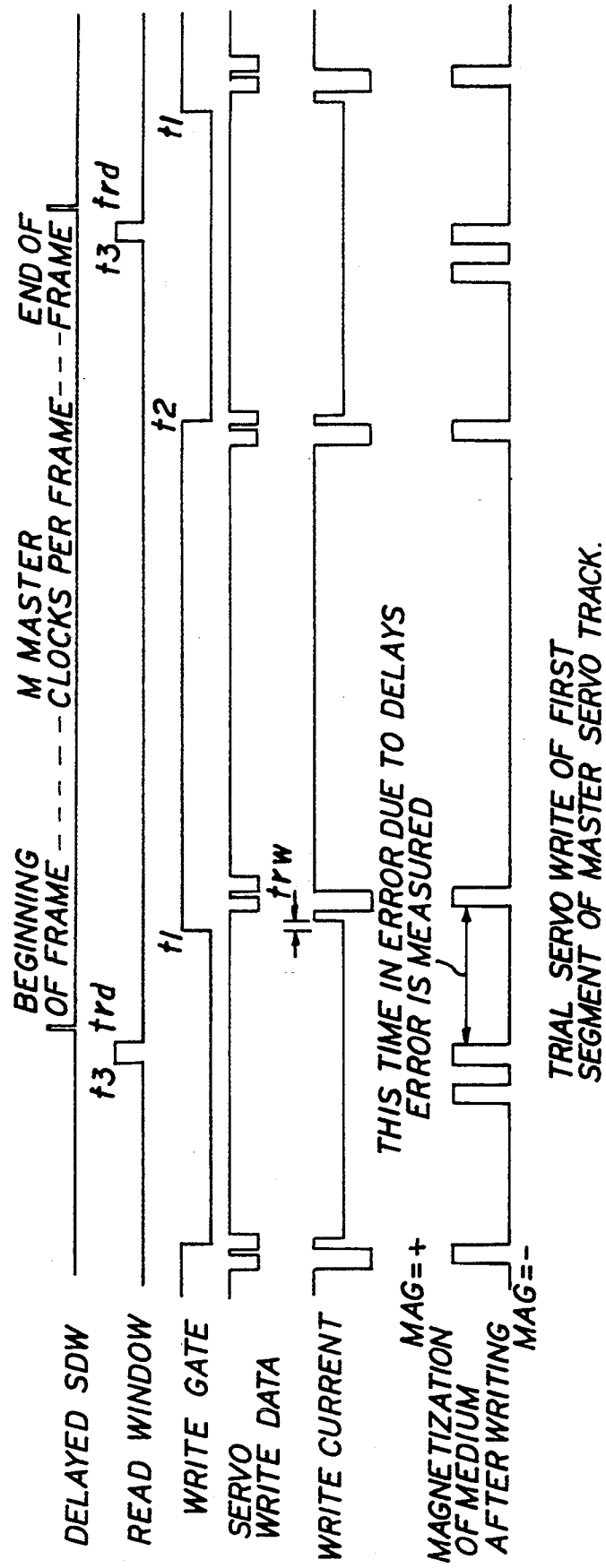

When the time for 768 frames elapses, the STIMULUS signal increments the Trigger Counter by 1, invoking the TRIGGER WORD stored at address location 1, and initiating the output of 512 frames of data from the Pattern Generator to the EU (see Table 1 and the Pattern Generator description and manual). Examining the timing diagram of FIG. 6, observe that the WRITE DATA signal stays LOW for a short period after the HIGH to LOW transition which causes writing to take place. This short period is set by monostable, BMS, 45, in FIG. 3A. The WRITE GATE signal is de-asserted at time t2 which is during the time that the WRITE DATA signal is still LOW. This sequence follows the specification of 32H566R and ensures that the polarity of the Write Current is correct when the WRITE GATE signal is re-asserted. The WRITE GATE goes false after the last WRITE DATA transition. When WRITE GATE goes false, the PC issues a STIMULUS signal which increments the TRIGGER COUNTER to 00002 which is decoded to a TRIGGER WORD interpreted as a STOP command by the Pattern Generator. At this juncture, Channels 0, 1, 2, 3 are respectively LOW, LOW, HIGH and LOW. The EU is now in the Read Mode, and the head is reading the d.c. erased segment of the track. At the end of the write period the PC instructs the microcontroller, 14, to put the RDP, 25, into the read mode with AGC Mode On. The PC now conditions, via the MODE lines, the SCU state machine, 2, to deliver SPDL FDBK PULSES on receipt of the first READ DATA pulse available after the 50% of track which is still free of data, with the IX MUX, 21, now conditioned to feed this pulse to the spindle motor PLS, 28. This READ DATA pulse corresponds to the positive peak of the first dibit recorded in the previous revolution. For the remainder of the writing of the Master Track (Steps 3 through 5) this positive peak of the first dibit following the dc erased area is used for the spindle PLS feedback, via the State Machine, 2 and MUX, 7. This concludes Step #2; Step #3 is now initiated using the same EU and HDA. Note that READ WINDOW state is not relevant during Step #2, since SDW pulses are not utilized.

Step #3: Refine AGC setting.

In this step the AGC control voltage is refined a little from that measured in Step #1. Wait 75% of revolution (768 frames) after first pulse; measure AGC control voltage and store the result; assert AGC HOLD Mode and output the measured AGC control voltage (via the EU DAC) into the AGC control voltage input of the RDP chip. Now, by timing out with the PC, wait until the head is over the erased section of the track. This ends Step #3. Continue by initiating Step #4.

This refinement accounts for any slight differences in signal amplitude for the patterns recorded in Steps 1 and 2.

Step #4: Measure Correction Factor for System Delays.

In Step #4 the various time delays are measured and the result is used to correct for the system time delay on subsequent segments of writing the master track. FIG. 6 shows the timing diagram for this procedure. Writing of the next portion of the Master Track is begun contiguously and seamlessly with the end of the first portion recorded.

This step will begin with a trial write of the missing N+ and Q— dibits by triggering from the negative SS peak. The timing is likely to be incorrect since the parasitic time delays between sensing the negative SS peak and the writing of the N+ dibit, while small, are not known exactly. On the next revolution, the time between the SS negative peak and the N+ negative peak is measured and compared with the expected time, and a correction delay factor is calculated. On the subsequent revolution the re-writing of the N+ and Q— dibits will be done accounting for the delay error which was ascertained during the trial write.

The process is accomplished as follows:

4(a) Set up for Trigger Counts 00003/01028

At the end of Step 3, the head is passing over an erased section of the track. During this time:

The PC, 8, sets the MUX, 7, to pass the TC INCR signal from the SCU State Machine, 2, to the Trigger Counter, 38; loads the Trigger Decoder and Mux Decoder with the word sequences appropriate to the reminder of Step 4 and al; of Step 5; the PC MUX, 43, to receive channels 20, 21, 22 and 23 from the Pattern Generator, 6, and the PC MUX, 46, to receive the output signals from the PG MUX, 43. This activity can take place any time between the ending of Step 2 and the expected time of the appearance of the first READ DATA pulse (SRDP1) of the revolution. The PC informs the 80C196 microcontroller, 14, in the EU to set up the Programmable Delay Units, 11, 12, and 13 in the middle of their range.

The PC also conditions, via the MODE line, the SCU State Machine, 2, to produce a TC INCR pulse on receipt of the SRDP1 negative edge and additional TC INCR pulses on the SDW positive and negative edges.

4(a1) Execution of Trigger Counts 00003/00004

(Look for SRDP1 and SDW)
(See Row 2 of Table 1)

On receipt of the SRDP1 negative edge, (SRDP1—), the Trigger Counter, 38, is incremented from 00002 to 00003. This causes the TRIGGER WORD decode to invoke the signal pattern of FIG. 6A. This pattern simply opens RW (on channel 20) at the expected location of the SS negative peak. Therefore an SDW pulse is sensed by the SCU at the SS negative peak and on the delayed positive edge of the SDW pulse, SDW+, the Trigger Count increments to 00004 and on the corresponding TRIGGER WORD the Pattern Generator is commanded to STOP.

4(a2) Execution of Trigger Counts 00005/01028

(Trial Write N+, Q—)
(see Row 3 of Table 1)

On receipt of the next SDW negative edge, SDW—, (20 nanoseconds after SDW+), the TC INCR pulse from the SCU State Machine increments the Trigger Counter from 00004 to 00005. The 00005 count is decoded into a TRIGGER WORD which invokes pattern sequence for READ WINDOW, WRITE DATA, and WRITE GATE as designated in FIG. 6 between the dashed lines marked "Beginning of frame" and "End of frame" respectively. The delay shown in the pattern occurs in the EU. The Pattern Generator issues the pattern without a delay. The CLOCK IN pattern is not shown but is kept LOW during this period. Trigger Count 00005 is also decoded to control the MUX Decoder, 44, to select channels 4, 5, 6, and 7 from the PG MUX 43. Note that the signal sequence from the Pattern Generator begins on the negative edge of the SDW pulse and ends in the positive edge of the next SDW pulse as prescribed in row 3 of Table 1. When the positive edge of the SDW pulse, SDW+, is received, the Trigger Counter increments from 00005 to 00006 whose TRIGGER WORD decode invokes a STOP command (See Table 1). Shortly after, the negative edge of the same delayed SDW pulse is received and increments the Trigger Counter to 00007 whose TRIGGER WORD decode simply invokes the same signal sequence again (FIG. 6). This process continues until TRIGGER WORDS other than those invoking START at SDW— and STOP at SDW+ are available.

After 512 SDW pulses have been received, there is no more data on the track so the START commands will cease. The Trigger Count will be at 1027 after the last SDW— edge pulse has been received.

4(b) Set up for Trigger Counts 01028/03588

The PC is all the time monitoring the SPINDLE REFERENCE and is able to issue commands at any time during a revolution with reasonable timing accuracy. Some time after half a revolution from a SPINDLE REFERENCE pulse, but before a full revolution has passed, the PC selects PG MUX, 43, to assign channels 20, 21, 22 and 23 to be output from the PG MUX. The PC MUX, 46, remains in its present condition.

Now the head is reading the erased section of the track and the SCU State Machine is conditioned by the PC via the MODE lines to produce a TC INCR pulse on SRDP1—, where the negative sign signifies the negative edge, and also on each SDW— and SDW+, and finally, on WD+. The SCU State Machine is further conditioned so that alternate SDW edges are routed to the A and B lines respectively of the Timer, 4. Note that in this mode WRITE GATE is always LOW, so the WD (WRITE DATA) line does not cause writing on the disk and can therefore be used for another purpose.

4(b1) Execution of Trigger Counts 01028/01029

(Look for SRDP1 and SDW)
(See Row 4 of Table 1)

This involves looking for SRDP1— and opening a READ WINDOW and is identical to the activity in 4(a1).

4(b2) Execution of Trigger Counts 01030/03588

(Measure Timing Errors)
(See Row 5 of Table 1)

This activity is similar to that described in 4(a2) except that the frame pattern is different (it involves no writing) so that the only difference is that all Trigger Counts in this range are decoded in the MUX Decoder to select channel assignment 8, 9, 10, 11 which contain the RW sequence appropriate for measurement of timing errors. This RW sequence is simply that which opens two windows within a frame: one at the expected location of the negative SS peak, the other at the expected location of the negative N+ peak. In addition a WD pulse positive edge (WD+) is programmed to signify the end of the frame. SDW+ cannot be used for this purpose as it was in 4(a2) since there are two SDW+'s per frame. Since there are two SDW pulses per frame, there will be five Trigger Counts per frame: two for each SDW+ and two for each SDW—, and one for WD+. Therefore, 512 frames having been recorded and since the first SS negative peak (SDW+) has already incremented the Trigger Counter to 1029 during 4(a1), the Trigger Count will advance by $(5 \times 512) - 1 = 2559$ in this stage. The PC is arranged to arm the Timer, 4, for a period beginning shortly after a SPINDLE REFERENCE pulse, and ending somewhat less than half a revolution later. This ensures that the Timer measures the average of several hundred A & B periods, thereby increasing the accuracy of the estimate of the time between successive SDW pulses.

4(c) Set up for Trigger Counts 03589/04612

The set up is identical to that described in 4(a), except that the Programmable Delay Units, 10, 11 and 12 are set with delay values appropriate to compensate for the timing errors measured in 4(b2) above.

4(c1) Execution of Trigger Counts 03589/03590

(Look for SRDP1 and SDW)
(See Row 6 of Table 1)

The execution is identical to that described in (4a1), except that the Trigger Count increments to 03589 and then to 03590.

4(c2) Execution of Trigger Counts 03591/04612

(Re-write N+, Q− with correct timing)
(See Row 7 of Table 1)

The execution is identical to that described in 4(a2), including the channel assignment. Note that all timing corrections take place in the Programmable Delay Units 10, 11, and 12 in the EU, so the Pattern Generator signals are identical for 4(a2) and 4(c2).

Step #5: Write Remainder of Master Track Segments

Keeping with the same HDA and EU from Step #4, the remaining segments of the master track can be written in an iterative process.

Generally, this involves counting the frames already recorded, measuring the time of the unrecorded section of the track, adjusting the Synthesizer frequency in accordance with the measured time, while again counting the frames already recorded, writing half the number of frames that were written on the previous revolution so that this section begins contiguously with the last frame previously recorded, then at the end of the writing process measuring the time left unrecorded and once again adjusting the Synthesizer.

The Flow Chart in FIG. 4 details the above sequence of events.

This process is accomplished as follows:

5(a) Set up for Trigger Counts 04613/05638

At the end of Step 4, the head is passing over the half section of track which is erased. During this time the PC, 8, sets the MUX, 7, to pass the TC INCR signal from the SCU State Machine, 2, to the Trigger Counter; sets the PC MUX, 43, to receive channels 20, 21, 22, and 23 from the Pattern Generator, 6; the PC MUX, 46, to receive the output signals from the PG MUX, 43; via the SRST line, resets the SVDCP counter to zero; loads, via the SPGM line, the SVDCP Decoder with the correct sequence of values for the preset values of both the Read and Write Down Counters, 3.

The PC also conditions, via the MODE line, the SCU State Machine, 2, to produce a TC INCR pulse on receipt of the SRDP1− edge and additional TC INCR pulses for each SDW−, SDW+, and the edges produced by both the terminal counts (i.e. zero) of the Read and Write Down Counters, 3, respectively. The SCU is also conditioned to output A and B pulses to the Timer, 4, on receipt of SDW+ and SRDP1+ respectively, and to output RCLK pulses on receipt of SDW− edges or SRDP1− edges and WCLK pulses on receipt of CK+ edges. The PC sets the timer to make "single shot" measurements each time it is armed.

5(a1) Execution of Trigger Counts 04613/04614

(Look for SRDP1− and SDW+)
(See Row 8 of Table 1)

This is identical to 4(a1) described in Step 4, except that the Trigger Counter is incremented first to 04613 and second to 04614. The SRDP1− edge increments the SVDCP Counter, 40, and the output of the SVDCP Decoder, 41, presets the Read Down Counter to 512 and the Write Down Counter to 256. During this phase, the Read Down Counter is decremented by one on the SDW− edge, and the Read Down Counter state changes from 512 to 511, indicating that the SS negative peak of the first frame has been read.

5(a2) Execution of Trigger Counts 04615/05638

(Read half Master Track)
(See Row 9 of Table 1)

On receipt of the SDW− edge, the Trigger Counter increments from 04614 to 04615 and the Trigger Decoder outputs a TRIGGER WORD to START the Pattern Generator. Trigger Counts 04615 to 04616 are both decoded by the MUX Decoder, 44, to select Channel Assignments 12,13,14,15. The pattern opens a READ WINDOW at the expected location of the next SS negative peak. The resulting SDW+ edge increments the Trigger Counter to 03596 and the corresponding TRIGGER WORD STOP's the outputting of signals from the Pattern Generator. The SDW+ pulse is also used, via the SCU State Machine, to decrement the Read Down Counter, 3, from 511 to 510, indicating that the second frame has been read.

The next SDW− will initiate a repeat of the above cycle which continues until 512 SS negative peaks have been read, and an end count RECNT=0 of the Read Down Counter produces an edge. The PC arms the timer just short of the end of the recorded portion. Since the spindle PLS has, in this example, a worst case jitter of +/- 50 microseconds, the PC, which bases its timing on the SPINDLE REFERENCE pulses, should arm the Timer, 4, at least 50 microseconds early. If the disc speed is 3600 RPM, as in this example, the recorded segment will occupy at least 8.3 milliseconds.

Therefore, the Timer 4, should be armed no later than 8.25 milliseconds from SPINDLE REFERENCE, to allow for a possible 50 microseconds early appearance of the last SDW pulse. The Timer is disarmed by the PC for a brief interval, say 100 microseconds, prior to every Arm command by the PC. The Timer, 4, "A" input will be retriggered on each SDW+ edge.

The first SRDP1+ edge into the "B" input of the Timer will be that occurring at the end of the revolution. The time between A and B triggers will be slighter longer than half a revolution since the last SDW+ occurs on the SS negative peak at the beginning of the 512'th frame recorded in the prior step and the SRDP1+ signal occurs at the first SD positive peak of the revolution. This time will be slightly in error from the nominal time expected because of small instantaneous speed variations. The PC will begin accessing the Timer measurement no sooner than 50 microseconds after SPINDLE REFERENCE. This allows for the worst case spindle PLS jitter of +/− 50 microseconds. Therefore, it is safe to begin accessing the Timer measurement 100 microseconds after SPINDLE REFERENCE. According to the specification of the HP5234B Timer, the time to access this measurement is 1/140 seconds, or 7,143 milliseconds. With some safety margin, the PC can disarm the Timer 7.2 milliseconds after it begins accessing the Timer Measurement. This is 7.2+0.1=7.3 milliseconds after the SPINDLE REFERENCE pulse.

The PC must now calculate the fractional error in time D1, and reprogram the Frequency Synthesizer, 5, to operate at F/(1+D1). The calculation will take less than 0.5 milliseconds and the Synthesizer settles at its new frequency in less than a 0.1 millisecond. This means that the new frequency, Fs, is set in less than 7.3+0.5+0.1=7.9 milliseconds from the SPINDLE REFERENCE pulse. This is more than 250 microseconds earlier than the earliest possible occurrence of the last frame counted which is at 8.3 milliseconds less 0.005 milliseconds less one frame time, or about 8.24 milliseconds. Note that D1, although related to the fractional speed error, is not equal to the fractional speed error. See the APPENDIX for details. Note particularly that dl in the APPENDIX denotes speed error.

In this phase there are two Trigger Counts per frame, except for the first frame, plus one Trigger Count at the end when the Read Down Counter outputs an end count RECNT shortly after the last SDW edge. The total number of Trigger Counts is therefore 1024.

(5b) Set Up for Trigger Counts 05639/24111

The setup for this remains unchanged from the setup described under 5(a) except that the SCU State Machine, 2, is now conditioned (by the PC via the MODE lines) to output a pulse to the "A" input of the Timer, 3, on receipt of the WECNT pulse and the "B" input of the Timer on receipt of the SRDP1+ pulse. This will allow the Timer to measure the unrecorded portion.

The CK channel 19 of the Pattern Generator has been programmed to produce a CK+ edge on every frame end.

5(b1) Execution of Trigger Counts 05639/05640

(Look for SRDP1− and SDW+)
(See Row 10 of Table 1)

This is identical to Step 5(a1) except that the Trigger Count is incremented to 04619 and 04620. In addition on SRDP1+, the Timer completes its measurement, and the PC begins to calculate, and issue commands for, the new Synthesizer frequency, Fs, based on the measurement.

5(b2) Execution of Trigger Counts 05641/06665

(Read 1/2 Master Track, Write 1/4 Master Track, Measure unrecorded portion)
Rows 11 to 12 of Table 1).

On receipt of SDW−, the Trigger Counter increments from 05640 to 05641 and the Trigger Decoder outputs a TRIGGER WORD to START the Pattern Generator. Trigger counts of both 05641 and 05642 are decoded by the MUX Decoder to select Channel Assignment 12, 13, 14, and 15. As in 5(a2), the Read Down Counter has been preset to 512 and this counter is decremented on each SDW+ pulse until RECNT is zero and the Trigger Count has reached 06664. This count is reached at the SS negative peak of the last frame previously recorded. On this count the MUX Decoder selects channels 16,17,18 and 19 which contain the WRITE DATA information for the next 256 frames, including the delay (denoted by DL in Table 1) between the sensing of the last SS negative peak and the writing of the first SD positive peak of the next segment. The Trigger Count of 06664 is decoded to produce a TRIGGER WORD which invokes a JMPA command to the Pattern Generator which initiates the outputting of the next 256 frames of WRITE DATA. Accompanying the WRITE DATA, the CK channel, 19, is programmed to produce a CK+ edge at every frame end. At the end of 256 frames of WRITE DATA the CK+ edge decrements the Write Down Counter from the beginning value of 255 to 0. In order to capture the time measurement of the unrecorded portion, the Pc arms the timer shortly before the WECNT pulse is expected (with due allowance for speed jitter), begins to access the Timer data soon after the SPINDLE REFERENCE pulse, disarms the Timer for a brief interval prior to re-arming it shortly before the WECNT pulse is expected. The PC accesses the Timer measurement shortly after the SPINDLE REFERENCE pulse, computes the fractional time error D21 and reprograms the Frequency Synthesizer to operate at F/(1+D2). CK+ also increments the Trigger Counter to 06666 which is decoded by the Trigger Decoder to produce a TRIGGER WORD which now invokes Row 13.

5(b3) Continuation, Trigger Counts 06666/25,111

The cycle of 5(b1) and 5(b2) is now repeated with the only difference being that the SVDCP Counter has been incremented by a SVCK pulse resulting in new values for "PRESET DOWN COUNTER" being deployed by the SVDCP Decoder in accordance with the program fed to the SVDCP Decoder in the set up described in 5(a). These values are noted in FIG. 13 at the head of every group of three rows, beginning with Row 10. The values are RPRST for the Read Down Counter and WPRST for the Write Down Counter. This ends Step #5.

Step #6: Acquire Phase Lock in Data PLL.

The PC, 8, has been used to count SPINDLE REFERENCE PULSES during the steps 2 to 5. Since then steps occur over a predetermined number of revolutions, the PC will know when the last revolution of Step 5 is about to begin within a worst case timing tolerance of about +/− 50 microseconds, this tolerance resulting from the phase jitter of the Spindle PLS. At the beginning of the last revolution of Step 5, the PC will so inform the microcontroller, 14, and the microcontroller will program the VCO frequency, SCLK, of the Data PLL, 13, to F using the PROGRAM DATA RATE lines, and assert an ACQUIRE command after a delay of somewhat greater than 200 microseconds. The PLL, 13, will then be exposed to a constant frequency equal to the frame rate as a result of the READ WINDOW action on the Dibit Select Gate, 19. The acquisition time is far less than one revolution and the ACQUIRE signal to the PLL is de-asserted after a few milliseconds. Now the PLL can accept random SDW signals so long as the transitions are in increments of Tlcf. At the end of the last revolution in Step 5, the SCU State Machine is conditioned to force ERESET low at the Programmable Revolution Counter, 9, and shortly prior to this, the IX MUX, 21, has been latched by the PC to select the DERIVED SPDL FDBK PULSES. Also prior to this, the microcontroller will program the divide ratio of the Programmable Revolution Counter, 9, using the lines "SCLK CLOCKS PER REV". When the ERESET line goes low the Programmable Revolution Counter, 9, begins to count SCLK pulses from the PLL, 13. ERESET is also used to reset the counters in the EU State Machine, 16, and said counters are now clocked with a delayed version of SCLK, beginning their counts on an SCLK transition which is synchronized with the first SS negative peak in a revolution.

The end of Step 6 is synchronized with the end of Step 5 and is signified by the ERESET signal going low.

Step #7: Measure Correction Factor for EU Time Delays.

In Steps 2 through 6, the Pattern Generator has operated in synchronism with the disc speed because all writing has been synchronized directly from SRDP1 (the first pulse in a revolution) or from one of the windowed read signals SDW.

In Steps 7 and 8, the Pattern Generator will operate in synchronism with the ASRP pulses and therefore its timing will differ from that of the disc speed by the jitter of the spindle PLS. In the example chosen, this is assumed to be +/− 50 microseconds.

As in the case of Master Track writing, delays can contaminate the timing accuracy with which subsequent tracks are written. Since all subsequent tracks will be written simultaneously their accuracy will depend on correcting for timing delays internal to each EU and HDA combination. This step concerns itself with measuring this characteristic delay for each EU and HDA pair. This delay is different from the delay determined during Step 4, because none of the SCU 4 electronics is involved in this delay.

The PC loads the Pattern Generator with all the information required for writing four track types together with the information needed for a "Trial" write of Track Type B. The trial write will be used to measure, and then correct for, the delay between sensing a read peak and writing a transition.

Table 2 is the Pattern Generator planning sheet for Steps 7 and 8. The terminology is now familiar, having been discussed in detail in Steps 4 and 5. The major difference in the Pattern Generator operation for Step 7 is that it will output an entire revolution (or two revolutions) of WRITE DATA, READ WINDOW, WRITE GATE, and CLOCK IN upon initiation with an ASPR pulse negative edge, ASPR−. For example, directly on receipt of the first ASPR−, the Pattern Generator outputs the entire signal sequence for Part 1 of Track Type B. The intimate connection between signals read from the disc and the outputting from the Pattern Generator is broken and replaced by the indirect link between ASRP and SRDP1. As has been mentioned, this indirect link experiences a timing uncertainty of +/− 50 microseconds due to the jitter in the Spindle PLS. This timing jitter will be absorbed by the FIFO's, 15, 17, and 18 with the aid of the EU State Machine, 16.

While still at track 0 (the Master Track), store the full track AGC control voltage. All head assemblies are now positioned to track 1, while the AGC mode is ON. The raw head signal is about 50% of the amplitude obtained when reading the prior track because only 50% of the width of the head is now positioned above recorded data. However, the AGC has ensured that a full amplitude signal is available within the RDP chip. The AGC is now put into the HOLD mode with an AGC control voltage held (by a DAC) at the value most recently attained for the half track signal amplitude. All three FIFO's are simultaneously enabled and the following sequence is executed for each EU and HDA assembly in turn.

The way in which the FIFO's operate to buffer the instantaneous disc speed variations from the Pattern Generator (which is now synchronized to the ASRP pulses) is as follows:

First, examination of FIG. 7 reveals that the beginning of a frame is at the negative edge of the delayed frame clock, DFCK− (a signal internal to the EU State Machine) and the end of the frame is at the next positive edge of DFCK+. Now the DFCK pulse is made very short, say 20 nanoseconds. Second, it is observed that the instantaneous speed variation of the disc +/−0.05% in this example, can cause the recorded frames to expand or contract by this amount. This produces an insignificant error in frame timing, but the error must not be allowed to accumulate. If the Frequency, F, is designated as the Master Clock, then each Master Clock has a duration of 1/48E6=20.833 nanoseconds. If the frame duration is normally 16 nanoseconds, then it may vary in length by +/− 0.05% or +/− 8 nanoseconds. Therefore, the frame is potentially foreshortened by two factors: (a) a fixed amount of 20 nanoseconds due to the width of the DFCK pulse and (b) up to 8 nanoseconds due to instantaneous speed variations.

To deal with this it is proposed to divide a frame into Master Clock Pulses. A nominal frame will contain 16E-6/20.833E-9=768 Master Clock Pulses. To avoid "losing" any Master Clocks, the number of Master Clocks produced by the Pattern Generator will be reduced by 2, thereby foreshortening the frame duration by 41.667 nanoseconds so that the resulting 766 Master Clocks will always fit within the frame defined by the extent from DFCK− to DFCK+ even when the pulse width of DFCK is 20 nanoseconds and the instantaneous speed changes by 0.05%. In this example, then, the M Master Clocks referred to in FIG. 7 are in fact 766 Master Clocks.

The FIFO's are fed these M Master Clocks on the CLOCK IN line. A corresponding number of M delayed SCLK clocks from the EU State Machine clocks out the FIFO's on the CLOCK OUT line.

7(a). Set Up for Trigger Counts 00001/00011.

(See Rows 1 through 6 of Table 2)
(Trial Write Part 1, Track Type B and measure time error).

The PC, 8, loads the Pattern Generator, 6, with all of the data prescribed in Table 2, and resets Trigger Counter, 38. The PC conditions the SCU State Machine to receive ASRP signals from the Divider, 1, and to increment the Trigger Counter, 38, on each positive ASRP edge (ASRP+) and negative ASRP edge (ASRP−). The PC instructs the microcontroller, 14, to enable FIFO's, 15, 17 and 18 by appropriate selection of the SWD MUX, 22, WG MUX, 23, and RS MUX, 24; to initialize the Programmable Delay Units, 10, 11 and 12, in the middle of 4 their range; and to load various parameters into the EU State Machine so that it can control CLOCK OUT signals in accordance with Track Type. The EU State Machine contains counters which are reset by the ERESET line from the PC. One of the counters in the EU State Machine accumulates the current revolution number by counting the DERIVED SPDL FDBK PULSES. By virtue of this count value, the EU State Machine is knowledgeable about the current mode of operation and the Track Type. Another counter in the EU is the CLOCK OUT counter. This counter is arranged to output a fixed number, M, of clock pulses in each frame.

The number M does not change from one track type to another with the example pattern selected. However, this is not a constraint: M may be different for different track types if desired. A further counter in the EU counts delayed SCLK pulses so that it may keep track of the Frame number.

The EU State Machine, as a result of counting events such as SCLK etc., together with word sequences loaded into it by the microcontroller, 14, can, at the beginning of each revolution as determined by DERIVED SPDL FDRK PULSES negative edge (DSFP−), decide:

(a) the # of clocks per frame, M, to be outputted on the CLOCK OUT line (b) the time location in the frame at which the CLOCK OUT pulses are to begin.

7(a1). Execution of Trigger Counts 00001/00002

(See Row 1, Table 2)
(Trial Write of Track Type B, Part 1)

Now the trial write of track type B, according to the timing diagram of FIG. 7, will begin on the receipt of the next ASPR−. This will increment the Trigger Counter to the value 00001, thereby, via the Trigger Decoder and MUX Decoder respectively, invoking the complete patterns for writing Part 1 of Track Type B from channel assignments 0,1,2,3. These patterns include WRITE DATA, WRITE GATE, READ WINDOW, and CLOCK IN. On receipt of ASPR+, the Trigger Counter increments to 00002, thereby resulting in a STOP TRIGGER WORD. The signal CK is a burst of M pulses in each frame, the burst lasting for slightly less than the duration of a frame.

7(a2). Execution of Trigger Counts 00003/00004.

(See Row 2, Table 2)
(Measure Timing Errors from Q− to Q+)

On receipt of ASRP−, the Trigger Counter increments to 00003 which, via the Trigger Decoder invokes a START command to the Pattern Generator, while simultaneously, the MUX Decoder assigns Channels 4,5,6, and 7. The Pattern for measuring the timing discrepancy occurring during the trial write of 7(a1) is outputted for a revolution. This pattern opens READ WINDOWS's at the expected locations of Q− and N+ respectively, in each frame. The Timer is armed by the PC somewhat more than 100 microseconds after SPINDLE REFERENCE and remains armed for a substantial portion of a revolution.

The READ WINDOW pattern is buffered by FIFO, 18, which is clocked out at M pulses per frame by the EU State Machine, where M is fixed in this example, but in general may vary from frame to frame by preloading the EU State Machine with the appropriate information. The READ WINDOW opens the Dibit Select Gate at the expected locations of the Q+ and Q-negative peaks. In this way the Timer reads the average time interval between these peaks over the period for which it is armed. This measurement reveals the timing error incurred during the trial write of track type B. This error, Dtq, is stored so that track type B can be re-written (in the same manner in which the trial write of track type B took place) and all subsequent tracks written with a delay programmed at P=Pmid-Dtq delay units.

Other HDA/EU combinations may have different delays and the delay errors are ascertained by repeating this step for all HDA/EU combinations and storing each delay error, Dtq.

Step #8: Write All Remaining Tracks.

All subsequent tracks will be written in parallel, with all HDA spindles phase locked to the common spindle reference from the SCU. In this mode the PC, 8, commands all microcontrollers, 14, simultaneously to ENABLE their respective 32H523R chips, 33, since all EU/HDA combinations will be operated in parallel. The FIFO buffers are used to accommodate the phase jitter between all spindles and the reference. The process of preparing the various counters, decoders and MUX's has been described in detail for trial writing of track type B, and also included the parameters for all other track types, needed for Step 8.

Each EU has stored the number of clock pulses, P, by which the frame clock is delayed. This value of P is usually slightly different for each EU.

8(a) Execution of Trigger Counts 0003/0011, General Description

Table 2, Trigger Counts 0005 through 0011 should be consulted for details of the Pattern Generator. For Track Types B and C the corresponding timing diagrams are in FIGS. 8 and 9 (for B) and FIGS. 10 and 11 (for C). All of this was preloaded from the PC into the Pattern Generator at the outset of Step 7. The only changes in setup for Step 8 are that the Programmable Delay Units are now set up for P delay units (in accordance with the timing error measured during Step 7), and the SCU is conditioned to initiate a START on every third ASRP− signal. At the end of the Part 2 of Track Type B, the PC issues a seek command and the next ASRP− initiates Track C writing. This process continues with a seek, Track D writing, seek, Track A writing, seek, Track B writing, etc., until all tracks of these types have been written. If other track types are desired on some annular portions of the disc, it will be necessary to wait while the Pattern Generator is reloaded. The process continues until all tracks on the surface have servo-written.

8(b) Execution of Trigger Counts 0003/0011—More Details

The details of writing Track Type B will be described.

Part 1 of servo-writing a track takes place after the positioner has moved to the track to be written. The read signal will be kept at the correct level for the RDP because the AGC was operating during the move, and the AGC control voltage is held at the appropriate value with the AGC in HOLD mode. This control voltage keeps the AGC gain at a level appropriate for recovering the half amplitude signal.

Figure 8A:
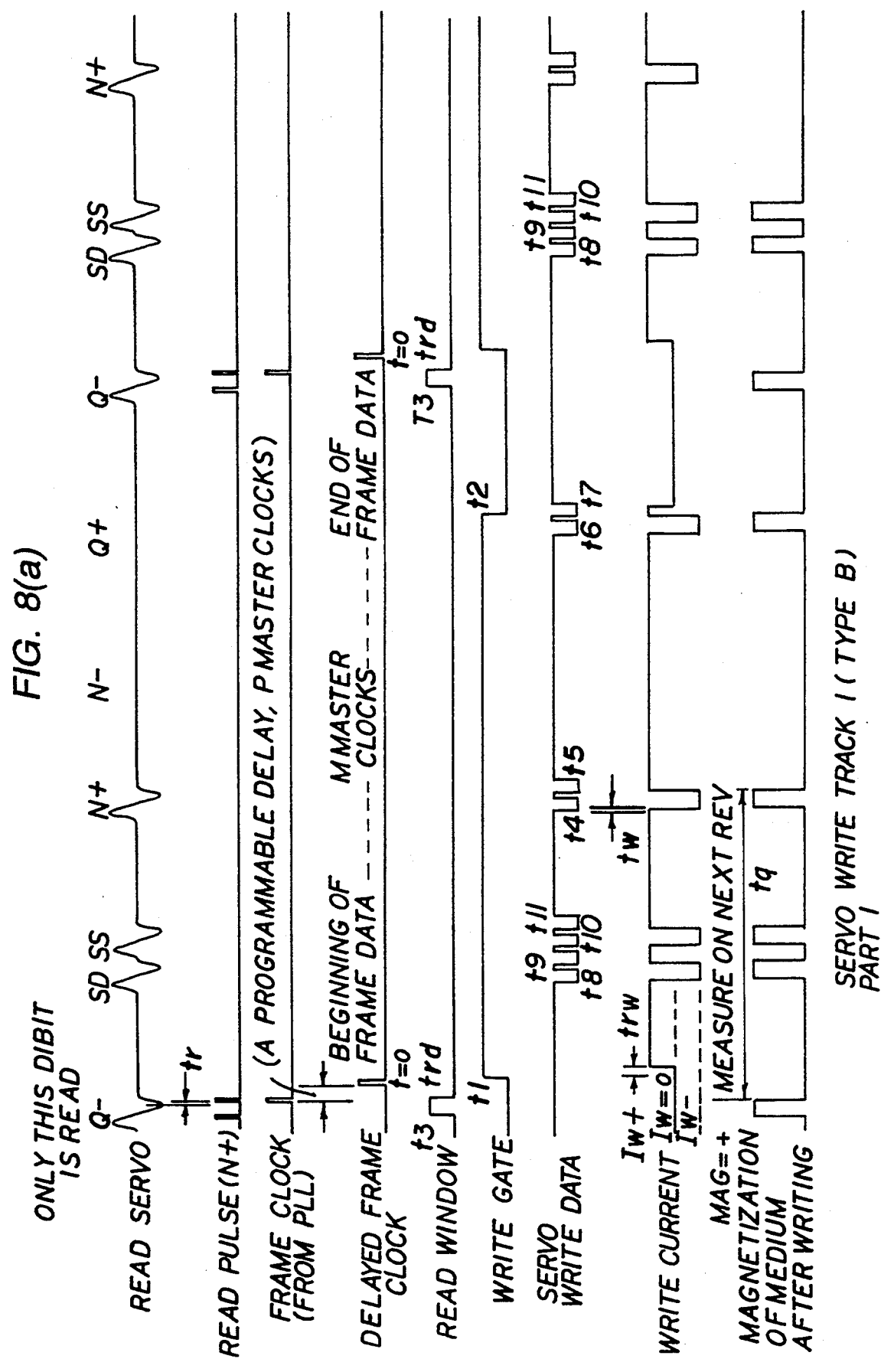

FIG. 8 illustrates the timing diagram for Part 1 of writing track type B. Prior to the beginning of the revolution, the SCU loads the appropriate parameters (for 2 revolutions—Part 1 & Part 2) to all EU's simultaneously.

The EU State Machine is signalled to begin frame counts on the SCLK clock corresponding to the Q− dibit, for Part 1 of track type B.

The SCU issues the pattern for two entire revolutions to all HDA's simultaneously. It must initiate the loading of the pattern into all the FIFO's in 18 advance of the spindle reference pulse by at least the worst case expected spindle phase jitter, but not so far in advance that the FIFO's capacities are exhausted. This is the reason that the ASRP-Pulse is used to initiate the Pattern Output (via the SCU State Machine, Trigger Counter, Trigger Decoder and MUX Decoder).

The pattern is clocked into the FIFO's from the Pattern Generator by M bursts of CLOCK IN's per frame. The FIFO's are clocked out by M bursts of CLOCK OUT pulses initiated by the State Machine, 16, of each individual EU. If the short term speed variations were about +/− 0.02% over a frame interval, for example, then the timing error would +/− 0.02% of 16 microseconds, or +/− 3.2 nanoseconds.

Figure 9A:
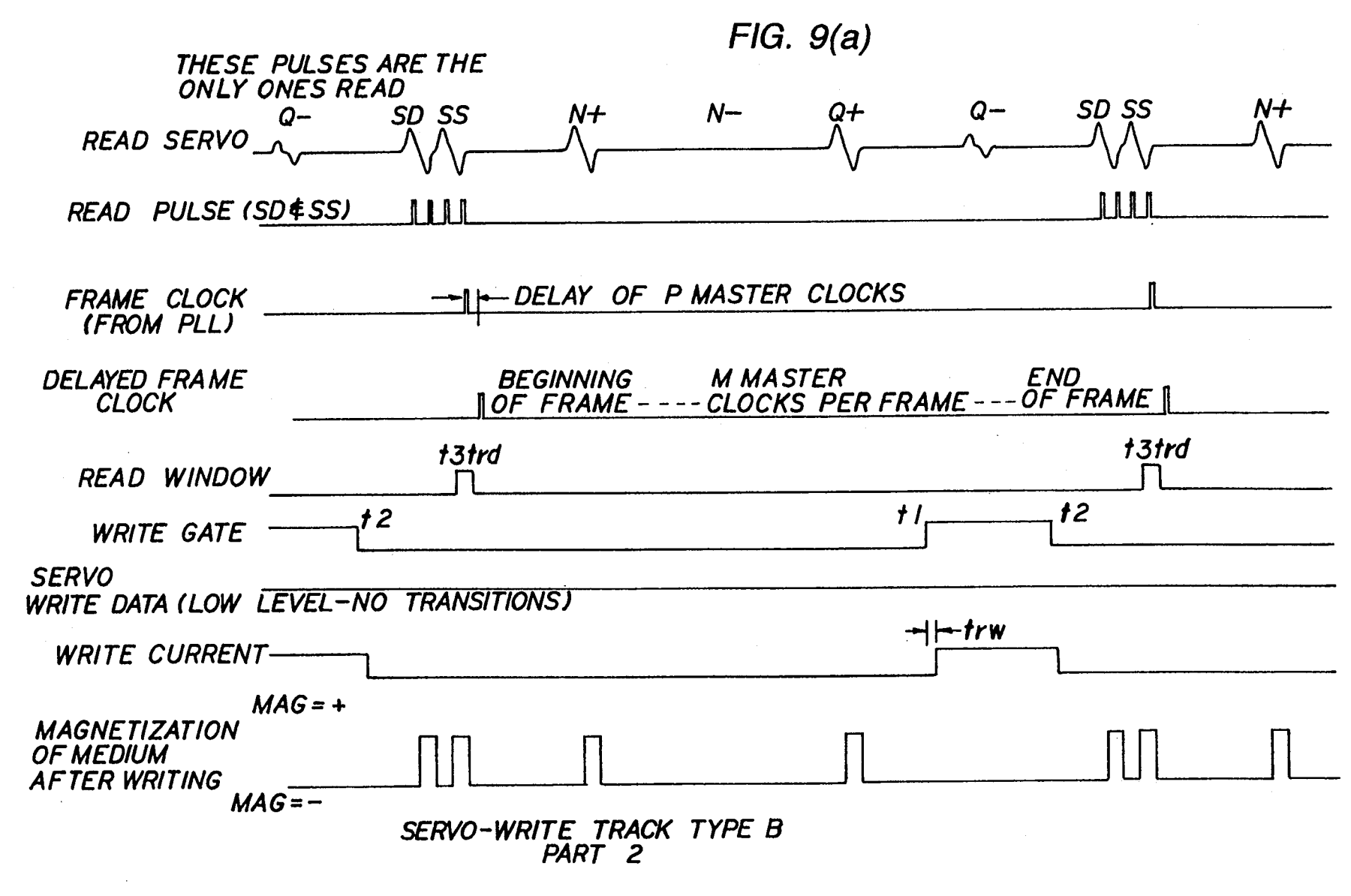

After 1 revolution, the magnetization pattern is as depicted in FIG. 8. Note that because of the head width, the Q− dibit written in the prior track location is still present. Indeed, its presence was necessary as a trigger for Part 1 of writing track type B. Now, however, this vestigial transition must be erased. In addition, the other dibits will have approximately twice the amplitude of the vestigial dibit. FIG. 9 depicts the timing.

The AGC control voltage is therefore set to the prior "full track AGC volts" to bring the signal levels within the RDP to their normal values. This is done at the end of reading the last Q− pulse in Part 1, prior to beginning Part 2 of track type B servo-writing. As noted above, prior to writing Part 1, the SCU had loaded appropriate parameters into all EU's simultaneously, the FIFO's are used for buffering, but in Part 2 of writing track B, the EU State Machines, 16, are arranged to count frames on the SCLK pulse corresponding to the negative SS peak, and the erasure process is timed from the delayed frame clock with Write Gate encompassing the dibit to be erased.

Figure 10A:
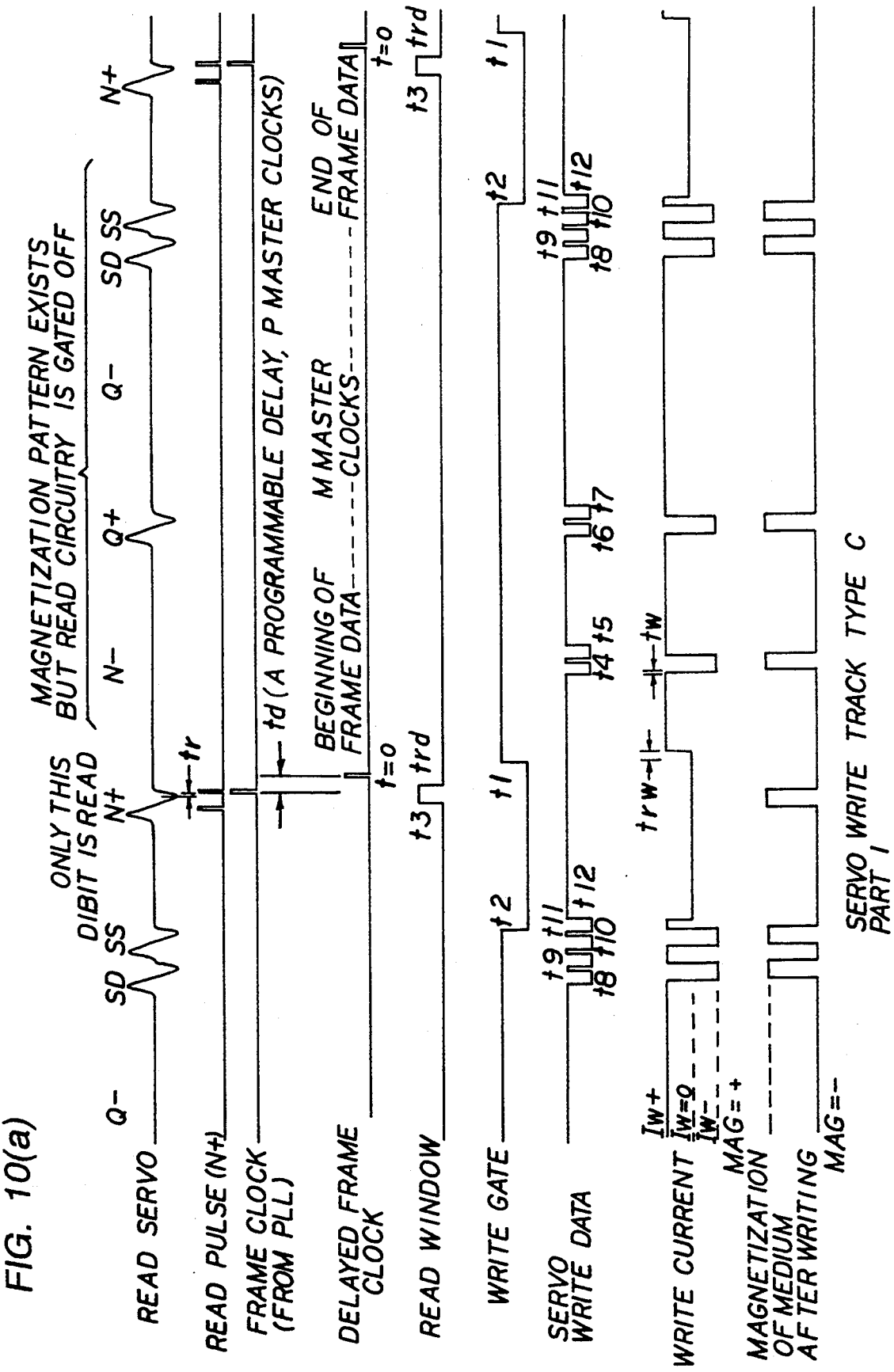
Figure 11A:
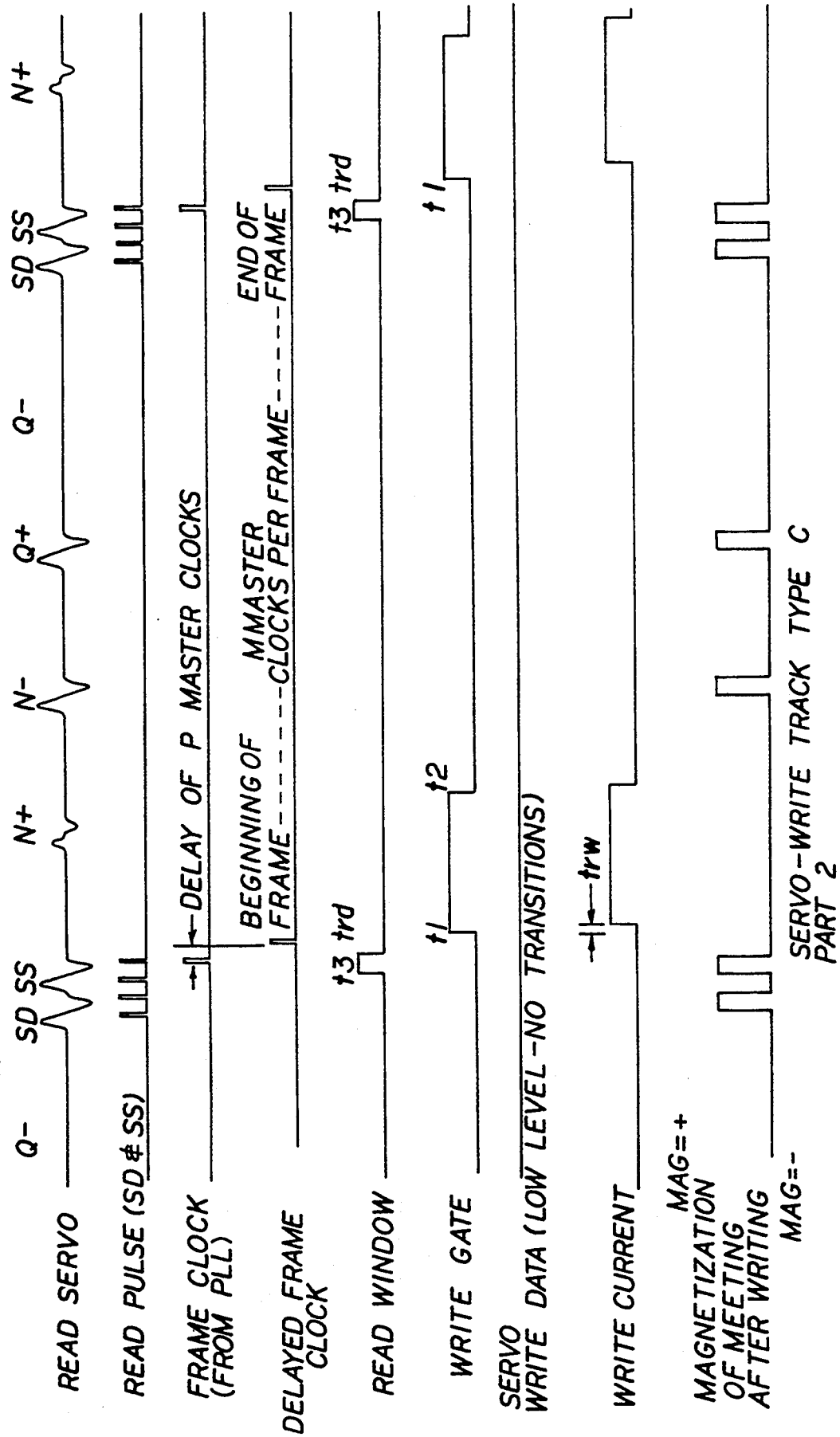

With track type B written, the AGC reset routine is invoked, accompanied by a seek to the next track to be written. This next track is track type C and the detailed timing diagrams for writing Parts 1 and 2 of track type C are depicted in FIGS. 10 and 11. The timing diagrams for writing track types D and A are not shown; however they follow the same general pattern established above for track types B and C.

The Table below identifies on which SCLK pulse the EU State Machine is to count frames for the 4 track types:

| Track Type | Frame Count on SCLK pulse corresponding to peak of: |
|---|---|
| A, Part 1 | N− |
| A, Part 2 | SS |
| B, Part 1 | Q− |
| B, Part 2 | SS |
| C, Part 1 | N+ |
| C, Part 2 | SS |
| D, Part 1 | Q+ |
| D, Part 2 | SS |

The frame counting process is illustrated in FIG. 12. This diagram shows the transition on which the frame counter, in the EU State Machine counts for Parts 1 and 2 of each track type. In the example of FIG. 12 there are 8192 frames per revolution. The first line of the diagram depicts the transitions already recorded in track type A.

The next line indicates the frame count values while positioned over track type B and recording track type. C from timing generated from the SCLK pulse corresponding to the Q− negative peaks available from track type A.

Examination of FIG. 12 reveals how the frame counter changes the counting instant at the end of Part 1 and the beginning of Part 2. Writing in Part 1 ends when the count reaches 8191 and the last transition of Part 1 has been recorded. As soon as the last transition of Part 1 has been recorded, the frame counter is arranged to increment on the negative peak of the next SS pulse.

When all tracks are written, Step 8 ends, and all HDA's may be removed from the track writer.

Pattern Generator Operation

All the desired signal patterns have now been defined. Now, the method of programming the Pattern Generator, 6, to provide these signals will be described.

This description should be read in conjunction with the Hewlett Packard Operating and Programming Manual for the 8175A Digital Signal Generator, Publication #08175-90006, printed May, 1985.

The Pattern Generator can output a 24 bit wide word of arbitrary composition. This 24 bit word is called a "pattern" of bits in the Hewlett Packard manual. The Pattern Generator can be used in a mode in which it is supplied with an external clock of period Tc, where Tc must be greater than 20 nanoseconds. This is the mode in which the Pattern Generator is utilized in this invention. The duration of a "pattern" of 24 bits can be programmed to any integer number of external clock periods between 2 and 999. The "pattern" of 24 bits and its programmable duration is said to occupy an "address" in the terminology used in the Hewlett Packard manual. There is a limit of 1024 on the number of such addresses. To extend the versatility of the Pattern Generator, it has been designed to allow up to 1024 addresses to be divided into segments. For example, segment #1 could occupy addresses 000 to 0240, segment #2 could occupy address 0241 to 0807 and so on. Any of the segments can be repeated a programmable number of times. If a specific segment is repeated N times, then it consumes N segments out of a maximum permitted of 255. For example, if segment #1 was repeated five times and segment #2 was repeated 28 times, then this would constitute using up of 33 of the available maximum of 255 segments. A further feature of the Pattern Generator is that it can respond to a TRIGGER WORD so as to begin a pattern at the START address or an address labelled JMPA or an address labelled JMPB. The Pattern Generator will stop outputting its signal either on reaching the END of the pattern or on receipt of an appropriate TRIGGER WORD.

The Pattern Generator is programmed so that the desired patterns can be achieved within the limits of its memory. This is particularly important since the time to load a new pattern sequence into the Pattern Generator can be as long as 1.8 seconds. The Pattern Generator will be programmed so that the pattern sequence for Master Track writing is loaded into the Pattern Generator from the PC in parallel with the time taken to spin up the disc. The pattern sequences for subsequent tracks are loaded after the Master Track is written. This can occur simultaneously with a d.c. erase operation if desired.

The first step in planning the program for the Pattern Generator is to determine how many addresses are required in a segment. This is simply 1+the number of possible level changes in a segment. During the Writing of the Master Track, the READ WINDOW occurs only at the SS negative peak, involving two level changes. As will be explained in the following paragraphs, there are four frames in a segment for a total of eight level changes, therefore requiring nine addresses.

For the same reason WRITE GATE also requires nine addresses. WRITE DATA can occur in any one or more of six different dibit locations. Since the Pattern Generator is programmed to output NRZ(I) WRITE DATA, and since there are four frames per segment, this involves 24+1=25 addresses. Therefore the total number of addresses per segment during writing of the Master Track is 9+9+25=43 addresses. It will be shown later that two segments are required for maximum Track Writing. Therefore, the total number of addresses required is 2×107=214, comfortably less than the 1024 maximum allowed.

It will be shown later that four segments are provided for writing the subsequent tracks. During the writing of subsequent tracks, READ WINDOW can occur in one fewer locations than there are dibits i.e. 5. Since there are four frames in segment #1, this requires (4×2×5)+1=41 addresses. Similarly for WRITE GATE, which therefore also requires 41 addresses. WRITE DATA provides 25 addresses as in the case of Master Track writing. The total number of addresses in the first segment is therefore 41+41+25=107 addresses.

In the second segment there are ten frames. Consequently, there are (10×2×5)+1=101 addresses for READ WINDOW, (10×2×5)+1=101 addresses for WRITE GATE and (10×1×6)+1=61 addresses for WRITE DATA. Therefore, the total number of addresses in segment #2 IS 101+101+61=263.

Segment #3 has the same number of addresses as segment #1 and segment #4 has the same number of addresses as segment #2. The total number of addresses provided is therefore 107+263+107+263=740, which is comfortably within the allowed maximum of 1024.

A special pattern of Mark frames and Normal frames is written every revolution. For this example suppose that this is up to four frames long and is a sequence NM2N where this nomenclature means a sequence of one Normal Frame (SD dibit present), one Mark Frame (SD dibit absent) and two Normal Frames.

In addition, Outer and Inner Guard Bands are often provided in which Mask and Normal frame sequences are different from the index segment and different from the Data Zone in which all frames, other than the Index sequence are Normal frames. The outer and inner guard zone sequence are usually repeated over the extent of the track. In the following description of the Pattern Generator operation and in particular with reference to FIGS. 13 and 14, it is assumed that there is no special Mark and Normal Frame sequence for the first track which are ordinarily in either the outer or inner guard band. This assumption is not limiting because the following description would apply equally to a system in which, for example, the outer zone was designated by an alternating sequence of Mask and Normal Frames in all parts of the track outside the Index Segment. The inner Guard Band would then be designated by an alternating sequence of Normal and Mask zones to distinguish it from the outer guard band. The Data Zone would then follow the patterns delineated in FIGS. 13 and 14.

Now refer to the programming plan sheet in FIG. 13 and FIG. 3A. This illustrates a planning chart used for programming the Pattern Generator, 6.

It is envisaged that a Trigger Counter, 39, be incremented by one count for each new signal sequence which is desired from the Pattern Generator. The invention provides only four channels at one time so the four channels which are desired may be selected from the 24 available by the Multiplexor PG MUX.

Examining the headings for each column in Table #1, the Trigger Count column is intended to indicate the state of the Trigger Counter, 38. The Activity column describes the current mode of operation of the writer. The FIG. # column references the activity in question to a timing diagram. The column headed "Contents of Segments" is divided into two parts: segment #1 and segment #2. These column entries contain a brief description of the nature of the pattern contained in segments 1 and 2. The column "Address" denotes the address range to be occupied by the pattern in Segments 1 and 2. Although the Mark Frame contains two less actual transitions than the Normal Frame, the number of addresses is chosen to include the two missing transitions as if they were present. Similarly, although N− and Q+ transitions are absent from a type A frame, the number of addresses chosen include the transitions at N− and Q+. The total number of addresses does not exceed 1024. The column headed "# of Segs" indicates the total number of segments occupied by the pattern. For example, if segment #1 repeats three times and segment #2 repeats eight times, then the entry in this column would be 11. This number should not exceed 255. The column headed START indicates the condition under which the Pattern Generator should initiate its output. The column headed JMPA indicates the condition under which the JMPA command is invoked and allows for an alternative "START" for a pattern sequence. The column headed STOP indicates the condition under which the Pattern Generator is to cease outputting and freeze at the current 24 bit pattern. This may occur when the programmed pattern is exhausted (indicated by an "END" designation) or when an event happens e.g. some external pulse or signal edge. The column headed Channel Assignment indicates the group of four channels which are to be selected by the PC MUX, 43, for use by the system.

The START, JMPA and STOP conditions are initiated by the TRIGGER WORD line. The Pattern Generator may be programmed to recognize up to eight different TRIGGER WORD's; however, only three (START, JMPA and STOP) are used in this example. As previously mentioned, the Pattern Generator experiences a delay between sensing a TRIGGER WORD change and the beginning of outputting a sequence of words. Let this delay, added to the other delays expected in sensing a signal from the disc and writing a transition on the disc, including the delays in the Programmable Delay Units when set in the middle of their operating range, be denoted by Td. The Pattern Generator is then programmed to output signal sequences which are advanced by Td so that the average systematic delay is compensated for.

Now reading the entries in Row 1 in FIG. 13, tile Trigger Count 00001/00002 indicates that the designated pattern is to START on receipt of a PC command on the PG STIM line and to stop when Write Gate goes low (WG−). The sequence to be output is comprised of two segments, the first of which has the general form of Normal, Mark, Normal, Normal, hence the shorthand designation NM2N. The first segment contains 43 addresses. The second segment contains four Normal frames (hence the designation 4N) repeated 127 times; hence the shorthand notation 127*(4N). The aggregate number of segments is 1+127=128 since the second segment repeats 127 times. Although the second segment is repeated 127 times, it nevertheless contains the same number of addresses as the first segment i.e. 43. The total number of addresses is 2×43=86 and the address range is 0 to 85.

Finally, in the first row, the Channel Assignment designates channels 0, 1, 2 and 3 to be chosen from the Pattern Generator by using the PG MUX, 43. The Trigger Count 00001 is decoded by the Trigger Decoder, 39, to indicate a START and the Trigger Count 00002 is decoded by the Trigger Decoder, 39 to indicate a STOP.

The Trigger Count is also decoded by the MUX Decoder, 44. In this case Trigger Counts 00000 and 00001 are both decoded to the same value to select the group of 4 channels comprised of Channels 0, 1, 2 and 3.

In the remainder of FIG. 13, TRIGGER WORD's are decoded to initiate pattern output at either a START or JMPA Pattern Generator address or to STOP the Pattern Generator Output. The TRIGGER WORD is also decoded by the MUX Decoder, 44, to select one of five groups of four channels as indicated in the table.

Since there are only three decodes for the TRIGGER decoder, they can be represented with two signals. Trigger Count goes up to 25,111 in FIG. 13. Therefore, for complete flexibility in the Trigger Decoder, 39, it should be a 64K×2 Static Random Access Memory (SRAM). By the same reasoning, the MUX Decoder, 44, with only 5 states, can be a 64K×3 Static Random Access Memory. The SRAM must have an access time commensurate with the system speeds. SRAM's with 20 nanoseconds access time are available and should be chosen.

In FIG. 13, the address locations of rows 2 through 11 and 13, 14, 16, 17, 19, 20, 22, 23, 25, 26, 28, 29, 31, 32, 34, 35, 34, 38 can overlap the 86 Addresses assigned to the first row. This is because the channel assignments are selected in a way which avoids conflicts. Address locations for rows 12, 15, 18, 21, 24, 27, 30, 33, 36 and 39 are the same and so are the Channel Assignments since the desired data sequence is the same, the only difference being the instant at which the sequence is terminated.

By judicious choice of patterns and segments, virtually any pattern can be accommodated. More complex patterns can be handled either by paralleling two or more Hewlett Packard Pattern Generators, or by designing a custom Pattern Generator suitable to the desired pattern. Such a Pattern Generator can be designed by straightforward use of high speed logic and memories and is believed to be within the abilities of a person of ordinary skill in the relevant art.

The Write Data required by the Read/Write Chip, 33, is in the form of short pulses. To minimize the burden on the Pattern Generator memory, the Pattern Generator Channel which delivers Write Data will be programmed to produce Non Return to Zero (I) format. This format calls for a change of level (either high to low or low to high) in the Pattern Generator signal whenever a Write Data pulse is desired. A "Bi-directional" monostable, BMS, 45, in the SCU performs the function of creating a short WRITE DATA pulse for each transition (of either polarity) from the Pattern Generator.

In the Address assignments discussed above, Address location 1023 remained unused as did the JMPB TRIGGER WORD. To provide for a quiescent state on power on and at other appropriate times, when the Trigger Counter State is 0000 (as invoked by a TRESET signal for the PC), the Trigger Decoder issues a JMPB TRIGGER WORD and the MUX Decoder selects Channel Assignment 0, 1, 2 and 3. JMPB invokes address 1023 and at this address Channels 0, 1, 2 and 3 are programmed to contain LOW, LOW, HIGH, and LOW respectively. This condition precludes inadvertently writing on the disc and also closes the READ WINDOW.

FIG. 14 illustrates the manner in which signals are recorded in tracks 2–5 after the signals are recorded in the first track (track 1). As described previously, the pattern of signals in each of the tracks 1–4 is different from the patterns of the signals in the others of these trunks. The pattern of the signals in track 5 is the same as the pattern of the signals in track 1. Track 6 will have the same pattern of signals as track 2 and track 7 will have the same pattern of signals as track 3, etc.

This process repeats until a new zone is encountered. For example, when the outer Guard Band is encoded with a special Mark and Normal Frame sequence, upon reaching the Data Zone, 4e a new servo pattern is provided which reflects a new Mark and Normal frame sequence. If the Pattern Generator has sufficient memory, this would be accomplished by invoking a JMP B command; if not, the Pattern Generator should be recorded with the new servo pattern from the PC.

It will be appreciated that a different number than four (4) patterns may be provided without departing from the scope of the invention. For example, in the next embodiment of the invention, eight (8) different patterns are described. It will also be appreciated that different patterns of signals may be provided in individual frames in a single track without departing from the scope of the invention.

The embodiments in this invention use a magnetic head. However, other types of transducers than magnetic heads can be used without departing from the scope of the invention. Accordingly, the use of the terms "transducer means" and "head" in the claims is intended to be on a generic basis, rather than on a limited basis, to specify any particular type of head such as a magnetic head.

The embodiments of this invention are disclosed as relating to a memory member such as a disc. However, as will be appreciated, other types of memory members such as tapes are intended to be included within the scope of this invention. Because of this, the term "cyclical movement" is used in the claims to include all of the different embodiments of memory members which can be used to practice the invention. The term "cyclical movement" is intended to include the movement of a tape which moves in alternate passes in a forward direction and in the other passes in a reverse direction.

An additional application of this invention is in the manufacture of rotary position encoders. In this application, a memory member such as a disc is attached to a drive motor. By bringing a write/read transducer adjacent to the memory member, a splice free track can be written. The information written on the track can either be of a form suitable for use as an incremental encoder (e.g. a predetermined number of transitions per revolution) or of a form suitable for use as an absolute encoder (e.g. a pattern of transitions in which each frame encodes the absolute angle associated with the frame location). Such an encoder is superior to the existing optical encoder in that the rotary position information is encoded on the memory member which is already attached to the motor. A conventional optical encoder is attached to the motor after it has been encoded with rotary position information, thereby leading to errors due to the inevitable eccentricity with which such an encoder is attached to the motor shaft.

Summary of First Embodiment of Invention Shown in FIGS. 1–14

The process is feasible because the time between Write and Read always exceeds the recovery time of the head chip and of the decoding chips which comprise the read circuitry following the head chip. Since read decoding takes place with a small but known delay and is typically jitter free to within less than 5 nanoseconds, the timing of the newly recorded transitions can be very accurately controlled. The writing of 1 frame is controlled by the reading of the prior frame so that the new transitions are written with a tolerance not much larger than the tolerance with which the master track frames were written, i.e. about 16 nanoseconds. By comparison with the above technique, methods depending on clock information from another head have worst tolerances in alignment of transitions from track to track because each head typically vibrates circumferentially and their respective vibrations are not correlated. This typically results in transition mis-alignment between tracks of greater than 20 nanoseconds.

If a shorter Read to Write (or vice versa) time is to be used in the pattern than the chip is specified for, the impasse can be resolved as follows:

For master track writing, the switch from reading to writing is anticipated by sensing the frame prior to the last recorded frame, or, by writing a master track consisting entirely of SS and SD magnetization patterns. For writing subsequent tracks, the impasse may be resolved in 1 of 3 ways:

(a) If the chip timing is no more than about 25% slow, the disc speed may be changed downwards by the appropriate percentage while writing.

or (b) If the chip timing is substantially longer than the required pattern timing, the pattern may be recorded in 2 successive revolutions, during the first of which even frames are written triggered by reading of odd frames, and vice versa on the second revolution. In this case the chip timing can be as long as slightly greater than 1 frame time; or (c) By improving the Read after Write recovery of the RDP chip with external components. This technique helps because the RDP recovery is longer than the recovery of the head chip. The head chip recovery can be as short as 600 nanoseconds worst case (e.g. SSI Part #SSI 32H523R) and this is the limiting factor if the RDP recovery is sufficiently improved.

In the example above, the number of frames was assumed to be a power of 2. The method will, however, work equally well with any number of frames, including prime numbers. This is accomplished by subtracting from the total number of frames, Nf, the largest power of 2, say $2^n$ which is less than Nf. The first revolution of the Master Track is then written with Nf-$2^n$ frames and all subsequent revolutions are written with a number of frames which is a power of 2. Equally obvious is that the method does not depend on the nominal period of a revolution being a power of 2 as was assumed in the example.

Some systems may wish to avoid the signature of recorded frequency modulation of the frame rate introduced by the successive division by 2 during master track writing. This can be done by dividing the master track into smaller portions, each of different lengths. The last remaining portion is then subjected to the "successively smaller" writing process as before. The result of this will be to have substantially higher frequency modulation components in the frame rate. Even further improvement of frequency modulation may sometimes be obtained by switching off the power to the motor during writing of segments and deliberately "ramping" the frequency synthesizer down in frequency to match the known and predictable slow down of the spindle due to windage. This last approach avoids most of speed variations induced by spindle motor torque ripple and cogging, and minimizes the frequency modulation of the frame rate.

SECTOR SERVOS

Although the method is described by an example with a dedicated surface, it is also applicable to a wide variety of embedded (or sector) systems. It must be remembered that in an embedded, the information is written and read with a data head. Consequently, the head assembly is moved by ½ of a data track pitch for successive tracks and the throughput is almost twice as slow.

The procedure for writing a disc drive with sector information will be described in the case of a typical sector pattern. Although there are a wide variety of sector patterns in use (e.g. U.S. Pat. No. 4,032,984 by Kaser et al, U.S. Pat. 4,424,543 etc.), the general techniques proposed for the example sector pattern selected can usually be adapted for use with other sector patterns. In this example, it is envisaged that all disc surfaces are to be written with the same pattern and the process of writing the first surface will be described. U.S. Pat. No. 4,032,984 and 4,424,543 emphasize the value of Gray encoded patterns to indicate "coarse" head position. In addition to the Gray encoded pattern, there is a requirement for "fine" (i.e. with resolutions to very small fractions of a track) information.

Figure 15A:
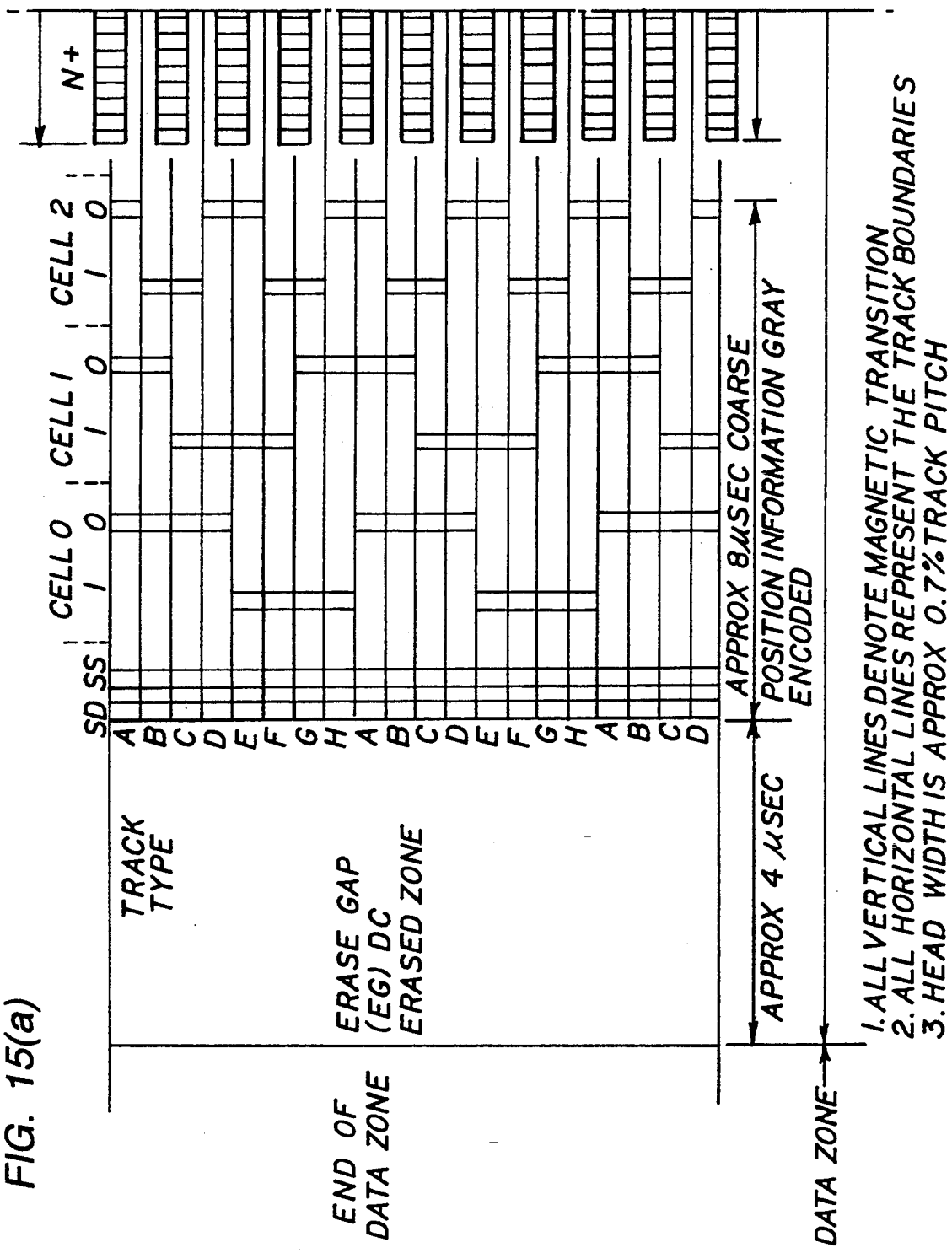
FIG. 15A is a schematic diagram illustrating progressive and data sectors in a track which is used in a second embodiment of the invention.

FIG. 15A depicts the layout of a segment of a track and illustrates the alternating nature of the field and the data field. Obviously, it is desirable to maximize storage efficiency by limiting the space (i.e. time) occupied by the information. Data sectors are in the range of 200 to 400 microseconds long. Times for both data fields and sector fields will decrease with higher recording densities.

Figure 15B:
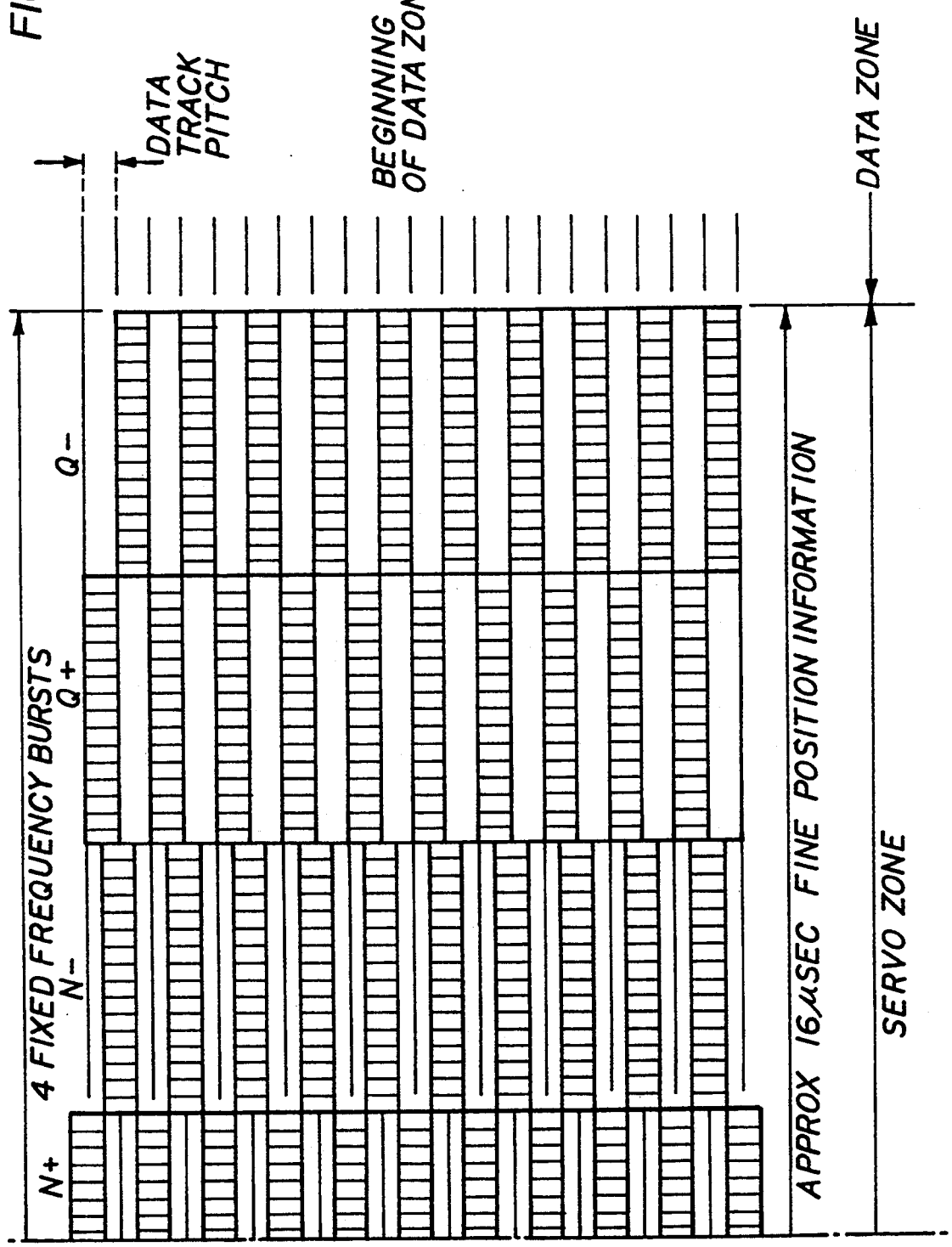

FIG. 15B is a detailed diagram of the flux transition pattern which the servo-writing process must create. The DC Erase Zone, or Erase Gap, (EG) is placed prior to the first SD transition so that it provides a unique feature along the track that the disc drive electronics can recognize as incipient to the information. In this example, the first group of transitions beginning with SD and ending with cell 2 provide the "coarse" position information. For further details see U.S. Pat. No. 4,032,984. The second group of transitions beginning with the first transition of N+ and ending with the last transition of Q− provide the "fine" information. See U.S. Pat. No. 4,424,543 for details of the utility of these "frequency bursts".

There are 8 types of tracks in a group in this example, A through H. As pointed out in U.S. Pat. Nos. 4,032,984 and 4,424,543, the number of tracks in a group is not limited to 8.

In order to create the patterns of FIG. 15B, the head should be moved in increments of ½ of the desired data track pitch. This is because the bursts N+ and N− are offset by ½ a track relative to the standard data track locations, so that a head which is "on track" receives equal energy from the N+ and N− bursts and the signal (N+)-(N−) is zero.

Often, to create a circumferential fiduciary, or index, two erase gaps (EG) separated by a short burst of transitions are recorded once per revolution.

The writing process begins with Step 1 through 5 as described previously, but with the transition pattern in accordance with FIG. 15B. In addition, the segments of the track ultimately destined to hold data are also temporarily written with repeated frames of information identical to the zone pattern of FIG. 15B. If there is not an integral number of such zone patterns in a data field, the four bursts N+, N−, Q+, Q− can be truncated while recording in the data zone in order to fit an integral number of zone patterns in the data zone. The reason that the data field is temporarily filled with sector information is that the PLL, 13, of FIG. 3A, would not be sufficiently stable, in the absence of synchronizing pulses, over the extent of the typical data field time period of up to 400 microseconds. Note that the frame encompassing the Gray Code region is not necessarily the same duration as the frame encompassing the fixed frequency bursts.

Denoting the transition pairs in cell 0 as C0.1 and C0.0, and using a similar nomenclature for the other cells, if this master track is type A, then the transitions recorded will be SD, SS, C0.0, C1.0, C2.0, and the Q+BURST.

Subsequent tracks are written by using the EU State Machine and the pattern generator in a manner similar in principle but different in detail to the dedicated example previously described. Depending on the mode, the frame counter in the EU State Machine is synchronized to an SCLK clock corresponding either to the last pulse of SS, C0.1, C0.0, C1.1, C1.0, C2.1, C2.0, last N+ transition, last N-transition, last Q+ transition or last Q− transition. The EU State Machine will be used to switch from one trigger to another as writing proceeds around a track.

The sequence of writing is delineated in FIG. 16. In this figure, for example, the recording of AB means that the head is located half a track away from the master track, or any other type A track. Following the sequence of events for AB, the EU State Machine is first triggered to an SCLK clock corresponding to C2.0 (second transition in cell 2) and the EU State Machine outputs the N− burst at the correct time. Since the time between C2.0 and N− is short, there will be only a very small timing error accumulated in this time. Continuing with the AB track, the system is switched from write to read at the end of the N− burst. Although, the write to read recovery time is not fast enough to allow reading the first transitions of the Q+ burst, this is not important since the READ WINDOW will open a window to read only the last transition of the Q− burst so that it can be used to resynchronize the PLL. This can be done successfully since the time between the C2.0 transition and the next PLL update at the last Q− transition is less than 20 microseconds during which the VCO of the PLL, 13, is very stable and the spindle speed can change only by a very small amount—usually less than 0.01%. Consequently, the window opened around the last Q− pulse will be in error by at most 0.01% of 20 microseconds, or 2 nanoseconds. The time between successive transitions in the Q− burst is typically at least 100 nanoseconds, so there is no danger of the window opening at the wrong time and the last transition of the Q− burst will be successfully detected and be available to update the phase error of the PLL. (There is a possibility that a slow write to read recovery at the end of the N− burst write will erase the first one or two transitions in the Q+ burst. This is not usually a problem because the disc drive electronics are designed only to read the middle ⅘, or so, of the Q+ burst. If desired, the problem can be circumvented by leaving a short gap between the end of one burst and the beginning of the next burst. The gap time is set slightly larger than the write to read delay which itself is rarely longer than 1 microsecond). Even if occasional defects mean that no pulse exists in the window, the PLL stability and bandwidth ensures that the VCO frequency will remain sufficiently stable until the next phase update is available at C2.0 Protection against more than one pulse occurring during the window opening is obtained by using only one pulse for the PLL. Even if this pulse has an incorrect phase, its effect will be small because of the relatively modest bandwidth of the PLL. The AB track writing continues by idling the write circuitry during Q− and EG followed by writing SD, SS, C0.0, and C1.0 using timing information decoded from the PLL. The remainder of the track, including the fields which are temporarily written in the data zones, is written by repeating the above sequence. Usually, as mentioned previously, a special index pattern of EG's is written every revolution.

The head is now moved another half a track and during the first revolution, the sequence in Table 3 for track B (REV1) is followed and repeated, together with an appropriate EG sequence, until a revolution is complete. Track B is completed on the subsequent revolution by following the sequence in FIG. 16 for track B (REV2).

The remainder of the servowriting process runs through TABLE 3 until A(REV2) after which the sequence repeats at track AB at the top of the TABLE. The process stops when the last track has been written.

Having written the first surface, all other surfaces may be written in the same manner, or, alternatively, the HDA may be taken to a lower cost, purely electronic, writing station which is arranged to read the first surface for both position and clocking information from the temporary information in the data fields and switching heads to write information in the sectors on the other surfaces. Usually all tracks in one cylinder are written before moving the head assembly to the next half track, to maximize throughput.

Finally, for either alternative, a yet lower cost station, also purely electronic, which is capable of positioning the heads in the HDA on the tracks of any surface other than the first one is now deployed. This station uses positioning electronics very similar to those used in the disc drive. The only differences are that the EG detector is set up to detect the very long erase gaps between sectors and the head can be moved in half track increments instead of full track increments. Using this facility, the HDA is positioned every half track and the temporary fields in the data zone on the original written surfaces are d.c. erased. After d.c. erase is complete, all the data zones can then be filled, on a track by track basis, with any pattern required by the disc drive engineer. This recording must leave intact the EG prescribed. In this case about 4 microseconds. There is not a stringent requirement on EG timing (typically a 1 microsecond uncertainty is tolerable), so the timing stability is adequate from one sector to the next to create such an EG.

Alternatives

Although the preferred embodiment suggests the writing of the master track in portions whose size is halved on successive revolutions, the invention is quite applicable to a system which may write one frame on each revolution. Such a system would have smaller changes in frequency in the master track but would take much longer to write (the number of revolutions to write would be equal to the number of frames). On the other hand, if the time to write a master track was of paramount importance, the portion to be written could be a larger fraction of the unrecorded portion on each revolution. The preferred embodiment suggests a fraction of one-half. A fraction of ⅝'ths, for example, could lead to a quicker time to write the master track but at the expense of a larger frequency error. It is possible to contemplate almost arbitrary lengths to be assigned to successive portions and the invention will still lead to a relatively splice free master track. It should also be noted that the invention is not confined to tracks in which each frame has the same duration. The invention will operate just as well with variable frame lengths, but in this case a Pattern Generator with a more extensive repertoire may be necessary. It is also possible to use the invention to record fractions of a frame—for example, simply by re-defining the frame durations so that what were fractions of user specified frames become complete frames for the purpose of writing. Note also that the last portion to be recorded need not be a single frame. The invention is equally applicable if the last portion to be recorded is more than one frame (including fraction of a frame) or a fraction of a frame.

The preferred embodiment has described tracks of a particular pattern. However, the invention is equally applicable to more regular or less regular patterns. For example, a Master Track of a fixed frequency could be recorded, with or without a circumferential fiduciary. This is advantageous for conventional Track Writers employing a clock head, since the clock track required in such a conventional Track Writer could be recorded more quickly, thus improving the throughput.

If disc speed changes slowly from revolution to revolution, the timing accuracy is better than the worst case calculated in the Appendix. Even further improvement can be obtained if a profile of the speed error is taken over several revolutions before writing the Master Track. To the degree that the profile is repeatable, the history of speed errors up to and including revolution n-1 can be used to predict the speed error in the upcoming revolution n. The frequency synthesizer can be set in accordance with the extrapolated speed error instead of the somewhat stale speed error measured during revolution n-1. This method will add about 20 revolutions, or 0.32 seconds, to writing a Master Track.

If speed changes rapidly, improved timing accuracy can easily be achieved as follows. In the first revolution after writing 50% of the track using the nominal clock, F, the time remaining unrecorded is measured as before. If this time exceeds a desired tolerance level then, after erasing the track, the 50% of a track is re-written with the clock to the Pattern Generator still set at F, until the desired tolerance level is achieved. (Note that only a fixed clock frequency rather than a fine resolution frequency synthesizer is required for this method). For example with the values chosen, 1 may be in error by $+/-$ 8 microseconds, or 0.1%. However, if this error varies from revolution to revolution with approximately a uniform probability distribution (and is uncorrelated from revolution to revolution), the following statistical method yields a superior Master Track at the expense of throughput. Assuming the distribution is between $-0.1\%$ and $+0.1\%$, if the desired tolerance level is $+/-$ 0.025% then the probability of achieving this in the first revolution is 0.025/0.1 or 25%. The probability of achieving this in n revolutions is $1-(0.75)^n$. If $n=10$, then the probability is 0.94, or 94%. If the probability distribution is Gaussian (which is more likely in practice), the probability is even higher than 94%. Once the time t1 is within the desired tolerance, the next step of writing 50% of the remainder takes place. Once again this is repeated until the desired tolerance is achieved. For the 11 segments to be written, the probability of achieving a 0.05% closure in $10*11=110$ revolutions is simply $(0.94)<11=0.528$, or 52.8%. This means that more than 50% of the time the master track will be written in 110 revolutions or about 1.8 seconds. In extreme cases the time may extend to about 5 seconds. If the timing jitter distribution is Gaussian instead of uniform, (as is likely in practice), more than 50% of the time the master track will be written in considerably less than 1.8 seconds.

Although the preferred embodiment describes a system for writing a multiplicity of HDA's in parallel, there will be occasions when it is appropriate to consider only a small number of HDA's (perhaps only one). In this case the invention can be used without a Synthesizer and, in the case of only one HDA, without FIFO's. The reason that the Synthesizer can be dispensed with is that with a small number of HDA's, the time to write a clock track is a less important component of the overall throughput and the method described in the previous paragraph can be used. Obviously, with only one HDA, the FIFO's can be dispensed with by driving the PC and the entire SCU from the disc feedback pulses, DERIVED SPDL FDBK PULSES, instead of from the SPINDLE REFERENCE pulse.

Although the application has been disclosed with reference to servo tracks, it will be appreciated that the invention may be considered to be broader than for use to record servo signals in servo tracks. For example, the invention may be used to record signals in a track in an encoder such as an optical encoder.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

APPENDIX

Definitions:
Nominal Period for 1 revolution = T
Speed Error during revolution $n = d_n$
Unwritten Segment in revolution $n = t_n$
Assumptions (1) $d_n$ is so small that product terms $d_n d_m$ are negligible.
(2) the timer and synthesizer have infinite resolution.
Revolution 0, Speed Error $d_o$ Measure Period $t_o = T(1-d_o)$
Revolution 1, Speed Error $d_1$
Write Time $t_{1w} = t_0/2 = (T/2)(1-d_0)$
Time for unwritten segment, $t_1 = T(1-d_1) - (T/2)(1-d_0) = (T/2)(1-2d_1+d_0)$
Revolution 2, Speedd Error $d_2$
Write Time, $t_{2w} = t_1/2 = (T/2^2)(1-2d_1+d_0)$
Time for unwritten segment, $t_2 = (T/2)(1-2d_1+d_0)(1-d_2)/(1-d_1) - (T/4)(1-2d_1+d_0) = (T/2^2)(1-2d_2+d_0)$
Revolution n, Speed Error $d_n$
Write Time, $t_{2w} = t_{n-1}/2 = (T/2^n)(1-2d_{n-1}+d_0)$
Time for unwritten segment $= (T/2^n)(1-2d_n+d_0)$ The above analysis shows that when the last frame, N, is to be written, the time left in which to write the last frame is unknown only to the extent that the speed changes from the last but one revolution and the last revolution.

If last frame is to be written at revolution N, then:
Measured time left for last frame, $t_N = [T/(2^{(N-1)})](1-2d_{N-1}+d_0)$
Actual time left for last frame $t_{NA} = t_N(1-d_N)/(1-d_{N-1}) = t_N(1-d_N+d_N-1)$ Therefore, closure (or splice) error is related only to $d_N - d_{N-1}$, which is the speed change in the last two revolutions. If speed changes rapidly, the worst this can be is twice the speed tolerance. With a typical speed tolerance of 0.1%, this results in a closure error of 0.2% of a frame. If the frame time is 8 microseconds, then the maximum error is 16 nanoseconds.

The analysis further shows that the length of time for writing a typical segment, n, is:

$$t_{nw} = (T/2^n)(1-2d_{n-1}+d_0)$$

This segment is recorded when the speed is actually in error by $d_n$. If $d_n = d_{n-1}$, the arc length of the segment is correct. The length of the segment is only incorrect to the degree that $d_n$ differs from $d_{n-31\ 1}$. If the speed error is 0.1%, the maximum difference is 0.2, and the maximum possible error in the arc occupied by any segment is 0.2% of the arc length. This results in worst case frequency modulation of +/− 0.2% on playback.

In practice, speed changes slowly from revolution to revolution so that the actual tolerances will be much smaller. On the other hand, the resolution of the timer and the synthesizer will have a slight adverse effect on the accuracy.

I claim:

1. A method of recording signals in a plurality of frames in a pair of tracks on a memory member without the use of any prior reference index, including the steps of:

recording signals in the frames on a first one of the tracks in the pair without the use of any prior reference index, the signals being recorded by a head in each frame on the first track, the first track having a particular width, shifting the head from the first track by a particular distance in the direction of the width of the first track, using a first particular one of the signals in each of the frames in the first track as a reference to obtain a recording by the head of signals in the frames on the other track, and thereafter using a second particular one of the signals in each frame in the second track in the pair as a reference to obtain an erasure by the head of the first particular one of the signals in each frame in the first track.

2. A method as set forth in claim 1, including the steps of:

providing a phase lock loop to clock the recording by the head of the signals in each frame in the other track at particular positions in such frame.

3. A method as set forth in claim 1 wherein the signals are recorded by the head in the frames in the first particular track by initially recording such signals in half of the frames to be recorded in the first particular track, then obtaining a recording by the head of signals in one quarter of the frames in half of the unrecorded distance of such track, then obtaining a recording by the head of signals in one eighth of the frames in half of the remaining unrecorded distance in such track, and continuing in a converging pattern to obtain recordings by the head of signals in one half of the yet unrecorded frames in successive operations in half of the unrecorded distance in such track until only one frame remains to be recorded in such track and this one unrecorded frame is then recorded in the remaining unrecorded distance in such track.

4. A method of simultaneously recording information in tracks on first and second memory members, including the steps of:

using a first head to record signals in a first track on the first memory member without the use of any reference indices to aid in such recording, using the first head and the signals in the first track on the first memory member to record signals in a second track on the first memory member, using a second head to record signals in a first track on the second memory member without the use of any reference indices to aid in such recording, and using the second head to record signals in a second track on the second memory member simultaneously with the recording of the signals in the second track on the first memory member.

5. A method as set forth in claim 4, including the steps of:

using the first head and the signals in the second track on the first memory member to record signals in a third track on the first memory member, and using the second head and the second signals in the second track on the second memory member to record signals in a third track on the second memory member simultaneously with the recording of the signals in the third track on the first memory member.

6. A method as set forth in claim 4 wherein the step of recording signals in the first tracks on the first and second memory members involves the successive recordings of signals in progressive unrecorded portions of the first tracks on the first and second memory members, with each of such successive recordings of signals in progressive portions of the first tracks in the first and second memory members having progressively decreasing lengths on such memory members, without the use of any reference indices to aid in such recordings.

7. A method as set forth in claim 4 wherein a reference signal is first recorded in each of the first tracks on the first and second memory members by the individual ones of the first and second heads and wherein the reference signal in the first tracks on the first and second memory members is used as a reference index and wherein the signals are recorded by the first and second heads in the first tracks on the first and second memory members at a particular position relative to such reference index and the reference index on such first tracks in the first and second memory members is erased before the recording of the signals by the first and second heads in the first tracks on the first and second memory members and wherein, the signals recorded in the frames in the first tracks on the first and second members have a first pattern and wherein the signals recorded in the second tracks on the first and second members have a second pattern different from the first pattern.

8. A method of recording signals in a track on a memory member, including the steps of:

writing a reference signal in the track on the memory member, using this reference signal as a reference index to write signals in each of a plurality of frames in the track on the memory member where the number of frames is $2^N$ and where progressively decreasing numbers of frames are written in each of a plurality of successive cyclical movements of the memory member and where the number of frames written with signals in one cyclical movement of the memory member is $2^{N-}$ and where the number of frames written with signals in another cyclical movement of the memory member is $2^{N-2}$ and where the number of frames written with signals in a K cyclical movement of the memory member is $2^{N-K}$ and where a single frame is written with signals in a last cyclical movement of the memory member, K and N being integers greater than 1 and N being a number at least equal to K.

9. A method as set forth in claim 8 wherein the distance on the unrecorded portion of track on the memory member after the K revolution of the disc is determined and the length of each of the $2^{N-(k+1)}$ frames recorded with signals in each revolution of the memory member is adjusted in accordance with such determination of the distance of the unrecorded portion of the track after the K revolution of the memory member.

10. A method as set forth in claim 9 wherein the frames recorded with signals in each cyclical movement of the memory member is contiguous to the last of the frames recorded with signals in the previous cyclical movement of the memory member.

11. A method as set forth in claim 10 wherein the reference signal is erased from the track before signals are recorded in each of the $2^{N-1}$ frames in the one cyclical movement of the memory member.

12. A method of recording a plurality of tracks on a memory member, including the steps of:

recording a first one of the tracks on the memory member with signals in each of $2^N$ frames in N cyclical movements of the memory member where the number of frames recorded with signals in the K cyclical movement of the memory member is $2^{N-K}$, and using an individual one of the signals in each of the frames in the first track as a reference to record signals in each of $2^N$ frames in a second one of the tracks on the memory member in a single cyclical movement of the memory member, K and N being integers greater than 1 and N being at least equal to K.

13. A method as set forth in claim 12 wherein the signals are recorded in the second track in contiguous relationship to the signals in the first track and wherein each of the first and second tracks have in each frame signals common with corresponding signals in the other of the first and second tracks and wherein the common signals in each of the first and second tracks are provided with substantially the same disposition in each of the frames in the tracks.

14. A method as set forth in claim 12 wherein unwanted vestiges of signals in each of the frames in the first track are initially recorded on the second track in the cyclical movement in which signals are recorded in each of the frames in the second track and wherein the unwanted vestiges of signals recorded in each of the frames in the second track from the first track are erased from the second track in a subsequent cyclical movement of the memory member.

15. A method as set forth in claim 13, including the step of using an individual one of the signals in each of the frames in the second track as a reference to record signals in each of $2^N$ frames in a third one of the tracks on the memory member in a single cyclical movement of the memory member.

16. A method of recording signals in a plurality of tracks on a memory member, including the steps of:

using a single head to record signals in each of $2^N$ frames in a first one of the tracks on the memory member in N revolutions of the memory member where the signals are recorded in $2^{N-K}$ frames in the first track on the memory member in the K cyclical movement of the memory member, and using the single head and the signals recorded in the first track on the memory member to record signals in each of $2^N$ frames in a second one of the tracks on the memory member in a single cyclical movement of the memory member, K and N being integers greater than 1 and N being least equal to K.

17. A method as set forth in claim 16 wherein signals are recorded by the head in a single frame in the first track on the memory member in the (N+i) cyclic movement of the memory member where the signals in this single frame have a particular spatial relationship to the last frame recorded with the signals in the N cyclical movement of the memory member and the first frame recorded with the signals in the first cyclical movement of the memory member.

18. A method as set forth in claim 16 wherein an individual one of the signals in each frame in the first track is used as a reference by the head in each frame to record signals in each of the $2^N$ frames in the second track on the memory member in the single revolution of the memory member, and wherein any unwanted vestige of the individual one of the signals in each frame in the first track is erased by the head from each of the frames in the second track on the memory member in a subsequent revolution of the memory member.

19. A method as set forth in claim 18 wherein
signals are recorded by the head in a single frame in the first track on the memory member in the (N+1) revolution of the memory member where the signals in this single frame are recorded in a particular spatial relationship between the last frame recorded with the signals in the N revolution of the memory member and the first frame recorded with the signals in the first revolution of the memory member and wherein an individual one of the signals in each frame in the first track is used as a reference to record the signals in each frame in the second track and wherein any unwanted vestige of the individual one of the signals is erased from the second track in a subsequent cyclical movement of the memory member.

20. A method of recording signals in a plurality of tracks on a plurality of memory members each of which is included in an individual head member assembly with an individual head, including the following steps:

using the head in a first one of the head member assemblies to record signals in each of $2^N$ frames in a first one of the tracks on the memory member in such head member assembly in N cyclical movements of the memory member where the signals are recorded in $2^{N-K}$ frames in the first track on such memory member in the K cyclical movement of the memory member, using the head in each of the head member assemblies (other than the first head member assembly) to record signals in each of $2^N$ frames in a first one of the tracks on each of such head member assemblies, determining the delay in having each of the heads in each individual head member assembly record signals on the memory member in such individual head member assembly, and using the head in each individual head member assembly to record signals in each of the $2^N$ frames in a second one of the tracks in the associated memory member simultaneously with the recording of signals in a second one of the tracks in the other head member assemblies and in accordance with the delay determined for such head member assembly and in synchronism with an individual one of the signals in each of the frames in the first track on such associated memory member, N and K being integers greater than 1 and N being at least equal to K.

21. A method as set forth in claim 20 wherein
the signals are recorded by the head in each head member assembly in each of the frames on the associated memory member in a particular spatial relationship with adjacent frames in such associated memory member.

22. A method as set forth in claim 20 wherein
a reference signal is initially recorded in the first track on each memory member by the associated head in such head member assembly to establish a reference index for the recording of the signals in the $2^{N-1}$ frames in the first track in such memory member in the first cyclical movement of such memory member and wherein the reference signal in the first track on each memory member is subsequently erased by the associated head before the recording of the signals in the $2^{N-1}$ frames in the first track on such memory member by the associated heed.

23. A method as set forth in claim 22 wherein
the signals are recorded by the head in each head member assembly in each of the frames in the first track on the associated memory member in a particular spatial relationship with adjacent frames in such first track oil such associated memory member and wherein the head in each of the head member assemblies is used to record signals in a plurality of tracks on the associated memory member in contiguous relationship with signals recorded in adjacent tracks on the associated memory member and simultaneously with the recording of signals in corresponding tracks by the other heads in the associated head member assemblies and wherein the signals recorded at each instant in the tracks on each memory member have a pattern corresponding to the signals recorded at that instant in the tracks on the other memory members and wherein the signals recorded by each head in each track on the associated memory member have a pattern different from the pattern of the signals recorded by the head in the adjacent tracks on the associated memory member.

24. A method of recording signals in a particular number of frames in a track on a memory member without the use of any reference index, including the steps of:

writing a reference signal in the track on the memory member, and using this reference signal as a positioning index to write signals in each of a particular plurality of frames in the track on the memory member where the signals are written in a plurality of successive cyclical movements of the track and where the signals are written in each cyclical movement in an individual number of frames less than the particular number to occupy a space dependent upon the ratio of such individual number relative to the number of frames remaining unrecorded in such cyclical movement and upon the space remaining unrecorded in the track at the beginning of such cyclical movement and where the amount of unrecorded space in the track is determined after the recording of the signals in the individual number of frames in each cyclical movement.

25. A method as set forth in claim 24, including the step of:

erasing the reference signal after the determination of the position of the reference signal and before the recording of the signals in any of the frames in the track.

26. A method as set forth in claim 24 wherein
the individual number of frames written with the signals in each cyclical movement of the track is contiguous to the last of the frames written with the signals in the previous cyclical movement of the track and wherein a single frame is written with the signals in the last cyclical movement of the track and wherein this single frame is disposed between the last frame written with the signals in the previous revolution of the track and the first frame written with the signals in the first cyclical movement of the track.

27. A method as set forth in claim 26 wherein
the track constitutes a first track and wherein
a single head is used to record the signals in the particular number of frames in the first track and wherein the single head is used to record signals in tracks adjacent to the first track after the recording of the signals in the particular number of frames in the first track.

28. A method as set forth in claim 27 wherein the signals in each of the successive tracks is recorded in a single cyclical movement of the memory member.

* * * * *